United States Patent
Streit

(10) Patent No.: US 12,430,099 B2
(45) Date of Patent: *Sep. 30, 2025

(54) SYSTEMS AND METHODS FOR PRIVATE AUTHENTICATION WITH HELPER NETWORKS

(71) Applicant: Private Identity LLC, Potomac, MD (US)

(72) Inventor: Scott Edward Streit, Woodbine, MD (US)

(73) Assignee: Private Identity LLC, Potomac, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,904

(22) Filed: Sep. 6, 2023

(65) Prior Publication Data
US 2024/0248679 A1   Jul. 25, 2024

Related U.S. Application Data

(63) Continuation of application No. 17/155,890, filed on Jan. 22, 2021, now Pat. No. 11,789,699, which is a
(Continued)

(51) Int. Cl.
*G06F 18/21* (2023.01)
*G06F 7/02* (2006.01)
(Continued)

(52) U.S. Cl.
CPC .............. *G06F 7/02* (2013.01); *G06F 18/213* (2023.01); *G06F 18/217* (2023.01); *G06F 21/32* (2013.01);
(Continued)

(58) Field of Classification Search
CPC ........ G06F 7/02; G06F 18/213; G06F 18/217; G06F 21/32; G06F 21/554;
(Continued)

(56) References Cited

U.S. PATENT DOCUMENTS

| 5,408,588 A | 4/1995 | Ulug |
| 5,805,731 A | 9/1998 | Yaeger et al. |

(Continued)

FOREIGN PATENT DOCUMENTS

| CA | 3 063 126 A1 | 11/2018 |
| CN | 108376215 A | 8/2018 |

(Continued)

OTHER PUBLICATIONS

International Search Report and Written Opinion mailed Aug. 26, 2019, in connection with International Application No. PCT/US2019/021100.

(Continued)

*Primary Examiner* — Carl G Colin
*Assistant Examiner* — Andrew Suh
(74) *Attorney, Agent, or Firm* — Wolf, Greenfield & Sacks, P.C.

(57) ABSTRACT

A set of measurable encrypted feature vectors can be derived from any biometric data and/or physical or logical user behavioral data, and then using an associated deep neural network ("DNN") on the output (i.e., biometric feature vector and/or behavioral feature vectors, etc.) an authentication system can determine matches or execute searches on encrypted data. Behavioral or biometric encrypted feature vectors can be stored and/or used in conjunction with respective classifications, or in subsequent comparisons without fear of compromising the original data. In various embodiments, the original behavioral and/or biometric data is discarded responsive to generating the encrypted vectors. In other embodiment, helper networks can be used to filter identification inputs to improve the accuracy of the models that use encrypted inputs for classification.

21 Claims, 32 Drawing Sheets

Related U.S. Application Data continuation-in-part of application No. 16/993,596, filed on Aug. 14, 2020, now Pat. No. 10,938,852, and a continuation-in-part of application No. 16/832,014, filed on Mar. 27, 2020, now Pat. No. 11,394,552, which is a continuation-in-part of application No. 16/573,851, filed on Sep. 17, 2019, now Pat. No. 11,502,841, which is a continuation-in-part of application No. 16/539,824, filed on Aug. 13, 2019, now Pat. No. 11,265,168, which is a continuation-in-part of application No. 16/218,139, filed on Dec. 12, 2018, now Pat. No. 11,210,375, said application No. 16/573,851 is a continuation-in-part of application No. 16/022,101, filed on Jun. 28, 2018, now Pat. No. 11,170,084, said application No. 16/218,139 is a continuation-in-part of application No. 15/914,562, filed on Mar. 7, 2018, now Pat. No. 11,392,802, and a continuation-in-part of application No. 15/914,942, filed on Mar. 7, 2018, now Pat. No. 10,721,070, said application No. 16/539,824 is a continuation-in-part of application No. 15/914,436, filed on Mar. 7, 2018, now Pat. No. 10,419,221, and a continuation-in-part of application No. 15/914,969, filed on Mar. 7, 2018, now Pat. No. 11,138,333, said application No. 16/218,139 is a continuation-in-part of application No. 15/914,969, filed on Mar. 7, 2018, now Pat. No. 11,138,333, said application No. 16/539,824 is a continuation-in-part of application No. 15/914,562, filed on Mar. 7, 2018, now Pat. No. 11,392,802, said application No. 16/573,851 is a continuation-in-part of application No. 15/914,436, filed on Mar. 7, 2018, now Pat. No. 10,419,221, said application No. 16/539,824 is a continuation-in-part of application No. 15/914,942, filed on Mar. 7, 2018, now Pat. No. 10,721,070.

(51) Int. Cl.

| | | |
|---|---|---|
| *G06F 18/213* | (2023.01) | |
| *G06F 21/32* | (2013.01) | |
| *G06F 21/55* | (2013.01) | |
| *G06N 3/08* | (2023.01) | |
| *G06N 7/01* | (2023.01) | |
| *G06V 10/772* | (2022.01) | |
| *G06V 10/774* | (2022.01) | |
| *G06V 10/98* | (2022.01) | |
| *G06V 40/12* | (2022.01) | |
| *G06V 40/16* | (2022.01) | |
| *G06V 40/40* | (2022.01) | |

(52) U.S. Cl.
CPC ............ *G06F 21/554* (2013.01); *G06N 3/08* (2013.01); *G06N 7/01* (2023.01); *G06V 10/772* (2022.01); *G06V 10/774* (2022.01); *G06V 10/993* (2022.01); *G06V 40/12* (2022.01); *G06V 40/16* (2022.01); *G06V 40/40* (2022.01)

(58) Field of Classification Search
CPC . G06F 2207/4824; G06F 7/5443; G06N 3/08; G06N 7/01; G06N 3/044; G06N 3/045; G06N 3/048; G06V 10/772; G06V 10/774; G06V 10/993; G06V 40/12; G06V 40/16; G06V 40/40; G10L 17/18; H04L 63/0227; H04L 63/0861
See application file for complete search history.

(56) References Cited

U.S. PATENT DOCUMENTS

| | | |
|---|---|---|
| 5,838,812 A | 11/1998 | Pare, Jr. et al. |
| 6,480,621 B1 | 11/2002 | Lyon |
| 6,944,319 B1 | 9/2005 | Huang et al. |
| 7,278,025 B2 | 10/2007 | Saito et al. |
| 8,281,148 B2 | 10/2012 | Tuyls et al. |
| 8,418,249 B1 | 4/2013 | Nucci et al. |
| 8,856,541 B1 | 10/2014 | Chaudhury et al. |
| 8,892,523 B2 | 11/2014 | Amarendran |
| 8,924,928 B1 | 12/2014 | Belovich |
| 8,955,129 B2 | 2/2015 | Cao |
| 8,966,277 B2 * | 2/2015 | Rane ................ G06F 21/32 713/168 |
| 9,003,196 B2 | 4/2015 | Hoyos et al. |
| 9,037,846 B2 | 5/2015 | Furukawa |
| 9,043,417 B1 | 5/2015 | Jones |
| 9,077,744 B2 | 7/2015 | Beutel |
| 9,141,916 B1 | 9/2015 | Corrado et al. |
| 9,191,411 B2 | 11/2015 | Foster |
| 9,208,492 B2 | 12/2015 | Hoyos |
| 9,213,997 B2 | 12/2015 | Chatterjee |
| 9,313,200 B2 | 4/2016 | Hoyos |
| 9,348,488 B1 | 5/2016 | Renema, II |
| 9,390,327 B2 | 7/2016 | Gottemukkula et al. |
| 9,426,150 B2 | 8/2016 | Stern et al. |
| 9,471,919 B2 | 10/2016 | Hoyos et al. |
| 9,619,723 B1 | 4/2017 | Chow et al. |
| 9,659,185 B2 | 5/2017 | Elovic |
| 9,680,779 B2 | 6/2017 | Marovets |
| 9,783,162 B2 | 10/2017 | Hoyos et al. |
| 9,830,709 B2 | 11/2017 | Li et al. |
| 9,838,388 B2 | 12/2017 | Mather et al. |
| 9,886,501 B2 | 2/2018 | Krishnamurthy |
| 10,075,289 B2 | 9/2018 | Laine et al. |
| 10,108,902 B1 | 10/2018 | Lockett |
| 10,110,738 B1 | 10/2018 | Sawant et al. |
| 10,129,252 B1 | 11/2018 | Suen |
| 10,180,339 B1 | 1/2019 | Long et al. |
| 10,375,042 B2 | 8/2019 | Chaum |
| 10,419,221 B1 | 9/2019 | Streit |
| 10,467,526 B1 | 11/2019 | Appalaraju et al. |
| 10,491,373 B2 | 11/2019 | Jain et al. |
| 10,499,069 B2 | 12/2019 | Wang et al. |
| 10,635,894 B1 | 4/2020 | Genner |
| 10,721,070 B2 | 7/2020 | Streit |
| 10,735,411 B1 | 8/2020 | Hardt et al. |
| 10,740,448 B2 * | 8/2020 | Conde .................... G06N 3/045 |
| 10,757,207 B1 | 8/2020 | Kharwandikar |
| 10,902,237 B1 | 1/2021 | Aggarwal et al. |
| 10,938,852 B1 | 3/2021 | Streit |
| 11,112,078 B2 | 9/2021 | Jiang |
| 11,122,078 B1 | 9/2021 | Streit |
| 11,138,333 B2 | 10/2021 | Streit |
| 11,170,084 B2 | 11/2021 | Streit |
| 11,210,375 B2 | 12/2021 | Streit |
| 11,281,664 B1 | 3/2022 | Paiz |
| 11,288,530 B1 | 3/2022 | Genner |
| 11,362,831 B2 | 6/2022 | Streit |
| 11,392,802 B2 | 7/2022 | Streit |
| 11,394,552 B2 | 7/2022 | Streit |
| 11,489,866 B2 | 11/2022 | Streit |
| 11,502,841 B2 | 11/2022 | Streit |
| 11,562,181 B2 | 1/2023 | Chen et al. |
| 11,562,255 B2 | 1/2023 | Johnson et al. |
| 11,562,256 B2 | 1/2023 | Bai et al. |
| 11,762,967 B2 | 9/2023 | Streit |
| 11,778,049 B1 | 10/2023 | Zamir |
| 11,783,018 B2 | 10/2023 | Streit |
| 11,789,699 B2 | 10/2023 | Streit |
| 11,790,066 B2 | 10/2023 | Streit |
| 11,943,364 B2 | 3/2024 | Streit |
| 12,206,783 B2 | 1/2025 | Streit |
| 2002/0049685 A1 | 4/2002 | Yaginuma |
| 2002/0104027 A1 | 8/2002 | Skerpac |
| 2005/0138110 A1 | 6/2005 | Redlich et al. |
| 2005/0149442 A1 | 7/2005 | Adams et al. |

(56) References Cited

U.S. PATENT DOCUMENTS

| | | |
|---|---|---|
| 2006/0228005 A1 | 10/2006 | Matsugu et al. |
| 2007/0155366 A1 | 7/2007 | Manohar et al. |
| 2007/0177773 A1 | 8/2007 | Hu et al. |
| 2007/0220595 A1 | 9/2007 | M'raihi et al. |
| 2007/0245152 A1 | 10/2007 | Pizano et al. |
| 2008/0113785 A1 | 5/2008 | Alderucci et al. |
| 2008/0113786 A1 | 5/2008 | Alderucci et al. |
| 2008/0235515 A1* | 9/2008 | Yedidia .............. G06V 40/193 713/186 |
| 2008/0247611 A1 | 10/2008 | Aisaka et al. |
| 2008/0307526 A1 | 12/2008 | Chung |
| 2009/0034803 A1 | 2/2009 | Matos |
| 2009/0328175 A1 | 12/2009 | Shuster |
| 2010/0010968 A1 | 1/2010 | Redlich et al. |
| 2010/0131273 A1 | 5/2010 | Aley-Raz et al. |
| 2010/0162386 A1 | 6/2010 | Li et al. |
| 2010/0180127 A1 | 7/2010 | Li et al. |
| 2011/0026781 A1 | 2/2011 | Osadchy et al. |
| 2012/0195475 A1 | 8/2012 | Abiko |
| 2012/0198549 A1 | 8/2012 | Antonakakis |
| 2013/0080166 A1 | 3/2013 | Buffum et al. |
| 2013/0142405 A1 | 6/2013 | Nada |
| 2013/0148868 A1 | 6/2013 | Troncoso Pastoriza et al. |
| 2013/0166296 A1 | 6/2013 | Scheffer |
| 2013/0212049 A1 | 8/2013 | Maldonado |
| 2013/0307670 A1 | 11/2013 | Ramaci |
| 2013/0318351 A1* | 11/2013 | Hirano .............. H04L 9/3231 713/168 |
| 2013/0340089 A1 | 12/2013 | Steinberg |
| 2014/0279774 A1 | 9/2014 | Wang et al. |
| 2014/0283061 A1 | 9/2014 | Quinlan et al. |
| 2014/0304505 A1 | 10/2014 | Dawson |
| 2014/0317736 A1 | 10/2014 | Cao |
| 2014/0331059 A1 | 11/2014 | Rane et al. |
| 2014/0337930 A1 | 11/2014 | Hoyos et al. |
| 2014/0358930 A1 | 12/2014 | Lerman |
| 2015/0170053 A1 | 6/2015 | Miao |
| 2015/0188941 A1 | 7/2015 | Boshmaf |
| 2015/0200958 A1 | 7/2015 | Muppidi et al. |
| 2015/0215312 A1 | 7/2015 | Cesnik |
| 2015/0264068 A1 | 9/2015 | Beauchesne |
| 2015/0310444 A1 | 10/2015 | Chen et al. |
| 2015/0339477 A1 | 11/2015 | Abrams |
| 2015/0347820 A1 | 12/2015 | Yin et al. |
| 2016/0006673 A1 | 1/2016 | Thomas et al. |
| 2016/0078485 A1 | 3/2016 | Shim et al. |
| 2016/0127359 A1 | 5/2016 | Minter et al. |
| 2016/0140438 A1 | 5/2016 | Yang et al. |
| 2016/0164682 A1 | 6/2016 | Hartloff et al. |
| 2016/0337426 A1 | 11/2016 | Shribman et al. |
| 2016/0350648 A1 | 12/2016 | Gilad-Bachrach et al. |
| 2016/0371438 A1 | 12/2016 | Annulis |
| 2016/0373440 A1 | 12/2016 | Mather et al. |
| 2016/0379041 A1 | 12/2016 | Rhee et al. |
| 2016/0379044 A1 | 12/2016 | Tang et al. |
| 2017/0008168 A1 | 1/2017 | Weng et al. |
| 2017/0046563 A1 | 2/2017 | Kim et al. |
| 2017/0093851 A1 | 3/2017 | Allen |
| 2017/0098140 A1 | 4/2017 | Wang et al. |
| 2017/0126672 A1 | 5/2017 | Jang |
| 2017/0132526 A1 | 5/2017 | Cohen et al. |
| 2017/0169331 A1 | 6/2017 | Garner |
| 2017/0289168 A1 | 10/2017 | Bar et al. |
| 2017/0357890 A1 | 12/2017 | Kim et al. |
| 2018/0005131 A1 | 1/2018 | Yin et al. |
| 2018/0018451 A1 | 1/2018 | Spizhevoy et al. |
| 2018/0025243 A1 | 1/2018 | Chandraker et al. |
| 2018/0032844 A1 | 2/2018 | Yao et al. |
| 2018/0032997 A1 | 2/2018 | Gordon et al. |
| 2018/0046475 A1 | 2/2018 | Wei |
| 2018/0060552 A1 | 3/2018 | Pellom et al. |
| 2018/0082172 A1 | 3/2018 | Patel et al. |
| 2018/0121560 A1 | 5/2018 | Chen et al. |
| 2018/0121710 A1 | 5/2018 | Leizerson et al. |
| 2018/0137395 A1 | 5/2018 | Han et al. |
| 2018/0139054 A1 | 5/2018 | Chu et al. |
| 2018/0173861 A1 | 6/2018 | Guidotti et al. |
| 2018/0173980 A1 | 6/2018 | Fan et al. |
| 2018/0176216 A1 | 6/2018 | Mather et al. |
| 2018/0232508 A1 | 8/2018 | Kursun |
| 2018/0276488 A1 | 9/2018 | Yoo et al. |
| 2018/0293429 A1 | 10/2018 | Wechsler et al. |
| 2018/0293607 A1 | 10/2018 | Huddleston |
| 2018/0307815 A1 | 10/2018 | Samadani et al. |
| 2018/0330179 A1 | 11/2018 | Streit |
| 2018/0336472 A1 | 11/2018 | Ravi |
| 2018/0373979 A1 | 12/2018 | Wang et al. |
| 2019/0005126 A1 | 1/2019 | Chen et al. |
| 2019/0014148 A1 | 1/2019 | Foster |
| 2019/0019061 A1 | 1/2019 | Trenholm et al. |
| 2019/0020482 A1 | 1/2019 | Gupta et al. |
| 2019/0042895 A1 | 2/2019 | Liang et al. |
| 2019/0044723 A1 | 2/2019 | Prakash et al. |
| 2019/0068627 A1 | 2/2019 | Thampy |
| 2019/0080475 A1 | 3/2019 | Ma et al. |
| 2019/0122096 A1 | 4/2019 | Husain |
| 2019/0130168 A1 | 5/2019 | Khitrov et al. |
| 2019/0132344 A1 | 5/2019 | Lem et al. |
| 2019/0147305 A1 | 5/2019 | Lu et al. |
| 2019/0147434 A1 | 5/2019 | Leung |
| 2019/0171908 A1 | 6/2019 | Salavon |
| 2019/0180090 A1 | 6/2019 | Jiang et al. |
| 2019/0197331 A1 | 6/2019 | Kwak et al. |
| 2019/0205620 A1 | 7/2019 | Yi et al. |
| 2019/0215551 A1 | 7/2019 | Modarresi et al. |
| 2019/0225232 A1 | 7/2019 | Blau |
| 2019/0228248 A1 | 7/2019 | Han et al. |
| 2019/0236273 A1 | 8/2019 | Saxe et al. |
| 2019/0244138 A1 | 8/2019 | Bhowmick et al. |
| 2019/0253404 A1 | 8/2019 | Briceno et al. |
| 2019/0253431 A1 | 8/2019 | Atanda |
| 2019/0258927 A1 | 8/2019 | Chen et al. |
| 2019/0272361 A1 | 9/2019 | Kursun et al. |
| 2019/0278894 A1 | 9/2019 | Andala et al. |
| 2019/0278895 A1 | 9/2019 | Streit |
| 2019/0278937 A1 | 9/2019 | Streit |
| 2019/0279047 A1 | 9/2019 | Streit |
| 2019/0280868 A1 | 9/2019 | Streit |
| 2019/0280869 A1 | 9/2019 | Streit |
| 2019/0286950 A1 | 9/2019 | Kiapour et al. |
| 2019/0294973 A1 | 9/2019 | Kannan et al. |
| 2019/0295223 A1 | 9/2019 | Shen et al. |
| 2019/0306731 A1 | 10/2019 | Raghuramu et al. |
| 2019/0318261 A1 | 10/2019 | Deng et al. |
| 2019/0332849 A1 | 10/2019 | Gupta et al. |
| 2019/0347432 A1 | 11/2019 | Boivie |
| 2019/0354806 A1 | 11/2019 | Chhabra et al. |
| 2019/0372754 A1 | 12/2019 | Gou et al. |
| 2019/0372947 A1 | 12/2019 | Penar et al. |
| 2020/0004939 A1 | 1/2020 | Streit |
| 2020/0007931 A1 | 1/2020 | Ho et al. |
| 2020/0014541 A1 | 1/2020 | Streit |
| 2020/0044852 A1 | 2/2020 | Streit |
| 2020/0078206 A1 | 3/2020 | Chiladakis |
| 2020/0097653 A1 | 3/2020 | Mehta et al. |
| 2020/0099508 A1 | 3/2020 | Ghorbani |
| 2020/0228336 A1 | 7/2020 | Streit |
| 2020/0228339 A1 | 7/2020 | Barham et al. |
| 2020/0242506 A1 | 7/2020 | Kelly |
| 2020/0285737 A1 | 9/2020 | Kraus et al. |
| 2020/0351097 A1 | 11/2020 | Streit |
| 2020/0365143 A1 | 11/2020 | Ogawa et al. |
| 2020/0387835 A1 | 12/2020 | Sandepudi et al. |
| 2021/0014039 A1 | 1/2021 | Zhang et al. |
| 2021/0065859 A1 | 3/2021 | Mckinney et al. |
| 2021/0097158 A1 | 4/2021 | Lee et al. |
| 2021/0103783 A1 | 4/2021 | Wang et al. |
| 2021/0103937 A1 | 4/2021 | Joglekar et al. |
| 2021/0141007 A1 | 5/2021 | Gu et al. |
| 2021/0141896 A1 | 5/2021 | Streit |
| 2021/0224563 A1 | 7/2021 | Patel |
| 2021/0319784 A1 | 10/2021 | Le Roux et al. |
| 2021/0374445 A1 | 12/2021 | Genner |
| 2021/0377298 A1 | 12/2021 | Streit |

(56) References Cited

U.S. PATENT DOCUMENTS

| | | |
|---|---|---|
| 2022/0058255 A1 | 2/2022 | Streit |
| 2022/0078206 A1 | 3/2022 | Streit |
| 2022/0100896 A1 | 3/2022 | Streit |
| 2022/0147602 A1 | 5/2022 | Streit |
| 2022/0147607 A1 | 5/2022 | Streit |
| 2022/0150068 A1 | 5/2022 | Streit |
| 2022/0229890 A1 | 7/2022 | Streit |
| 2022/0277064 A1 | 9/2022 | Streit |
| 2023/0025754 A1 | 1/2023 | Hassanzadeh et al. |
| 2023/0043127 A1 | 2/2023 | Streit |
| 2023/0070649 A1 | 3/2023 | Streit |
| 2023/0103695 A1 | 4/2023 | Streit |
| 2023/0106829 A1 | 4/2023 | Streit |
| 2023/0143874 A1 | 5/2023 | Lee et al. |
| 2023/0176815 A1 | 6/2023 | Streit |
| 2023/0283476 A1 | 9/2023 | Streit |
| 2023/0368026 A1 | 11/2023 | Cox et al. |
| 2024/0028951 A1 | 1/2024 | Willardson et al. |
| 2024/0048389 A1 | 2/2024 | Streit |
| 2024/0078300 A1 | 3/2024 | Streit |
| 2024/0211565 A1 | 6/2024 | Streit |
| 2024/0220594 A1 | 7/2024 | Streit |
| 2024/0248973 A1 | 7/2024 | Streit |
| 2024/0346124 A1 | 10/2024 | Streit |

FOREIGN PATENT DOCUMENTS

| | | |
|---|---|---|
| EP | 2 833 294 A2 | 2/2015 |
| EP | 2 784 710 B1 | 6/2018 |
| WO | WO 2017/027320 A1 | 2/2017 |
| WO | WO 2019/173562 A1 | 9/2019 |
| WO | WO 2019/200264 A1 | 10/2019 |

OTHER PUBLICATIONS

International Search Report and Written Opinion mailed Sep. 30, 2019, in connection with International Application No. PCT/US2019/039537.

International Search Report and Written Opinion mailed Oct. 29, 2020, in connection with International Application No. PCT/US2020/046061.

International Search Report and Written Opinion mailed Feb. 3, 2021, in connection with International Application No. PCT/US2020/050935.

International Search Report and Written Opinion mailed Nov. 15, 2021, in connection with International Application No. PCT/US2021/045745.

International Preliminary Report on Patentability mailed Jan. 7, 2021, in connection with International Application No. PCT/US2019/039537.

International Preliminary Report on Patentability mailed Feb. 24, 2022, in connection with International Application No. PCT/US2020/046061.

International Preliminary Report on Patentability mailed Mar. 31, 2022, in connection with International Application No. PCT/US2020/050935.

International Preliminary Report on Patentability mailed Feb. 23, 2023, in connection with International Application No. PCT/US2021/0458745.

Invitation to Pay Additional Fees mailed Dec. 3, 2020, in connection with International Application No. PCT/US2020/050935.

Invitation to Pay Additional Fees mailed Jun. 24, 2019, in connection with International Application No. PCT/US2019/021100.

European Examination Report dated Oct. 10, 2022, in connection with European Application No. 19712657.6.

Examination Report No. 1 dated Jul. 24, 2023, in connection with Australian Application No. 2019230043.

Extended European Search Report dated Jul. 14, 2023, in connection with European Application No. 20852611.1.

Extended European Search Report dated Sep. 5, 2023, in connection with European Application No. 20865304.8.

Al-Waisy et al., A Multimodal Biometric System for Personal Identification Based on Deep Learning Approaches.2017 Seventh International Conference on Emerging Security Technologies (EST). 2017 IEEE. 2017; pp. 162-168.

Boddeti, Secure Face Matching Using Fully Homomorphic Encryption. IEEE 9th International Conference on Biometrics Theory, Applications and Systems (BTAS). Oct. 22, 2018: 1-10.

Chamatidis et al., Using deep learning neural networks for ECG based authentication. 2017 international Carnahan conference on security technology (ICCST) Oct. 23, 2017. 6 pages.

Chen et al., Deep ranking for person re-identification via joint representation learning. IEEE Transactions on Image Processing. Mar. 23, 2016;25(5):2353-67.

Chen et al., Learning Multi-channel Deep Feature Representations for Face Recognition. JMLT: Workshop and Conference Proceedings. 2015:44;60-71.

Graepel et al., "ML Confidential: Machine Learning on Encrypted Data", 2012, SpringerOVeralg Berlin Heidelberg 2013, pp. 1-21 ( Year: 2013).

Inamdar et al., Real-Time Face Mask Identification Using Facemasknet Deep Learning Network. Available at SSRN 3663305. Jul. 29, 2020;7 pages.

Kurban et al., A Multi-Biometric Recognition System Based on Deep Features of Face and Gesture Energy Image. 2017 IEEE International Conference on Innovations in Intelligent. Systems and Applications. 2017; 4 pages. https://ieeexplore.ieee.org/stamp/stamp.jsp?tp=&arnumber=8001186.

Lagendijk et al., Encrypted Signal Processing for Privacy Protection: Conveying the Utility of Homorphic Encryption and Multiparty Computation. IEEE Signal Processing Magazine. Jan. 1, 2013;30(1):82-105.

Lu et al., Discriminative Deep Metric Learning for Face and Kinship Verification. IEEE Transactions on Image Processing. 2017; 26 (9): 4269-4282.

Ma et al., A Secure Face-Verification Scheme Based on Homomorphic Encryption and Deep Neural Networks. IEEE. Sep. 6, 2017: 5:16532-16538.

Rattani et al., Multi-biometic Convolutional Neural Networks for Mobile User Authentication. 2018 IEEE International Symposium on Technologies for Homeland Security (HST). 2018; pp. 1-6.

Streit et al., Privacy Enabled Biometric Search. ArXiv e-prints. Aug. 16, 2017. 7 pages.

Stuhlsatz et al., Feature Extraction with Deep Neural Networks by a Generalized Discriminant Analysis. IEEE Transactions on Neural Networks and Learning Systems. Apr. 2012; 23(4): 596-608.

Tran et al., Disentangled Representation Learning GAN for Pose-Invariant Face Recognition. 2017 IEEE Conference on Computer Vision and Pattern Recognition (CVPR). 1283-1292.

Wang et al., End-to-end encrypted traffic classification with one-dimensional convolution neural networks. 2017 IEEE International Conference on Intelligence and Security Informatics (ISI). 6 pages.

Xie et al "Crypto-Nets: Neural Networks over Encrypted data", 2014, ICLR pp. 1-9 (Year: 2014).

Zhang et al., Bit-scalable deep hashing with regularized similarity learning for image retrieval and person re-identification. IEEE Transactions on Image Processing. Aug. 11, 2015;24(12):4766-79.

Zhang et al., Face Detection Based on Multitask Learning and Multi-Layer Feature Fusion. 2017 6th International Conference on Computer Science and Network Technology (ICCSNT). 2017: 289-293.

Chatzidakis et al., Chaotic Neural Networks for Intelligent Signal encryption. ISA 2014. The 5th International Conference on Information, Intelligence, Systems and Applications. 6 Pages.

Dileep et al., Identification of Block Ciphers using Support Vector Machines. 2006 International Joint Conference on Neural Networks. Jul. 16, 2006:2696-01.

U.S. Appl. No. 18/443,803, filed Feb. 16, 2024, Streit.
U.S. Appl. No. 17/984,719, filed Nov. 10, 2022, Streit.
U.S. Appl. No. 17/866,673, filed Jul. 18, 2022, Streit.
U.S. Appl. No. 18/461,904, filed Sep. 6, 2023, Streit.
U.S. Appl. No. 17/583,687, filed Jan. 5, 2022, Streit.

(56) References Cited

OTHER PUBLICATIONS

U.S. Appl. No. 18/754,422, filed Jun. 26, 2024, Streit.
U.S. Appl. No. 17/583,726, filed Jan. 25, 2022, Streit.
U.S. Appl. No. 17/583,795, filed Jan. 25, 2022, Streit.
CA 3092941, Apr. 3, 2024, Canadian Examination Report.
EP 21856719.6, Aug. 12, 2024, Extended European Search Report.
*Brian Streit v. Private Identity LLC (f.k.a. Open Inference Holdings LLC)* Dist. Ct. ME, 8:23-cv-2031, Pending.
Extended European Search Report dated Aug. 12, 2024, in connection with European Application No. 21856719.6.
Canadian Examination Report dated Apr. 3, 2024, in connection with Canadian Application No. 3,092,941.
Barni et al., Privacy-Preserving ECG Classification with Branching Programs and Neural Networks. IEEE Transactions on information Forensics and Security. Jun. 2011;6(2):452-68.
Basu et al., User-in-a-context; a blueprint for context-aware identification. 14th Annual Conference on Privacy, Security and Trust (PST). 2016, pp. 329-334 doi: 10.1109/PST.2016.7906982.
*Brian Streit, Ph.D. v. Private Identity LLC (f.k.a. Open Inference Holdings LLC)* Dist. Ct. Me, 8:23-cv-2031.
Choubey et al., Secure Remote User Authentication for Multi-Server Environment using Machine Learning Technique. International Conference on Circuit, Power, and Computing Technologies [ICCPCT]. 2016. 5 Pages.
Hema et al., Mouse Behavior Based Multi-Factor Authentication using Neural Networks. 2016 International Conference on Circuit, Power and Computing (ICCPCT). 2016, pp. 1-8. doi: 10.1109/ICCPCT.2016.7530312.
Ligier et al., Information leakage analysis of inner-product functional encryption based data classification. 2017 15th Annual Conference on Privacy, Security and Trust (PST). 2017. 6 pages.
Picek et al. Side-Channel analysis and machine learning: A practical perspective. International Join Conference Neural Networks (IJCNN). 2017. 8 Pages.
Sadeghian et al., Chosen Plaintext Attack against Neural Network-Based Symmetric Ciper. Proceedings of International Joint Conference on Neural Networks. Aug. 12, 2007. 5 Pages.
Satonaka, Biometric Watermark Authentication With Multiple Verification Rule. Proceedings of the 12th IEEE Workshop on Neural Networks for Signal Processing. 2002. 13 Pages.
Xu et al, Developing a Courses Module for Teaching Cryptography Programming on Android. 2015 IEEE Frontiers in Education Conference. (FIE). 2015. pp 1-4. doi:10.1109/FIE.2015.7344086.

* cited by examiner

FIG. 5B

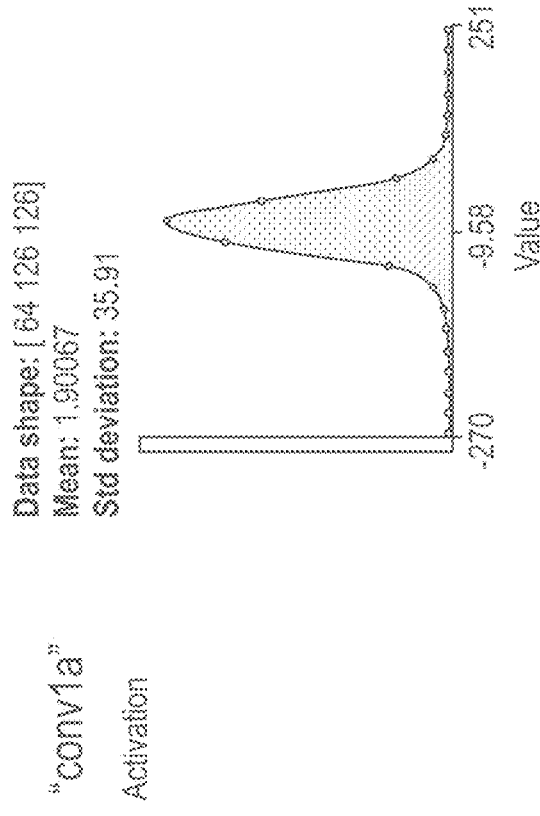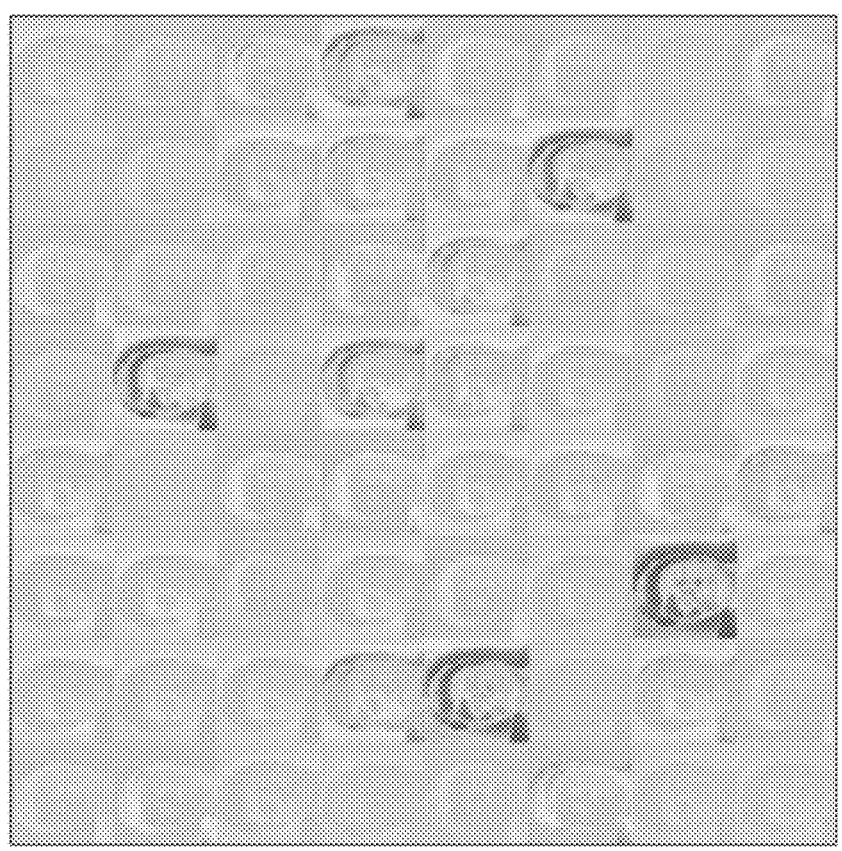
FIG. 5C

FIG. 8A

TABLE X. Liveness Implementations

| Id | Type | Strategy | Pros | Cons | Summary |
|----|------|----------|------|------|---------|
| 1 | Passive | 3D Camera | Does not impact user | As the third dimension solves a problem, 3D printers create a new and real vulnerability | Not efficient. Possible vulnerabilities exist as solutions that are 3D are potentially vulnerable to 3D printers |
| 2 | Passive | Detect blood pressure, or heart beat | Does not impact user | Difficult to read. Possibly could be simulated. | Not efficient. |
| 3 | Passive | Detect eyelid movement | Does not impact user | Difficult to read, and eye movement may be easily simulated in a video. | Not efficient due to a replay attack. |
| 4 | Active | Requested gesture from a set of gestures | More direct than passive | Spoof issue. Create a video of all possible gestures replay the gesture when requested | Easy to spoof. Relies on securing the set of gestures. |
| 5 | Active | Requested random gestures. | More direct than passive | The randomness too difficult to read for a large set of possibilities. Difficult to detect matches in large sets. | The larger the set of possibility gestures the more difficult it is to read. For this reason, inefficient |
| 6 | Active | Request words from a set of words. | Ease in detection | The entire set of requested words may be recorded and replayed | Inefficient due to replay. |

FIG. 8B

TABLE X (Continued)

| | | | | |
|---|---|---|---|---|
| 7 | Active | Request a random set of words | The randomness makes it impossible to record and replay | Devices may say the words as requested in place of the user. | Practical but with some limitations. |
| 8 | Active | Request random set of words in conjunction with a voice identity based on the same audio input | The word check in conjunction with identity prevents replay thorough a device. | Future devices | Practical. |

TABLE VI

| | A | B | C | D | E |
|---|---|---|---|---|---|
| 1 | step | action | info | time | accuracy |
| 2 | 50 | Retrieving feature embedding | | 100.939024 | |
| 3 | 50 | Training Deep Learning classifier | | 54.34578061 | |
| 4 | 51 | Retrieving feature embedding | | 104.8042319 | |
| 5 | 51 | Training incrementally Deep Learning classifier | | 9.755134106 | |
| 6 | 52 | Retrieving feature embedding | | 105.692045 | |
| 7 | 52 | Training incrementally Deep Learning classifier | | 9.367767096 | |
| 8 | 53 | Retrieving feature embedding | | 95.68940234 | |
| 9 | 53 | Training incrementally Deep Learning classifier | | 9.38846755 | |
| 10 | 54 | Retrieving feature embedding | | 108.8445647 | |
| 11 | 54 | Training incrementally Deep Learning classifier | | 9.668224573 | |
| 12 | 55 | Retrieving feature embedding | | 108.7391896 | |
| 13 | 55 | Training incrementally Deep Learning classifier | | 10.2577827 | |
| 14 | 56 | Retrieving feature embedding | | 107.1305535 | |
| 15 | 56 | Training incrementally Deep Learning classifier | | 9.660038471 | |
| 16 | 57 | Retrieving feature embedding | | 111.1128619 | |
| 17 | 57 | Training incrementally Deep Learning classifier | | 9.824867487 | |
| 18 | 58 | Retrieving feature embedding | | 109.780278 | |
| 19 | 58 | Training incrementally Deep Learning classifier | | 10.25701618 | |
| 20 | 59 | Retrieving feature embedding | | 114.9919829 | |
| 21 | 59 | Training incrementally Deep Learning classifier | | 9.752382278 | |
| 22 | 60 | Retrieving feature embedding | | 114.3731036 | |
| 23 | 60 | Training incrementally Deep Learning classifier | | 10.15184236 | |
| 24 | 60 | Accuracy | #test_images = 533 | | 0.988743 |
| 25 | 60 | Vote Accuracy | #test_images = 533 | | 1 |
| 26 | 61 | Retrieving feature embedding | | 118.237993 | |
| 27 | 61 | Training incrementally Deep Learning classifier | | 10.0895071 | |
| 28 | 62 | Retrieving feature embedding | | 120.2519257 | |
| 29 | 62 | Training incrementally Deep Learning classifier | | 10.69825125 | |
| 30 | 63 | Retrieving feature embedding | | 119.3803787 | |
| 31 | 63 | Training incrementally Deep Learning classifier | | 10.66580486 | |
| 32 | 64 | Retrieving feature embedding | | 138.031605 | |
| 33 | 64 | Training incrementally Deep Learning classifier | | 12.32183456 | |
| 34 | 65 | Retrieving feature embedding | | 133.2701755 | |
| 35 | 65 | Training incrementally Deep Learning classifier | | 12.35964537 | |
| 36 | 66 | Retrieving feature embedding | | 136.8798289 | |
| 37 | 66 | Training incrementally Deep Learning classifier | | 12.07544327 | |
| 38 | 67 | Retrieving feature embedding | | 140.3868775 | |
| 39 | 67 | Training incrementally Deep Learning classifier | | 12.54206896 | |
| 40 | 68 | Retrieving feature embedding | | 140.855052 | |
| 41 | 68 | Training incrementally Deep Learning classifier | | 12.59552693 | |
| 42 | 69 | Retrieving feature embedding | | 140.2500689 | |
| 43 | 69 | Training incrementally Deep Learning classifier | | 12.55604577 | |
| 44 | 70 | Retrieving feature embedding | | 144.5612676 | |
| 45 | 70 | Training incrementally Deep Learning classifier | | 12.95398426 | |
| 46 | 70 | Accuracy | #test_images = 673 | | 0.9925706 |
| 47 | 70 | Vote Accuracy | #test_images = 673 | | 1 |
| 48 | 71 | Retrieving feature embedding | | 145.2458987 | |
| 49 | 71 | Training incrementally Deep Learning classifier | | 13.09419131 | |

FIG. 12

Table VII

| | A | B | C | D | E |
|---|---|---|---|---|---|
| 1 | step | action | info | time | accuracy |
| 67 | 80 | Training incrementally Deep Learning classifier | | 14.24880123 | |
| 68 | 80 | Accuracy | #test_images = 724 | | 0.9903315 |
| 69 | 80 | Vote Accuracy | #test_images = 724 | | 1 |
| 70 | 81 | Retrieving feature embedding | | 153.8295755 | |
| 71 | 81 | Training incrementally Deep Learning classifier | | 14.72389603 | |
| 72 | 82 | Retrieving feature embedding | | 157.9210677 | |
| 73 | 82 | Training incrementally Deep Learning classifier | | 14.57672453 | |
| 74 | 83 | Retrieving feature embedding | | 164.8383744 | |
| 75 | 83 | Training incrementally Deep Learning classifier | | 21.83570766 | |
| 76 | 84 | Retrieving feature embedding | | 161.2950387 | |
| 77 | 84 | Training incrementally Deep Learning classifier | | 14.25801277 | |
| 78 | 85 | Retrieving feature embedding | | 155.9785285 | |
| 79 | 85 | Training incrementally Deep Learning classifier | | 14.45170879 | |
| 80 | 86 | Retrieving feature embedding | | 160.9079704 | |
| 81 | 86 | Training incrementally Deep Learning classifier | | 14.81818509 | |
| 82 | 87 | Retrieving feature embedding | | 164.5734673 | |
| 83 | 87 | Training incrementally Deep Learning classifier | | 18.26664591 | |
| 84 | 88 | Retrieving feature embedding | | 169.8400548 | |
| 85 | 88 | Training incrementally Deep Learning classifier | | 15.75074983 | |
| 86 | 89 | Retrieving feature embedding | | 169.2413263 | |
| 87 | 89 | Training incrementally Deep Learning classifier | | 15.93148685 | |
| 88 | 90 | Retrieving feature embedding | | 172.5191889 | |
| 89 | 90 | Training incrementally Deep Learning classifier | | 15.88449383 | |
| 90 | 90 | Accuracy | #test_images = 882 | | 0.986618 |
| 91 | 90 | Vote Accuracy | #test_images = 882 | | 0.9963504 |
| 92 | 91 | Retrieving feature embedding | | 170.162873 | |
| 93 | 91 | Training incrementally Deep Learning classifier | | 15.72525668 | |
| 94 | 92 | Retrieving feature embedding | | 174.9947026 | |
| 95 | 92 | Training incrementally Deep Learning classifier | | 15.791049 | |
| 96 | 93 | Retrieving feature embedding | | 175.3449857 | |
| 97 | 93 | Training incrementally Deep Learning classifier | | 15.8756597 | |
| 98 | 94 | Retrieving feature embedding | | 177.0825081 | |
| 99 | 94 | Training incrementally Deep Learning classifier | | 15.72812366 | |
| 100 | 95 | Retrieving feature embedding | | 178.8846812 | |
| 101 | 95 | Training incrementally Deep Learning classifier | | 16.04615927 | |
| 102 | 96 | Retrieving feature embedding | | 171.2114341 | |
| 103 | 96 | Training incrementally Deep Learning classifier | | 16.32442522 | |
| 104 | 97 | Retrieving feature embedding | | 177.8708515 | |
| 105 | 97 | Training incrementally Deep Learning classifier | | 15.90093112 | |
| 106 | 98 | Retrieving feature embedding | | 177.5916936 | |
| 107 | 98 | Training incrementally Deep Learning classifier | | 16.57834721 | |
| 108 | 99 | Retrieving feature embedding | | 185.1854212 | |
| 109 | 99 | Training incrementally Deep Learning classifier | | 16.64935994 | |
| 110 | 100 | Retrieving feature embedding | | 179.5375969 | |
| 111 | 100 | Training incrementally Deep Learning classifier | | 17.24395561 | |
| 112 | 100 | Accuracy | #test_images = 875 | | 0.9897143 |
| 113 | 100 | Vote Accuracy | #test_images = 875 | | 1 |
| 114 | 100 | Retrieving feature embedding | | 184.8017459 | |

FIG. 13

SYSTEMS AND METHODS FOR PRIVATE AUTHENTICATION WITH HELPER NETWORKS

RELATED APPLICATIONS

This application is a Continuation and claims priority to U.S. application Ser. No. 17/155,890, filed Jan. 22, 2021, entitled "SYSTEMS AND METHODS FOR PRIVACY-ENABLED BIOMETRIC PROCESSING," which is a Continuation-in-part and claims priority to U.S. Application Ser. No. 16/832,014, filed Mar. 27, 2020, entitled "SYSTEMS AND METHODS FOR PRIVACY-ENABLED BIOMETRIC PROCESSING," which is a Continuation-in-part and claims priority to U.S. application Ser. No. 16/573,851, filed Sep. 17, 2019, entitled "SYSTEMS AND METHODS FOR PRIVACY-ENABLED BIOMETRIC PROCESSING," which is a Continuation-in-part of and claims priority to U.S. application Ser. No. 16/539,824, filed Aug. 13, 2019, entitled "SYSTEMS AND METHODS FOR PRIVACY-ENABLED BIOMETRIC PROCESSING", which is a Continuation-in-part of and claims priority to U.S. application Ser. No. 16/218,139, filed Dec. 12, 2018, entitled "SYSTEMS AND METHODS FOR BIOMETRIC PROCESSING WITH LIVENESS", which is a Continuation-in-part of and claims priority to U.S. Application Ser. No. 15/914,562, filed Mar. 7, 2018, entitled "SYSTEMS AND METHODS FOR PRIVACY-ENABLED BIOMETRIC PROCESSING". Application Ser. No. 16/218,139 is a Continuation-in-part of and claims priority to U.S. application Ser. No. 15/914,942, filed Mar. 7, 2018, entitled "SYSTEMS AND METHODS FOR PRIVACY-ENABLED BIOMETRIC PROCESSING". Application Ser. No. 16/218,139 is a Continuation-in-part of and claims priority to U.S. application Ser. No. 15/914,969, filed Mar. 7, 2018, entitled "SYSTEMS AND METHODS FOR PRIVACY-ENABLED BIOMETRIC PROCESSING". Application Ser. No. 16/539,824 is a Continuation-in-part of and claims priority to U.S. application Ser. No. 15/914,436, filed Mar. 7, 2018, entitled "SYSTEMS AND METHODS FOR PRIVACY-ENABLED BIOMETRIC PROCESSING". Application Ser. No. 16/539,824 is a Continuation-in-part of and claims priority to U.S. Application Ser. No. 15/914,562, filed Mar. 7, 2018, entitled "SYSTEMS AND METHODS FOR PRIVACY-ENABLED BIOMETRIC PROCESSING". Application Ser. No. 16/539,824 is a Continuation-in-part of and claims priority to U.S. application Ser. No. 15/914,942, filed Mar. 7, 2018, entitled "SYSTEMS AND METHODS FOR PRIVACY-ENABLED BIOMETRIC PROCESSING". Application Ser. No. 16/539,824 is a Continuation-in-part of and claims priority to U.S. application Ser. No. 15/914,969, filed Mar. 7, 2018, entitled "SYSTEMS AND METHODS FOR PRIVACY-ENABLED BIOMETRIC PROCESSING". Application Ser. No. 16/573,851 is a Continuation-in-part of and claims priority to U.S. application Ser. No. 16/022,101, filed Jun. 28, 2018, entitled "BIOMETRIC AUTHENTICATION". Application Ser. No. 16/573,851 is a Continuation-in-part of and claims priority to U.S. application Ser. No. 15/914,436, filed Mar. 7, 2018, entitled "SYSTEMS AND METHODS FOR PRIVACY-ENABLED BIOMETRIC PROCESSING". Application Ser. No. 17/155,890 is also a Continuation-in-part of and claims priority to U.S. application Ser. No. 16/993,596, filed Aug. 14, 2020, entitled "SYSTEMS AND METHODS FOR PRIVATE AUTHENTICATION WITH HELPER NETWORKS." Each of which preceding applications are incorporated by reference herein in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Biometrics offer the opportunity for identity assurance and validation. Many conventional uses for biometrics currently exist for identity and validation. For example, some conventional approaches exist that attempt to implement authentication and/or identification in the context of machine learning. Such approaches have developed optimizations to improve the training and predictive accuracy of the machine learning models. For example, a number of solutions use procedural programming to prepare data for processing by machine learning models. In one example, procedural programming can be used to process user images (e.g., face images) to crop or align images around user faces, to improve the image data used to train machine learning models to recognize the users. A number of approaches exist to filter training data sets to improve the training of respective machine learning models based on procedural programming or rules.

SUMMARY

The inventors have realized that there is still a need to utilize the power of machine learning models as gateways or filters on data being used for subsequent machine learning based recognition whether in authentication settings or identification settings. It is further realized that approaches based on procedural programming fail to achieve the level of filtering required, and further fail to provide a good balance between processing requirements and accuracy. According to various aspects, provided are identification/authentication systems that are configured to leverage machine learning approaches in the context of pre-processing data for subsequent use by machine learning models that support identification and/or authentication. The inventors have further realized that, unlike prior solutions, it is possible to create lightweight models (e.g., small size models) that provide sufficient accuracy (e.g., >90%) in identifying features or states of input identification data to serve as a gateway for further processing. For example, the system can implement a plurality of helper networks configured to process incoming various types of identification data (e.g., biometrics, behavioral, passive, active, etc.). According to some embodiments, the helper networks validate submitted identification information as good, bad data, and/or fraudulent data and filter the bad data from use in subsequent operations. The subsequent operations can include, for example, identification, authentication, training, enrollment, quality assurance, and in some examples, prediction.

In further embodiments, helper networks can be implemented in an authentication system and operate as a gateway for embedding neural networks that extract encrypted features from authentication information and/or as a gateway for prediction models that predict matches between input and enrolled authentication information. According to various aspects, embedding machine learning models can be tailored to respective authentication modalities, and similarly, helper networks can be configured to process specific identification/authentication inputs or authentication modalities and validate the same before they are used in subsequent models. An authentication modality can be associated with the sensor/system used to capture the authentication information (e.g., image capture for face, iris, or fingerprint, audio capture for voice, etc.), and may be further limited based on the type of information being analyzed within a data capture (e.g., face, iris, fingerprint, voice, behavior, etc.).

Broadly stated, authentication modality refers to the capability in the first instance to identify a subject to confirm an assertion of identity and/or to authenticate the subject to adjudicate identity and/or authorization based on a common set of identity information. In one example, an authentication modality can collect facial images to train a neural network on a common authentication data input. In another example, speech inputs or more generally audio inputs can be processed by a first network, where physical biometric input (e.g., face, iris, etc.) can be processed by another network trained on the different authentication modality. In further example, image captures for user faces can be processed as a different modality from image captures for iris identification, and/or fingerprint identification. Other authentication modalities can include behavioral identification information (e.g., speech pattern, movement patterns (e.g., angle of carrying mobile device, etc.), timing of activity, location of activity, etc.), passive identification information capture, active identification information capture, among other options.

According to another aspect, helper networks, also referred to as pre-processing neural networks, are configured to operate as a gateway on identification information subsequently used to identify and/or authenticate entities by constructing intelligent models (e.g., embedding and/or prediction networks). Assuming, that both good and bad identification information samples are taken as part of information capture, the helper networks operate to filter out bad information prior to training, which prevents, for example, information that is valid but poorly captured from impacting training or prediction using various neural networks. Additionally, helper networks can also identify and prevent presentation attacks or submission of spoofed information.

Training of machine learning models typically involves expansion and generation of variants of training data. These operations increase the size of the training data pool and improve the accuracy of the trained model. However, the inventors have realized that including bad data in such expanded training data sets compromises accuracy. Worse, capturing and expanding bad instances of data can multiply the detrimental effect. According to various embodiments, data validation by helper networks identifies and eliminates data that would reduce authentication accuracy (i.e. bad data). Unexpectedly, the helper networks are also able to identify bad data in this context that is undetected by human perception. This allows various embodiments to yield capability that cannot naturally be produced in a procedural programming context, where a programmer is attempting to code human based analysis (limited by human perception) of identification data.

In further aspects, the authentication system can be configured to leverage a plurality of helper neural networks (e.g., a plurality of neural networks (e.g., deep neural networks (e.g., DNNs))), where sets of helper networks can be trained to acquire and transform biometric values or types of biometrics to improve biometric capture, increase accuracy, reduce training time for embedding and/or classification networks, eliminate vulnerabilities (e.g., liveness checking and validation), and further sets of helper networks can be used to validate any type or modality of identification input. In further example, data is validated if it improves the accuracy or capability of embedding models.

According to one aspect, it is realized that there is also a need for an authentication solution that provides operations on encrypted biometric/identification information, and that incorporates in various implementation a plurality of authentication and/or validation improvements. By combining machine learning models that improve training data sets, the subsequent models that employ encrypted identification information can be improved while operating in an encrypted space. Various examples of a privacy-enabled biometric system provide for scanning of authentication credentials (e.g., one or more or multiple biometrics and/or one or more user behavioral (e.g., physical or logical) characteristics) to determine matches or closeness on encrypted authentication information. In some examples, the encrypted authentication information is generated by a neural network tailored to a plain text authentication credential that outputs a measurable (e.g., Euclidean, distance, or other geometric function (e.g., cosine, etc.) and encrypted representation. The output of such a first "generation" neural network (as it generates encrypted representations) can be used to train a second classification network. Once trained the second classification network can then authenticate (e.g., predict matches) on an encrypted authentication credential input. Pairs of generation networks and classification networks can be configured to handle various authentication information modalities. Additionally, one set of generation networks and classification networks can be configured to handle one or more biometric factors. For example, facial image biometrics can be processed by tailored first and classification networks, voice credentials can be processed by a different set of first and classification networks, behavioral credentials can be processed by yet other sets of first and classification networks.

According to various aspects, a fully private identity system can also be implemented to support a unique web browser and/or mobile client for user identification and/or authentication, where identity and/or authentication can be based, at least in part, on acquired biometric, behavioral, and/or other authentication information. In various embodiments, the system transforms enrolled authentication information into fully private (e.g., encrypted) authentication information using neural networks to output transformed and fully private authentication information. The fully private authentication information is then used to train classification neural networks to predict matches on the fully private authentication information. In further embodiments, the classification networks enable search and matching on the encrypted authentication information, delivering an end-to-end fully private authentication system, as well as options for integration with various security features of the fully private authentication system.

In some examples, the system is configured to execute high-throughput, high-demand identification tasks with nearly unlimited asynchronous throughput for identification on face, face with mask, fingerprint and voice, among other authentication information options. In further examples, enrollment and/or authentication can occur on additional authentication information. According to one embodiment, once trained, the classification networks can execute identification that can be implemented on elastic, load-balanced, fault-tolerant Kubernetes clusters, among other options. In still other examples, the private identity system can incorporate an ensemble of pre-trained neural networks (e.g., TensorFlow models) that are specially configured and trained to detect and recognize faces (e.g., output a determination within 50 ms), fingerprints (e.g., output a determination within 50 ms), voices (e.g., output a determination within 100 ms), and/or behavior, all with high accuracy (e.g., >99%).

In further aspects, the fully private authentication system can be configured to leverage a plurality of helper neural networks (e.g., a plurality of neural networks (e.g., deep neural networks (e.g., DNNs)), where sets of helper networks can be trained to acquire and transform biometric values or types of biometrics to improve biometric capture, increase accuracy, reduce training time for classification networks, eliminate vulnerabilities (e.g., liveness checking and validation). Specific helper networks can be configured to accurately capture facial image information in picture or video. For example, a facial recognition helper network can be configured to transform image information into geometric primitives, measure relative position or other parameters associated facial characteristics (e.g., eyes, mouth, nose, chin, etc.) to improve capture and validation of authentication information. In another example, a fingerprint helper network can be executed to transform captured information into geometrics primitives to facilitate location of fingerprint data for enrollment.

According to one aspect, a system for privacy-enabled identification or authentication is provided. The system comprises at least one processor operatively connected to a memory; an authentication data gateway, executed by the at least one processor, configured to filter identification information, the authentication data gateway comprising at least a first pre-trained validation helper network associated with a first authentication modality configured to process identification information of a first authentication type, and validate the input identification information of the first type or reject the identification information of the first type; and an authentication subsystem configured to generate with an embedding network encrypted feature vectors for identifying or authenticating respective users based on input of the filtered identification information to the embedding network, and train a classification network on the encrypted feature vectors and labels associated with the respective users. According to one embodiment, the authentication data gateway is configured to filter bad authentication data from training data sets used to build embedding network models. According to one embodiment, the first pre-trained validation helper network is trained on evaluation criteria independent of the subject seeking to be enrolled or authenticated. According to one embodiment, the authentication data gateway further comprises a plurality of validation helper networks each associated with a respective type of identification information, wherein each of the plurality of validation helper networks generate a binary evaluation of respective authentication inputs to establish validity. According to one embodiment, the first pre-trained validation helper network is configured to process an image input as identification information, and output a probability that the image input is invalid. According to one embodiment, the first pre-trained validation helper network is configured to process an image input as identification information, and output a probability that the image input is a presentation attack. According to one embodiment, the first pre-trained validation helper network is configured to process a video input as identification information and output a probability that the video input is invalid. According to one embodiment, the first pre-trained validation helper network is configured to process a video input as identification information and output a probability that the video input is a presentation attack. According to one embodiment, the authentication data gateway is configured to determine if an identification information input improves training set entropy as part of filtering. According to one embodiment, the authentication data gateway further comprises a first pre-trained geometry helper network configured to process identification information of a first type, accept as input plaintext identification information of the first type, and output processed identification information of the first type. According to one embodiment, the first pre-trained validation helper network is configured to accept the output of the first pre-trained geometry helper neural network.

According to one aspect, a computer implemented method for privacy-enabled authentication is provided. The method comprises filtering, by at least one processor, invalid identification information; executing by the at least one processor, a first pre-trained validation helper network; accepting, by the first pre-trained validation helper network, identification information of a first type; validating the input identification information of the first type or rejecting the identification information of the first type; generating with an embedding network encrypted feature vectors for identifying or authenticating respective users based on input of filtered identification information to the embedding network; and training a classification network on the encrypted feature vectors and labels associated with the respective users. According to one embodiment, the method further comprises filtering bad authentication data. According to one embodiment, the method further comprises training the first pre-trained validation helper network on evaluation criteria independent of the subject seeking to be enrolled or authenticated. According to one embodiment, the method further comprises executing a plurality of validation helper networks each associated with a respective type of identification information, and generating a binary evaluation of respective authentication inputs by respective ones of the plurality of validation helper networks to establish validity. According to one embodiment, the method further comprises executing at least a first geometry helper network a configured to process identification information of the first type. According to one embodiment, the method further comprises processing, by the first pre-trained validation helper network an image input as identification information, and output a probability that the image input is invalid. According to one embodiment, the method further comprises processing an image input as identification information, and generating a probability that the image input is a presentation attack, by the first pre-trained validation helper network. According to one embodiment, the method further comprises processing, by the first pre-trained validation helper network, a video input as identification information and generating, by the first pre-trained validation helper network, a probability that the video input is invalid, by the first pre-trained validation helper network. According to one embodiment, the method further comprises processing, by the first pre-trained validation helper network, a video input as identification information and generating, the first pre-trained validation helper network, a probability that the video input is a presentation attack. According to one embodiment, the method further comprises determining if an identification information input improves training set entropy.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

Figure 5B:
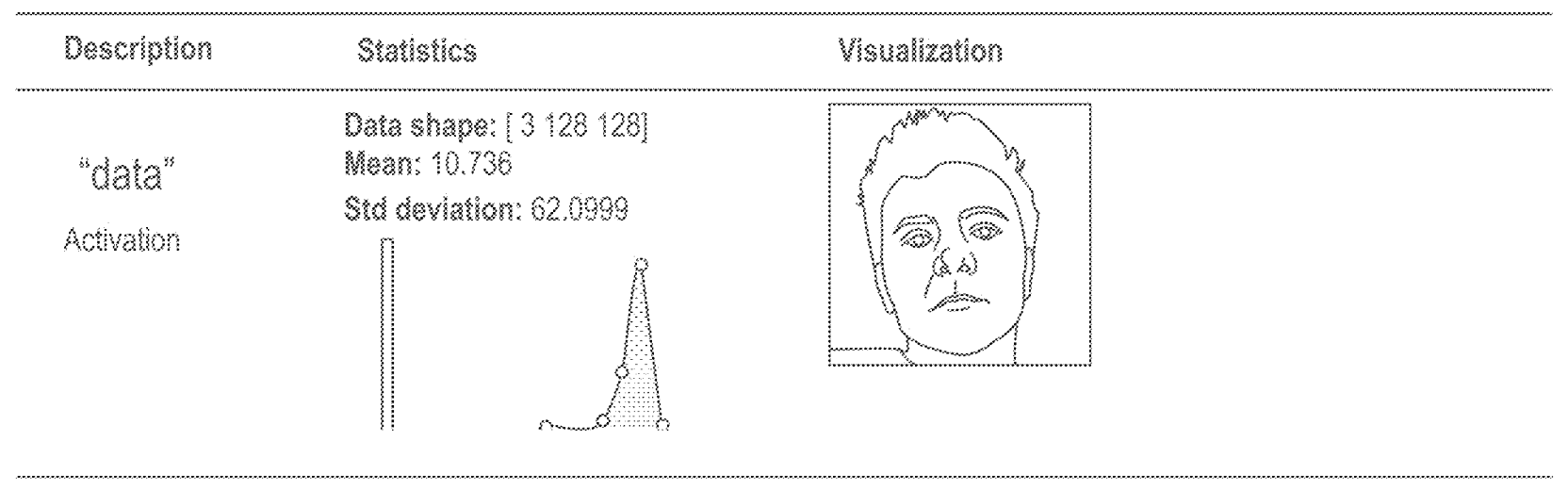

FIGS. 5A-D illustrate example processing steps and example outputs during identification, according to one embodiment;

FIG. 8A-B is a table showing comparative considerations of example implementation, according to various embodiments;

FIG. 12-13 illustrate execution timing during operation with accuracy percentages for the respective example;

DETAILED DESCRIPTION

Figure 1:
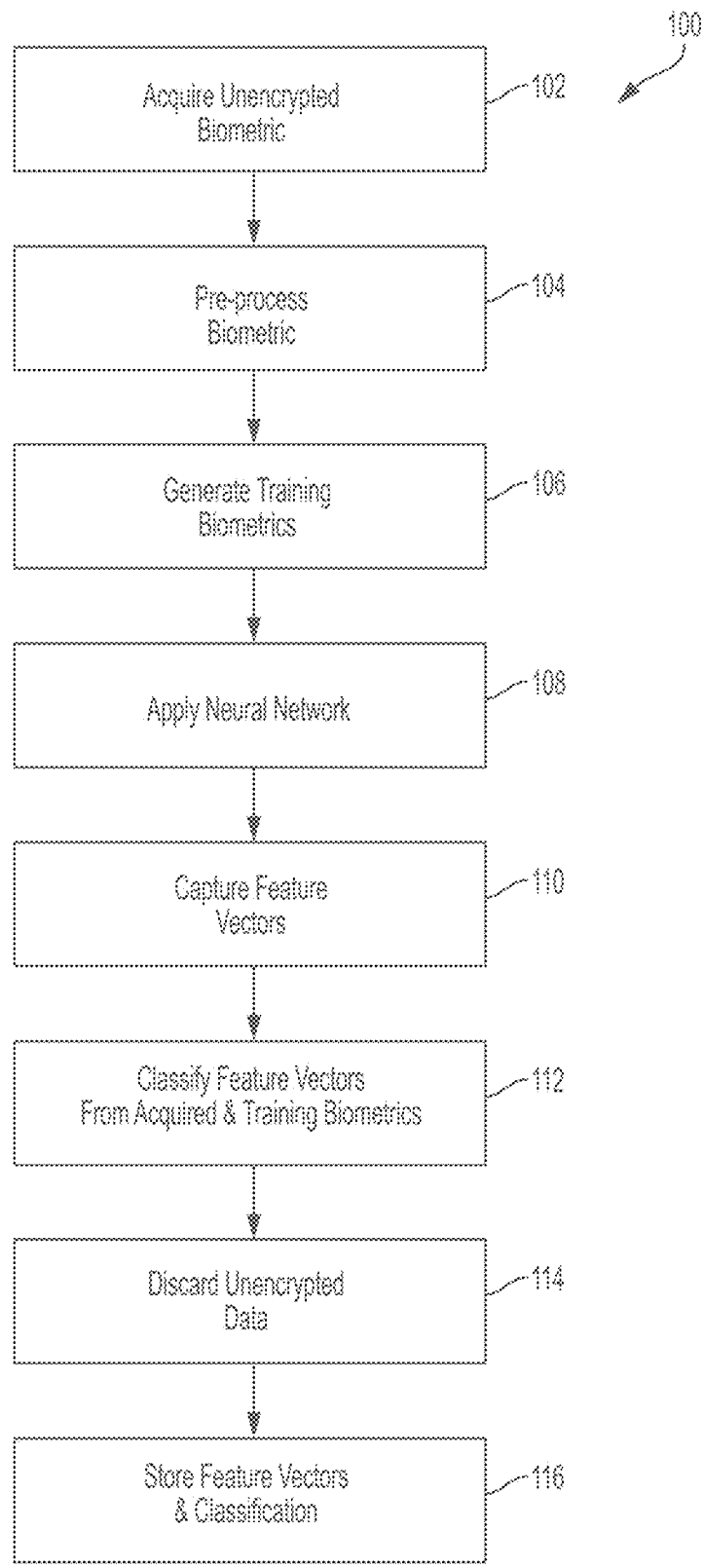
FIG. 1 is an example process flow for classifying biometric information, according to one embodiment.

Various embodiments of a privacy-enabled biometric system are configured to enable encrypted authentication procedures in conjunction with various authentication credentials (e.g., biometric and/or behavioral information). For example, the handling of biometric information includes capture of unencrypted biometrics that are used to generate encrypted forms (e.g., encrypted feature vectors via a generation neural network). The system uses the encrypted forms for subsequent processing, and in various embodiments discards any unencrypted version of the biometric data—thus providing a fully private authentication system. For example, the system can provide for scanning of multiple encrypted biometrics (e.g., one to many prediction) to determine authentication (e.g., based on matches or closeness). Further embodiments can provide for search and matching across multiple types of encrypted authentication (e.g., biometric and/or behavioral) information (e.g., based on respective neural networks configured to process certain biometric information) improving accuracy of validation over many conventional approaches, while improving the security over the same approaches.

According to one aspect, a private authentication system can invoke multi-phase authentication methodologies. In a first phase of enrollment, users' unencrypted authentication information is converted to encrypted form. According to various embodiments, the users unencrypted authentication data is input into neural networks configured to process the respective biometric input (e.g., voice, face, image, health data, retinal scan, fingerprint scan, etc.). In various embodiments, the generation neural networks are configured to generate one-way encryptions of the biometric data. In various examples, the encryptions are one-way homomorphic encryptions. The encrypted output(s) of the neural network(s) (or, for example, intermediate values created by the generation neural networks as one-way homomorphic encryptions) can be measurable (e.g., Euclidean or cosine, among other options) encryptions of the authentication information (e.g., biometric and/or behavioral) information which are stored for later comparison. For example, the respective generation networks can be configured to generate homomorphic one-way encryptions of associated authentication information. The generated outputs encrypted output are configured to be measurable (e.g., Euclidean, geometric, distance, and/or cosine measurable, among other options)>

For a given user, the generated encrypted values can now be used for subsequent authentication. Subsequent authentication can include comparisons of encrypted values, and use of encrypted values to train classification networks. For example, the system can compare a newly created encrypted feature vector to the encrypted feature vectors stored on the system in a comparison. If the distance between the encrypted values is within a threshold, the user is deemed authenticated or more generally, that a valid match results.

In a second phase of operation, the enrollment process uses the generated encrypted biometrics (e.g., distance measurable encrypted feature vectors) to train a second neural network (e.g., a deep neural network or fully connected neural network—described in greater detail below). The second neural network accepts as input encrypted feature vectors (e.g., distance measurable feature vectors, Euclidean measurable feature vectors, homomorphic encrypted feature vectors, cosine measures, etc.) and label inputs during training. Once trained the second neural network (e.g., encrypted classification network) accepts encrypted feature vectors and returns identification labels (or, for example, an unknown result). According to various embodiments, the phases of operation are complimentary and can be used sequentially, alternatively, or simultaneously, among other options. For example, the first phase can be used to prime the second phase for operation, and can do so repeatedly. Thus, a first enrollment may use the first phase to generate encrypted feature vectors for training a first DNN of the second phase. In further embodiments, generation of encrypted feature vectors can be supported by execution of various helper networks. These specially configured helper networks can be architected based on the type of authentication information/credential to be processed (e.g., face image helper network, face+mask helper network, mask on/off detection helper network, eyeglasses on/off detection helper network, fingerprint helper validation network, eye geometry helper network, eyes open/closed detection helper network, etc.), In various embodiments, the helper networks are configured to: improve processing of authentication credentials, for example, to eliminate noise in processed credentials; ensure valid credentials are captured, including for example, quality processing; ensure proper credentials are captured, for example, based on liveness validation (e.g., not spoofed credential submission), detect presentation attacks, among other options.

Once trained on the generated encrypted authentication information the first DNN can be used for subsequent authentication. In another example, the system can accept new users or enroll additional authentication information, which triggers the first phase again to generate encrypted feature vectors. This can occur while the first DNN continues to execute its authentication functions.

A second DNN can be trained on the new authentication information, and may also be trained on the old authentication information of the first DNN. For example, the system can use the first DNN to handle older users, and the second DNN to handle newer users. In another example, the system can switch over to the second DNN trained on the collective body of authentication information (e.g., old and new encrypted feature vectors). Various embodiments use different transition protocols between and amongst the first and second phases of authentication. For example, the system can invoke multiple threads one for each authentication type (e.g., fast or deep learning), and may further invoke multiple threads within each authentication type.

Thus in some embodiments, a distance metric store can be used in an initial enrollment phase to permit quick establishment of user authentication credentials so that a more sophisticated authentication approach can be trained in the background (e.g., a DNN can be trained on encrypted feature vectors (e.g., Euclidean measurable feature vectors, distance measurable feature vectors, homomorphic encrypted feature vectors, etc.) and identification labels, so that upon input of an encrypted feature vector the DNN can return an identification label (or unknown result, where applicable)). The authentication system can also be configured to integrate liveness testing protocols to ensure that biometric information is being validly submitted (e.g., and not spoofed).

According to another aspect, post-classification validation can be implemented to significantly improve prediction accuracy over conventional authentication systems. According to one embodiment, a privacy enabled authentication system can use any number of first neural networks to accept plaintext authentication credentials of various types and generate distance measurable encrypted authentication credentials as output of the respective networks. The "generation" networks that generate encrypted embeddings can be paired with respective classifications networks trained on the respective outputs of the generation networks. In some settings, as the number of trained classes increases for the classification network, prediction accuracy of the classification networks can be reduced. In some aspects, if a low probability match is returned by the classification network, an additional validation can be executed by the authentication system. According to one embodiment, once the classification network returns an output (e.g., an array of values indicating probability of match to a label/class) a post-classification validation can be executed.

According to one embodiment, responsive to generating a prediction by the classification network, the system is configured to execute a validation of the results. In one embodiment, validation can be executed on the closest match or a plurality of closest matches identified by the classification network. For example, an encrypted authentication credential can be input into the classification network, and the classification network can output an array of probabilities that the input matches to trained labels in the network. According to some embodiments, where the elements of the array do not meet a threshold for valid identification, the system can be configured to execute subsequent validation. For example, the system can use the closest matches determined by the classification network (e.g., 1, 2, 3, 4, 5 or more) or the highest probability matches, retrieve the encrypted authentication credential associated with the closest matches and execute a distance based evaluation on the input encrypted authentication credential submitted to the classification network.

In further embodiments, the validation functionality can be executed by the system to confirm prediction results that meet thresholds for matching as well as for prediction results below any threshold.

Validation functions can be used in conjunction with the examples and embodiments discussed below, and the various functions discussed with respect to the examples and embodiments. According to some embodiments, the system is configured to provide one to many search and/or matching on encrypted authentication credentials (e.g., biometrics and/or behavioral measurements) in polynomial time. According to one embodiment, the system takes input biometrics and transforms the input biometrics into feature vectors (e.g., a list of floating point numbers (e.g., 64, 128, 256, or within a range of at least 64 and 10240, although some embodiments can use more feature vectors)). In other embodiments, the system transforms authentication credential input into encrypted feature vectors. According to various embodiments, the number of floating point numbers in each list depends on the machine learning model being employed to process input (e.g., biometric information). For example, the known FACENET model by GOOGLE generates a feature vector list of 128 floating point numbers, but other embodiments use models with different feature vectors and, for example, lists of floating point numbers.

According to various embodiments, the biometrics processing model (e.g., a deep learning convolution network (e.g., for images and/or faces)) is configured such that each feature vector is distance or Euclidean measurable when output. In one example, the input (e.g., the biometric) to the model can be encrypted using a neural network to output a homomorphic encrypted value.

In another example, the inventors have created a first neural network for processing plain or unencrypted voice input. The voice neural network is used to accept unencrypted voice input and to generate embeddings or feature vectors that are encrypted and Euclidean measurable for use in training another neural network. In various embodiments, the first voice neural network generates encrypted embeddings that are used to train a second neural network, that once trained can generate predictions on further voice input (e.g., match or unknown). In one example, the second neural network (e.g., a deep neural network—DNN) is trained to process unclassified voice inputs for authentication (e.g., predicting a match). In some embodiments, the feature vectors generated for voice can be a list of 64 floating point numbers, but similar ranges of floating points numbers to the FACENET implementations (discussed in greater detail below) can also be used (e.g., 32 floating point numbers up to 10240 floating point numbers, among other options).

In yet another example, the system includes a first neural network configured to process plain or unencrypted behavioral information (e.g., behavioral biometric and/or behavior information (see e.g., Table XI)) and output distance measurable encryptions of the same. The output of the behavioral first network can then be used to train a second network.

According to one aspect, by executing on embedding or feature vectors that are encrypted and distance or Euclidean measurable the system produces and operates in a privacy preserving manner. These encryptions (e.g., one-way homomorphic encryptions) can be used in encrypted operations (e.g., addition, multiplication, comparison, etc.) without knowing the underlying plaintext value. Thus, the original or input biometric can simply be discarded, and does not represent a point of failure for security thereafter. In further aspects, implementing one-way encryptions eliminates the need for encryption keys that can likewise be compromised. This is a failing of many convention systems.

According to various aspects, the privacy enabled with encrypted biometrics can be further augmented with liveness detection to prevent faked or spoofed biometric credentials from being used. According to some embodiments, the system can analyze an assurance factor derived from randomly selected instances (e.g., selected by the system) of a biometric input, to determine that input biometric information matches the set of randomly selected instances of the biometric input. The assurance factor and respective execution can be referred to as a "liveness" test. According to various embodiments, the authentication system can validate the input of biometric information for identity and provide assurance the biometric information was not faked via liveness testing.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 7:
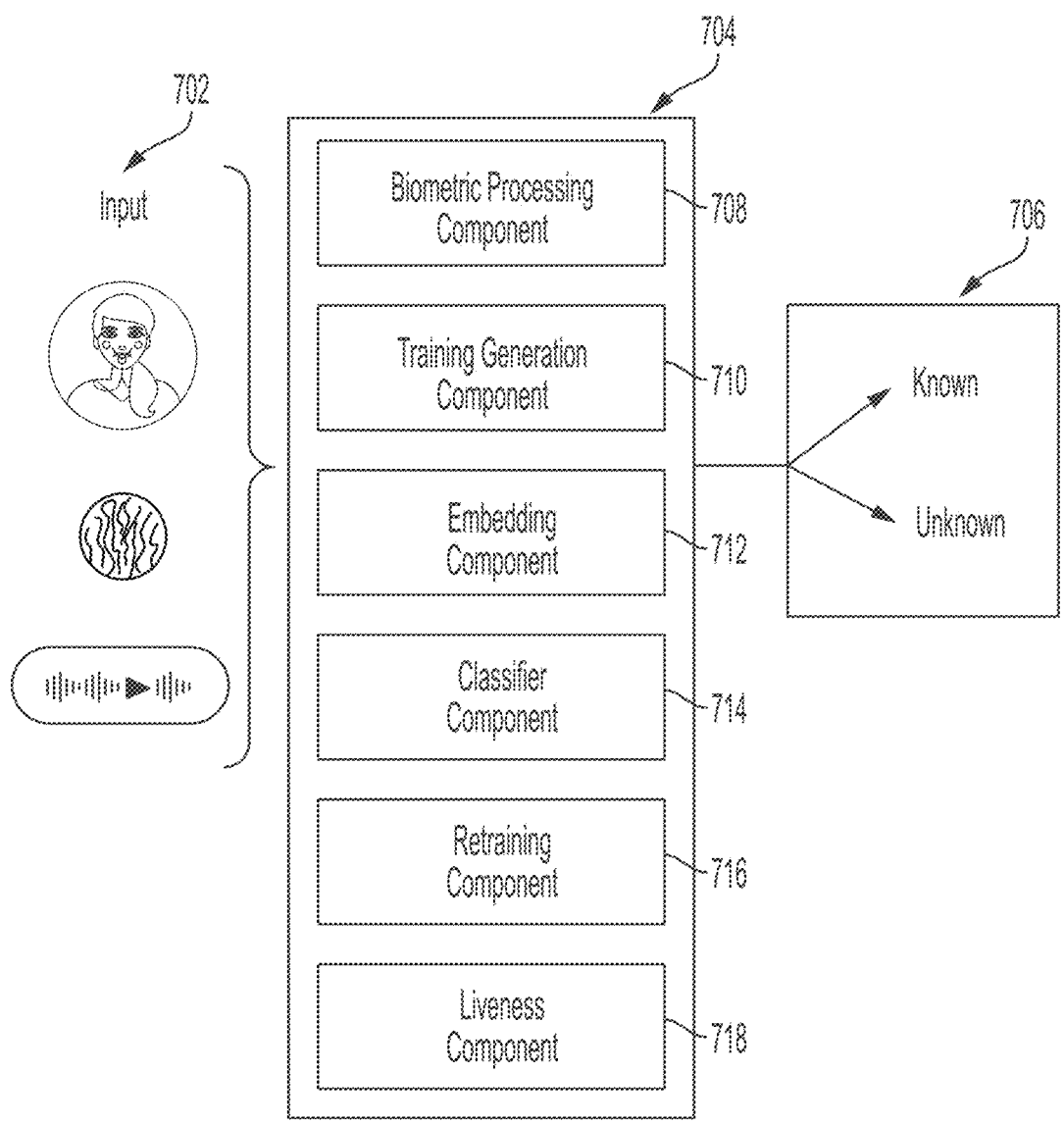
FIG. 7 is a block diagram of an embodiment of a privacy-enabled biometric system with liveness validation, according to one embodiment.

FIG. 7 is a block diagram of an example privacy-enabled biometric system 704 with liveness validation. According to some embodiments, the system can be installed on a mobile device or called from a mobile device (e.g., on a remote server or cloud based resource) to return an authenticated or not signal. In further embodiments, the system can include a web based client or application that provides fully private authentication services. In various embodiments, system 704 can execute any of the following processes. For example, system 704 can enroll users (e.g., via process 100), identify enrolled users (e.g., process 200) and/or include multiple enrollment phases (e.g., distance metric evaluation and fully encrypted input/evaluation), and search for matches to users (e.g., process 250). In various embodiments, system 704 includes multiple pairs of neural networks, and any associated number of helper networks to provide improve data sets used is later identification/authentication, including, for example with the paired neural networks. In some embodiments, each pair includes a processing/generating neural network for accepting an unencrypted authentication credential (e.g., biometric input (e.g., images or voice, etc.), behavioral input (e.g., health data, gesture tracking, eye movement, etc.) and processing to generate an encrypted embedding or encrypted feature vector. Each pair of networks can also include a classification neural network than can be trained on the generated encrypted feature vectors to classify the encrypted information with labels, and that is further used to predict a match to the trained labels or an unknown class based on subsequent input of encrypted feature vectors to the trained network. According to some embodiments, the predicted match(es) can be validated by comparing the input to the classification network (e.g., encrypted embedding/feature vector) against encrypted embedding/feature vectors of the identified match(es). Various distance metrics can be used to compare the encrypted embeddings, including, least squares analysis, L2 analysis, distance matrix analysis, sum of-squared-errors, cosine measure, etc.

In various embodiments, authentication capture and/or validation can be augmented by a plurality of helper networks configured to improve identification of information to capture from provided authentication information, improve validation, improve authentication entropy, among other options. The authentication architecture can be separated in various embodiments. For example, the system can be configured with a trained classification neural network and receive from another processing component, system, or entity, encrypted feature vectors to use for prediction with the trained classification network.

In further example, the system configured to generate encrypted authentication information can be coupled with various helper networks configured to facilitate capture and processing of the unencrypted authentication information into filtered data that can be used in generating one-way encryptions. According to various embodiments, system 704 can accept, create or receive original biometric information (e.g., input 702). The input 702 can include images of people, images of faces, thumbprint scans, voice recordings, sensor data, etc. Further, the voice inputs can be requested by the system, and correspond to a set of randomly selected biometric instances (including for example, randomly selected words) as part of liveness validation. According to various embodiments, the inputs can be processed for identity matching and in conjunction the inputs can be analyzed to determine matching to the randomly selected biometric instances for liveness verification. As discussed above, the system 704 can also be architected to provide a prediction on input of an encrypted feature vector, and another system or component can accept unencrypted biometrics and/or generate encrypted feature vectors, and communicate the same for processing.

According to one embodiment, the system can include a biometric processing component 708. A biometric processing component (e.g., 708) can be configured to crop received images, sample voice biometrics, eliminate noise from microphone captures, etc., to focus the biometric information on distinguishable features (e.g., automatically crop image around face, eliminate background noise for voice sample, normalized health data received, generate samples of received health data, etc.). Various forms of pre-processing can be executed on the received biometrics, and the pre-processing can be executed to limit the biometric information to important features or to improve identification by eliminating noise, reducing an analyzed area, etc. In some embodiments, the pre-processing (e.g., via 708) is not executed or not available. In other embodiments, only biometrics that meet quality standards are passed on for further processing.

According to further embodiments, the system can also include a plurality of neural networks that facilitate processing of plaintext authentication information and the transformation of the same into fully private or one-way encrypted authentication information.

Processed biometrics can also be used to generate additional training data, for example, to enroll a new user, and/or train a classification component/network to perform predictions. According to one embodiment, the system 704 can include a training generation component 710, configured to generate new biometrics for use in training to identify a user. For example, the training generation component 710 can be configured to create new images of the user's face or voice having different lighting, different capture angles, etc., different samples, filtered noise, introduced noise, etc., in order to build a larger training set of biometrics. In one example, the system includes a training threshold specifying how many training samples to generate from a given or received biometric. In another example, the system and/or training generation component 710 is configured to build twenty five additional images from a picture of a user's face. Other numbers of training images, or voice samples, etc., can be used. In further examples, additional voice samples can be generated from an initial set of biometric inputs to create a larger set of training samples for training a voice network (e.g., via 710).

In some other embodiments, the training generation component can include a plurality of helper networks configured to homogenize input identification/authentication information based on a credential modality (e.g., face biometric data, voice biometric data, behavioral data, etc.).

According to one embodiment, the system is configured to generate encrypted feature vectors from an identification/authentication information input (e.g., process images from input and/or generated training images, process voice inputs and/or voice samples and/or generated training voice data, among other options). In various embodiments, the system 704 can include an embedding component 712 configured to generate encrypted embeddings or encrypted feature vectors (e.g., image feature vectors, voice feature vectors, health data feature vectors, etc.). The terms authentication information input can be used to referred to information used for identification, for identification and authentication, and for authentication, and each implementation is contemplated, unless other context requires.

According to one embodiment, component 712 executes a convolution neural network ("CNN") to process image inputs (and for example, facial images), where the CNN includes a layer which generates geometrically (e.g., distance, Euclidean, cosine, etc.) measurable output. The embedding component 712 can include multiple neural networks each tailored to specific biometric inputs, and configured to generate encrypted feature vectors (e.g., for captured images, for voice inputs, for health measurements or monitoring, etc.) that are distance measurable. According to various embodiments, the system can be configured to required biometric inputs of various types, and pass the type of input to respective neural networks for processing to capture respective encrypted feature vectors, among other options. In various embodiments, one or more processing neural networks is instantiated as part of the embedding component 712, and the respective neural network process unencrypted biometric inputs to generate encrypted feature vectors.

In one example, the processing neural network is a convolutional neural network constructed to create encrypted embeddings from unencrypted biometric input. In one example, encrypted feature vectors can be extracted from a neural network at the layers preceding a softmax layer (including for example, the n−1 layer). As discussed herein, various neural networks can be used to define embeddings or feature vectors with each tailored to an analyzed biometric (e.g., voice, image, health data, etc.), where an output of or with the model is Euclidean measurable. Some examples of these neural network include a model having a softmax layer. Other embodiments use a model that does not include a softmax layer to generate Euclidean measurable feature vectors. Various embodiments of the system and/or embedding component are configured to generate and capture encrypted feature vectors for the processed biometrics in the layer or layer preceding the softmax layer.

Optional processing of the generated encrypted biometrics can include filter operations prior to passing the encrypted biometrics to classifier neural networks (e.g., a DNN). For example, the generated encrypted feature vectors can be evaluated for distance to determine that they meet a validation threshold. In various embodiments, the validation threshold is used by the system to filter noisy or encrypted values that are too far apart.

According to one aspect, filtering of the encrypted feature vectors improves the subsequent training and prediction accuracy of the classification networks. In essence, if a set of encrypted embeddings for a user are too far apart (e.g., distances between the encrypted values are above the validation threshold) the system can reject the enrollment attempt, request new biometric measurements, generate additional training biometrics, etc.

Each set of encrypted values can be evaluated against the validation threshold and values with too great a distance can be rejected and/or trigger requests for additional/new biometric submission. In one example, the validation threshold is set so that no distance between comparisons (e.g., of face image vectors) is greater than 0.85. In another example, the threshold can be set such that no distance between comparisons is greater than 1.0. Stated broadly, various embodiments of the system are configured to ensure that a set of enrollment vectors are of sufficient quality for use with the classification DNN, and in further embodiments configured to reject enrollment vectors that are bad (e.g., too dissimilar).

According to some embodiments, the system can be configured to handle noisy enrollment conditions. For example, validation thresholds can be tailored to accept distance measures of having an average distance greater than 0.85 but less than 1 where the minimum distance between compared vectors in an enrollment set is less than 0.06. Different thresholds can be implemented in different embodiments, and can vary within 10%, 15% and/or 20% of the examples provided. In further embodiments, each authentication credential instance (e.g., face, voice, retina scan, behavioral measurement, etc.) can be associated with a respective validation threshold. Additionally, the system can use identification thresholds that are more constrained than the validation threshold. For example, in the context of facial identification, the system can require a validation threshold of no greater than a Euclidean distance of 1 between enrollment face images of an entity to be identified. In one example, the system can be configured to require better precision in actual identification, and for example, that the subsequent authentication/identification measure be within 0.85 Euclidean distance to return a match.

According to some embodiments, the system 704 can include a classifier component 714. The classifier component can include one or more deep neural networks trained on encrypted feature vector and label inputs for respective users and their biometric inputs. The trained neural network can then be used during prediction operations to return a match to a person (e.g., from among a group of labels and people (one to many matching) or from a singular person (one to one matching)) or to return a match to an unknown class.

During training of the classifier component 714, the feature vectors from the embedding component 712 or system 704 are used by the classifier component 714 to bind a user to a classification (i.e., mapping biometrics to a matchable/searchable identity). According to one embodiment, a deep learning neural network (e.g., enrollment and prediction network) is executed as a fully connected neural network ("FCNN") trained on enrollment data. In one example, the FCNN generates an output identifying a person or indicating an UNKNOWN individual (e.g., at 706). Other examples can implement different neural networks for classification and return a match or unknown class accordingly. In some examples, the classifier is a neural network but does not require a fully connected neural network.

According to various embodiments, a deep learning neural network (e.g., which can be an FCNN) must differentiate between known persons and the UNKNOWN. In some examples, the deep learning neural network can include a sigmoid function in the last layer that outputs probability of class matching based on newly input biometrics or that outputs values showing failure to match. Other examples achieve matching based on executing a hinge loss function to establish a match to a label/person or an unknown class.

In further embodiments, the system 704 and/or classifier component 714 are configured to generate a probability to establish when a sufficiently close match is found. In some implementations, an unknown person is determined based on negative return values (e.g., the model is tuned to return negative values for no match found). In other embodiments, multiple matches can be developed by the classifier component 714 and voting can also be used to increase accuracy in matching.

Various implementations of the system (e.g., 704) have the capacity to use this approach for more than one set of input. In various embodiments, the approach itself is biometric agnostic. Various embodiments employ encrypted feature vectors that are distance measurable (e.g., Euclidean, homomorphic, one-way encrypted, etc.), generation of which is handled using the first neural network or a respective first network tailored to a particular biometric.

In some embodiments, the system can invoke multiple threads or processes to handle volumes of distance comparisons. For example, the system can invoke multiple threads to accommodate an increase in user base and/or volume of authentication requests. According to various aspects, the distance measure authentication is executed in a brute force manner. In such settings, as the user population grows so does the complexity or work required to resolve the analysis in a brute force (e.g., check all possibilities (e.g., until match)) fashion. Various embodiments are configured to handle this burden by invoking multiple threads, and each thread can be used to check a smaller segment of authentication information to determine a match.

In some examples, different neural networks are instantiated to process different types of biometrics. Using that approach the vector generating neural network may be swapped for or use a different neural network in conjunction with others where each is capable of creating a distance measurable encrypted feature vector based on the respective biometric. Similarly, the system may enroll on both or greater than multiple biometric types (e.g., use two or more vector generating networks) and predict on the feature vectors generated for both types of biometrics using both neural networks for processing respective biometric types, which can also be done simultaneously. In one embodiment, feature vectors from each type of biometric can likewise be processed in respective deep learning networks configured to predict matches based on the feature vector inputs (or return unknown). The co-generated results (e.g., one from each biometric type) may be used to identify a user using a voting scheme and may better perform by executing multiple predictions simultaneously. For each biometric type used, the system can execute multi-phase authentication approaches with a first generation network and distance measures in a first phase, and a network trained on encrypted feature vectors in a second phase. At various times each of the phases may be in use—for example, an enrolled user can be authenticated with the trained network (e.g., second phase), while a newly enrolling user is enrolled and/or authenticated via the generation network and distance measure phase.

In some embodiments, the system can be configured to validate an unknown determination. It is realized that accurately determining that an input to the authentication system is an unknown is an unsolved problem in this space. Various embodiments leverage the deep learning construction (including, for example, the classification network) described herein to enable identification/return of an unknown result. In some embodiments, the DNN can return a probability of match that is below a threshold probability. If the result is below the threshold, the system is configured to return an unknown result. Further embodiments leverage the distance store to improve the accuracy of the determination of the unknown result. In one example, upon a below threshold determination output from the DNN, the system can validate the below threshold determination by performing distance comparison(s) on the authentication vectors and the vectors in the distance store for the most likely match (e.g., greatest probability of match under the threshold).

According to another aspect, generating accurate (e.g., greater than 90% accuracy in example executions described below) identification is only a part of a complete authentication system. In various embodiments, identification is coupled with liveness testing to ensure that authentication credential inputs are not, for example, being recorded and replayed for verification or faked in another manner. For example, the system 704 can include a liveness component 718. According to one embodiment, the liveness component can be configured to generate a random set of biometric instances that the system requests a user submit. The random set of biometric instances can serve multiple purposes. For example, the biometric instances provide a biometric input that can be used for identification, and can also be used for liveness (e.g., validate matching to random selected instances). If both tests are valid, the system can provide an authentication indication or provide access or execution of a requested function. Further embodiments can require multiple types of biometric input for identification, and couple identification with liveness validation. In yet other embodiments, liveness testing can span multiple biometric inputs as well.

According to one embodiment, the liveness component 718 is configured to generate a random set of words that provide a threshold period of voice data from a user requesting authentication. In one example, the system is configured to require a five second voice signal for processing, and the system can be configured to select the random biometric instances accordingly. Other thresholds can be used (e.g., one, two, three, four, six, seven, eight, nine seconds or fractions thereof, among other examples), each having respective random selections that are associated with a threshold period of input.

According to other embodiments, liveness validation can be the accumulation of a variety of many authentication dimensions (e.g., biometric and/or behavioral dimensions). For example, the system can be configured to test a set of authentication credentials to determine liveness. In another example, the system can build a confidence score reflecting a level of assurance certain inputs are "live" or not faked. According to various embodiments, instead of using just one measure (e.g., voice) to test liveness, the system is configured to manage an ensemble model of many dimensions. As an example, the system can be configured to read a sentence from the screen (to prove he/she is alive)—but by using user behavior analytics ("UBA") the system can validate on an infinite number of additional metrics (additional dimensions) to determine a liveness score. In further embodiments, each factor being analyzed is also contributing to the user's identity score, too.

Various embodiments of the system are configured to handle multiple different behavioral inputs including, for example, health profiles that are based at least in part on health readings from health sensors (e.g., heart rate, blood pressure, EEG signals, body mass scans, genome, etc.), and can, in some examples, include behavioral biometric capture/processing. Once processed through a generation network as discussed herein, such UBA data becomes private such that no user actions or behaviors are ever transmitted across the internet in plain form.

According to various aspects, system is configured to manage liveness determinations based on an ensemble of models. In some embodiments, the system uses a behavioral biometric model to get an identity. In various embodiments, the system is configured to bifurcate processing in the following ways—any one test is a valid liveness measure and all the tests together make for a higher measure of confidence the system has accurately determined the user's identity. In further aspects, each test of liveness provides a certain level of confidence a user is being properly identified, and each additional test of liveness increases that level of confidence, in essence stepping up the strength of the identification. Some embodiments can require different levels of authentication confidence to permit various actions— and more secure or risky actions can require ever increasing confidence thresholds.

According to further embodiments, the system (e.g. 704) can be configured to incorporate new identification classes responsive to receiving new biometric information. In one embodiment, the system 704 includes a retraining component configured to monitor a number of new biometrics (e.g., per user/identification class or by a total number of new biometrics) and automatically trigger a re-enrollment with the new feature vectors derived from the new biometric information (e.g., produced by 712). In other embodiments, the system can be configured to trigger re-enrollment on new feature vectors based on time or time period elapsing.

The system 704 and/or retraining component 716 can be configured to store feature vectors as they are processed, and retain those feature vectors for retraining (including for example feature vectors that are unknown to retrain an unknown class in some examples). Various embodiments of the system are configured to incrementally retrain the classification model (e.g., classifier component 714 and/or a DNN) on system assigned numbers of newly received biometrics. Further, once a system set number of incremental re-trainings have occurred the system is further configured to complete a full retrain of the model.

According to various aspects, the incremental retrain execution avoids the conventional approach of fully retraining a neural network to recognize new classes and generate new identifications and/or to incorporate new feature vectors as they are input. Incremental retraining of an existing model to include a new identification without requiring a full retraining provides significant execution efficiency benefits over conventional approaches.

According to various embodiments, the variables for incremental retraining and full retraining can be set on the system via an administrative function. Some defaults include incremental retrain every 3, 4, 5, 6, etc., identifications, and full retrain every 3, 4, 5, 6, 7, 8, 9, 10, etc., incremental retrains. Additionally, this requirement may be met by using calendar time, such as retraining once a year. These operations can be performed on offline (e.g., locked) copies of the model, and once complete, the offline copy can be made live.

Additionally, the system 704 and/or retraining component 716 is configured to update the existing classification model with new users/identification classes. According to various embodiments, the system builds a classification model for an initial number of users, which can be based on an expected initial enrollment. The model is generated with empty or unallocated spaces to accommodate new users. For example, a fifty user base is generated as a one hundred user model. This over allocation in the model enables incremental training to be executed and incorporated, for example, new classes without requiring fully retraining the classification model. When a new user is added, the system is and/or retraining component 716 is configured to incrementally retrain the classification model—ultimately saving significant computation time over convention retraining executions. Once the over allocation is exhausted (e.g., 100 identification classes) a full retrain with an additional over allocation can be made (e.g., fully retrain the 100 classes to a model with 150 classes). In other embodiments, an incremental retrain process can be executed to add additional unallocated slots.

Even with the reduced time retraining, the system can be configured to operate with multiple copies of the classification model. One copy may be live that is used for authentication or identification. A second copy may be an update version, that is taken offline (e.g., locked from access) to accomplish retraining while permitting identification operations to continue with a live model. Once retraining is accomplished, the updated model can be made live and the other model locked and updated as well. Multiple instances of both live and locked models can be used to increase concurrency.

According to some embodiments, the system 700 can receive feature vectors instead of original biometrics and processing original biometrics can occur on different systems—in these cases system 700 may not include, for example, 708, 710, 712, and instead receive feature vectors from other systems, components or processes.

Figure 14:
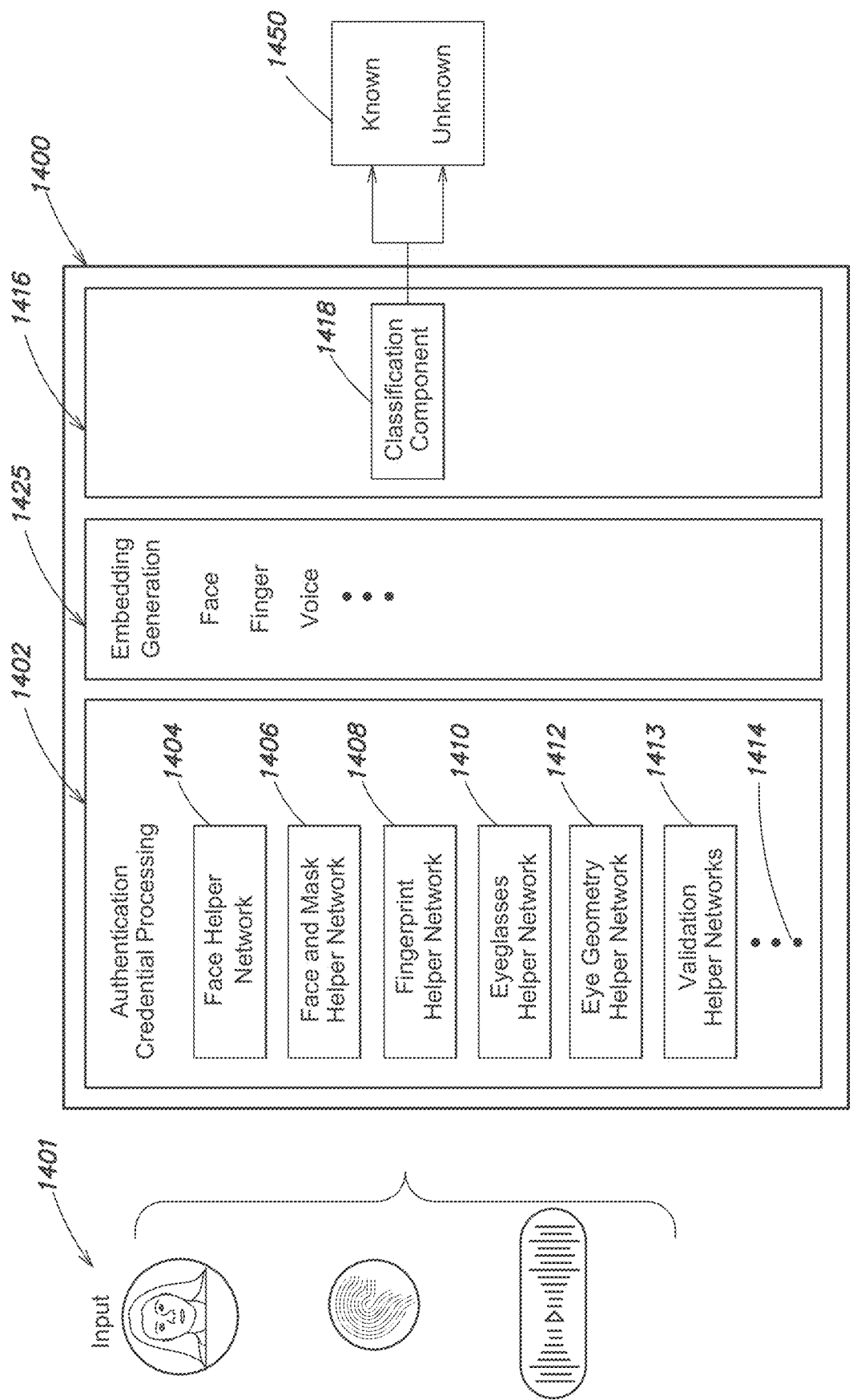
FIG. 14 is a block diagram of an example authentication system, according to one embodiment.

FIG. 14 is a block diagram of an example embodiment of an authentication system 1400 employing private biometrics with supporting helper networks. As shown in FIG. 8 the system can be configured to accept various authentication credentials in plain text or unencrypted form (e.g., 1401) processes the unencrypted authentication credentials (e.g., via an authentication credential processing component 1402), to ensure the input is valid and good for authentication. For example, a plurality of helper networks can process authentication input to determine validity before they a processed by embedding neural networks (e.g., 1425) into one-way homomorphic representations of the same, that can be analyzed by a classification component (e.g., 1418) to determine if submitted credentials matched enrolled credentials (e.g., return known for match or unknown at 1450), for example, with a neural network trained on encrypted feature vectors produced by the embedding networks. Evaluations of matches can be validated for example, with a validation component 1420 that is configured to provide validation function once matches or unknown results are determined. In further embodiments, the classification component can operate by itself and in others as a part of a classification subsystem 1416 that can also include various validation functions to confirm matches or unknown results.

Various embodiments include architectures that separate authentication credential processing (e.g., 1402) from operations of the classification subsystem (e.g., 1416), and other embodiments can provide either or both operations as a service-based architecture for authentication on private encryptions of authentication credentials.

The various functions, processes, and/or algorithms that can be executed by the authentication credential processing component 1402 are discussed throughout, and the various functions, processes, and/or algorithms that can be executed by the classification subsystem 1416 are also described with respect to the '014 application. FIG. 8 is included to provide some examples of helper networks and support functionality and/or algorithms that can be incorporated in the various examples, embodiments, and aspects disclosed herein. The following descriptions focus on the helper network functions to provide illustration, but are not limited to the examples discussed with FIG. 8.

For example, credential processing can include various helper networks (e.g., face 1404, face and mask 1406, fingerprint 1408, eyeglasses 1410, eye geometry 1412, and the " . . . " at 1414, and the preceding networks can each be associated with a validation network configured to determine the validity of the submitted/processed authentication instance. In some examples, geometry or processing networks (e.g., 1404 & 1408) are configured to identify relevant characteristics in respective authentication input (e.g., position of eyes in a face image, position of ridges in a fingerprint image respectively, etc.). The output of such networks is then validated by a validation network trained on that type of authentication input. The " . . . " at 1414 illustrates the option of including additional helper networks, and/or processing functions, where any number or combination of helper network can be used in any combination with various embodiments disclosed herein.

According to some embodiments, the helper networks can be based on similar neural network architectures, including, for example, Tensorflow models that are lightweight in size and processing requirements. In further examples, the helper networks can be configured to execute as part of a web-based client that incorporates pre-trained neural networks to acquire, validate, align, reduce noise, transform, test, and once validated to communicate validated data to embedding networks to produce, for example, one-way encrypt input authentication credentials. Unlike many conventional approaches, the lightweight helper networks can be universally employed by conventional browsers without expensive hardware or on-device training. In further example, the helper networks are configured to operate with millisecond response time on commercially available processing power. This is in contrast to many conventional approaches that require specialized hardware and/or on-device training, and still that fail to provide millisecond response time.

According to some embodiments, various helper networks can be based on deep neural network architectures, and in further examples, can employ you only look once ("YOLO") architectures. In further embodiments, the helper networks are configured to be sized in the range of 10 KB to 100 KB, and are configured to process authentication credentials in <10 ms with accuracies >99%. The data footprint of these helper network demonstrates improved capability over a variety of systems that provide authentication based on complex, bulky, and size intensive neural network architectures.

According to one aspect, each authentication credential modality requires an associated helper DNN—for example, for each biometric type one or more tailored helper networks can be instantiated to handle that biometric type. In one example, a face helper network and a fingerprint helper network (e.g., 1404 and 1408) can be configured to identify specific landmarks, boundaries, and/or other features appearing in input authentication credentials (e.g., face and fingerprint images respectively). Additional helper networks can include face and fingerprint validation models configured to determine that the submitted authentication credential is valid. Testing for validity can include determining that a submitted authentication credential is a good training data instance. In various embodiments, trained validation models are tailored during training so that validated outputs improve the entropy of the training data set, either expanding the circumstances in which trained models will authenticate correctly or refining the trained model to better distinguish between authentication classes and/or unknown results. In one example, distances metrics can be used to evaluate outputs of an embedding model. For example, valid instances improve the distance measure between dissimilar instances as well as to identify similar instances, and the validity networks can be trained to achieve this property.

In the context of image data, a validation helper network can identify if appropriate lighting and clarity is present. Other helper networks can provide processing of image data prior to validation, for example, to support crop and align functions performed on the authentication credentials prior to communication to embedding network for transforming them into one-way encryptions.

Other options include: helper networks configured to determine if an input credential includes an eyes open/eyes closed state—which can be used for passive liveness in face recognition settings, among other options; helper networks configured to determine an eyeglasses on or eyeglasses off state within an input credential. The difference in eyeglass state can be used by the system to prevent false negatives in face recognition. Further options include data augmentation helper networks for various authentication credential modalities that are configured to increase the entropy of the enrollment set, for example, based on increasing the volume and robustness of the training data set.

In the voice biometric acquisition space, helper networks (e.g., helper DNNs) can be configured to isolate singular voices, and voice geometry voice helper networks can be trained to isolate single voices in audio data. In another example, helper network processing can include voice input segmentation to acquire voice samples using a sliding time (e.g., 10 ms) window across, for example, one second of input. In some embodiments, processing of voice data includes pulse code modulation transformation that down samples each time segment to 2× the frequency range, which may be coupled with voice fast fourier transforms to convert the signal from the time domain to the frequency domain.

Various embodiments can use any one or more and/or any combination of the following helper networks and/or associated functions. In one embodiment, the system can include a helper network that includes a face geometry detection DNN. The face geometry DNN can be configured to support locating face(s) and associated characteristics in an image by transforming each image into geometric primitives and measuring the relative position, width, and other parameters of eyes, mouth(s), nose(s), and chin(s).

Facial recognition functions can be similar to fingerprint recognition functions executed by fingerprint helper networks as both networks process similar modalities (e.g., image data and identification of structures within the images data to build an authentication representation). According to one embodiment, a helper network can include a fingerprint geometry detection DNN configured to accurately locate finger(s) in an image, and analysis can include transforming each image into geometric primitives to measure each finger's relative position, width, and other parameters. In one example, helper networks that process image data can be configured to identify relevant structures in the image and return positional information in the image (e.g., X and Y coordinates), video frame, and/or video stream submitted for processing of the relevant structures. In one example, geometry networks process image credentials and their output can be used in validating the authentication instance or rejecting the instance as invalid.

In another embodiment, a helper network can include a face validation DNN configured validate face input images (e.g., front looking face images). In various embodiments, the validation DNN is configured to validate any one or more or any combination of the following: a valid image input image was received, the submitted image data has forward facing face images, the image includes features consistent with a facial image (e.g., facial characteristics are present, and/or present in sufficient volume, etc.); lighting is sufficient; boundaries within image are consistent with facial images, etc.

Similarly, a helper network can include a fingerprint validation DNN configured to validate fingerprint input images. Such validation networks can be configured to return a validation score used to determine if an image is valid for further processing. In one example, the validation networks can return a score in the range between 0 to 100, where 100 is a perfect image, although other scoring systems and/or ranges can be used.

In further embodiments, a helper network can include one or more image state detection neural networks. The image state neural networks can be configured to detect various states (e.g., binary image conditions (e.g., face mask on/face mask off, eye blink yes/eye blink no, etc.)) or other more complex state values. The state values can be used in authentication credential processing. In one example, the system can employ an image state value to select an embedding generation neural network or to select a neural network to process an input authentication credential, among other options. In one example, a detection helper network can include a face mask detection DNN configured to determine if image data includes an entity wearing a face mask.

In further example, the system can also execute face mask detection algorithms to determine if a subject is wearing a mask. Stated broadly, masks used during enrollment lower subsequent prediction performance. In some embodiments, the face+mask on/off detection DNN accepts a face input image (e.g., a forward-looking facial image) and returns a value 0 to 100, where 0 is mask off and 100 is mask on. Various thresholds can be applied to a range of values to establish an on/off state.

In one example, a web client can include a URL parameter for enrollment and prediction (e.g., "maskCheck=true"), and based on the output (e.g., state=Mask On) can communicate real-time instructions to the user to remove the mask. In other examples, the system can be set to automatically select a face+mask embedding DNN tailored to process images with face and masks. In various embodiments, the face+mask embedding DNN is a specialized pre-trained neural network configured to process user image data where the user to be authenticated is wearing a mask. A corresponding classification network can be trained on such data (e.g., one-way encryptions of image data where users are in masks), and once trained to predict matches on user's wearing masks.

In another embodiment, a helper network can be configured to determine a state of image data where a user is or is not wearing glasses. In one example, a detection helper network can include an eyeglasses detection DNN configured to determine if image data includes an entity wearing eyeglasses. In further example, the system can also execute eyeglass helper network to determine if a subject is wearing eyeglasses. In one example, the system can also execute an eyeglass detection algorithm to determine if a subject is wearing eyeglasses before allowing enrollment. Stated broadly, eyeglasses used during enrollment can lower subsequent prediction performance. In some embodiments, the eyeglasses on/off detection DNN accepts a front view of face input image, returns a value 0 to 100, where 0 is eyeglasses off and 100 is eyeglasses on. In some embodiments, various thresholds can be applied to a range of values to establish an on/off state. For example, Values above 60 can be assign an on state with values below 40 an off state (or, for example, above 50/below 50). Intermediate values can be deemed inconclusive or in other embodiments the complete range between 0 to 100 can be assigned to either state.

Various authentication system can test if a user is wearing glasses. For example, a web client can include a URL parameter for enrollment and prediction (e.g., "eyeGlassCheck=true"), and based on the output (e.g., state=Glasses On) can communicate real-time instructions to the user to remove the glasses. In other embodiments, generation/classification networks can be trained on image data of a user with glasses and the associated networks can be selected based on processing images of users with glasses and predicting on encrypted representations of the same.

In another embodiment, a helper network can include an eye geometry detection DNN. The detection DNN is configured to locate eye(s) in an image by transforming a front facing facial image into geometric primitives and measuring relative position of the geometric primitives. In one example, the DNN is configured to return positional information (e.g., x, y coordinates) of eyes in an image, video frame or video stream.

In one embodiment, a helper network can include an eyes open/closed detection DNN. For example, a real-time determination that an entity seeking authentication is blinking provides real-time passive facial liveness confirmation. Determining that a user is actually submitting their authentication information at the time of the authentication request prevents spoofing attacks (e.g., holding up an image of an authentic user). In various examples, the system can include algorithms to test liveness and mitigate the risk of a photo or video spoofing attack during unattended operation. In one example, the eye open detection DNN receives an input image of an eye and outputs a validation score between 0 and 100, where 0 is eyes closed and 100 is eyes open. Various thresholds can be applied to a range of values to establish an eye open/closed state as discussed herein.

According to one embodiment, the authentication system prevents a user/entity from proceeding until the detection of a pair of eye-open/eye-closed events. In one example, the web client can be configured with a URL parameter "faceLiveness=true" that allows the system to require an eye-blink check. The parameter can be used to change operation of blinking testing and/or default settings. In further examples, rates of blinking can be established and linked to users as behavioral characteristics to validate.

In some embodiments, helper networks can be configured to augment authentication credential data. For example, a helper network can include facial and fingerprint augmentation DNNs that are used as part of training validation networks. In various embodiments, data augmentation via helper networks is configured to generalize the enrollment of authentication information, improve accuracy and performance during subsequent prediction, and allow the classification component and/or subsystem to handle real-world conditions. Stated generally, enrollment can be defined on the system to require a certain number of instances to achieve a level of accuracy while balancing performance. For example, the system can require >50 instances of an authentication credential (e.g., >50 biometric input images) to maintain accuracy and performance. The system can be configured to execute algorithms to augment valid credential inputs to reach or exceed 50 instances. For example, a set of images can be expanded to 50 or more instances that can also be broadened to add boundary conditions to generalize the enrollment. The broadening can include any one or more and/or any combination of: enhanced image rotations flips, color and lighting homogenizations, among other options. Each instance of an augmentation can be tested to require improvement in evaluation of the distance metric (Euclidean distances or cosine similarity) comparison, and also be required not to surpass class boundaries. For example, the system can be configured to execute algorithms to remove any authentication credentials (e.g., images) that exceed class boundaries. Once filtered, the remaining images challenge the distance metric boundaries without surpassing them.

In the example of image data used to authenticate, if only one image is available for enrollment, the system is configured to augment the facial input image >50 (e.g., 60, 70, 80, etc.) times, remove any outliers, and then enroll the user. According to one embodiment, the web client is configured to capture 8 images, morphs each image, for example, 9 times, remove any outliers and then enroll the user. As discussed, the system can be configured to require a baseline number of instances for enrollment. For example, enrollment can require >50 augmented biometric input images to maintain the health, accuracy and performance of the recognition operations. In various embodiments, the system accepts biometric input image(s), morphs and homogenizes the lighting and contrast once, and discards the original images once encrypted representations are produced.

It is realized that that there is no intrinsic requirement to morph images for prediction. Thus, some embodiments are configured to morph/augment images only during enrollment. In other embodiments, the system can also be configured to homogenize images submitted for prediction (e.g., via HSL transforms, etc.). In some examples, homogenized images used during prediction can increase system performance when compared to non-homogenized images. According to some examples, image homogenization can be executed based on convenience libraries (e.g., in Python and JavaScript). According to some embodiments, during prediction the web client is configured to capture three images, morph and homogenize the lighting and contrast once, and then discards the original images once encrypted representations are generated.

In various embodiments, helper networks can be configured to support transformation of authentication credentials into encrypted representations by pre-trained neural networks (e.g., referred to as embedding networks or generation networks). The embedding networks can be tailored to specific authentication credential input. According to one embodiment, the system includes face, face+mask, and fingerprint embedding neural networks, among others. Where respective embedding networks are configured to transform the input image to a distance measurable one-way homomorphic encryption (e.g., embedding, or vector encryption) which can be a two-dimensional positional array of 128 floating-point numbers.

In various implementations, face, face+mask, and fingerprint embedding neural networks maintain full accuracy through real-world boundary conditions. Real world conditions have been tested to include poor lighting; inconsistent camera positioning; expression; image rotation of up to 22.5°; variable distance; focus impacted by blur and movement; occlusions of 20-30% including facial hair, glasses, scars, makeup, colored lenses and filters, and abrasions; and B/W and grayscale images. In various embodiments, the embedding neural networks are architected on the MobileNetV2 architecture and are configured to output a one-way encrypted payload in <100 ms.

In various embodiments, voice input can include additional processing. For example, the system can be configured to execute voice input segmentation that generalizes the enrollment data, improves accuracy and performance during prediction, and allows the system to handle real-world conditions. In various embodiments, the system is configured to require >50 10 ms voice samples, to establish a desired level of accuracy and performance. In one example, the system is configured to capture voice instances based on a sliding 10 ms window that can be captured across one second of voice input, which enables the system to reach or exceed 50 samples.

In some embodiments, the system is configured to execute pulse code modulation to reduce the input to two times the frequency range, and PCM enables the system to use the smallest possible Fourier transform without computational loss. In other embodiments, the system is configured to execute voice fast fourier transform (FFT) which transforms the pulse code modulated audio signal from the time domain to a representation in the frequency domain. According to some examples, the transform output is a 2-dimensional array of frequencies that can be input to a voice embedding DNN. For example, the system can include a voice embedding network that is configured to accept input of one 2-dimensional array of frequencies and transform the input to a 4 kB, 2-dimensional positional array of 128 floating-point numbers (e.g., cosine-measurable embedding and/or 1-way vector encryption), and then deletes the original biometric.

According to various embodiments, the web client can be configured to acquire authentication credentials (e.g., biometrics) at the edge with or without a network. For example, the web client can be configured to automatically switch to a local mode after detection of loss of network. According to some embodiments, the web client can support offline operation ("local mode") using Edge computing. In one example, the device in local mode authenticates a user using face and fingerprint recognition, and can do so in 10 ms with intermittent or no Internet connection as long as the user authenticates at least once to the device while online. In some embodiments, the device is configured to store the user's embeddings and/or encrypted feature vectors locally using a web storage API during the prediction.

Figure 15:
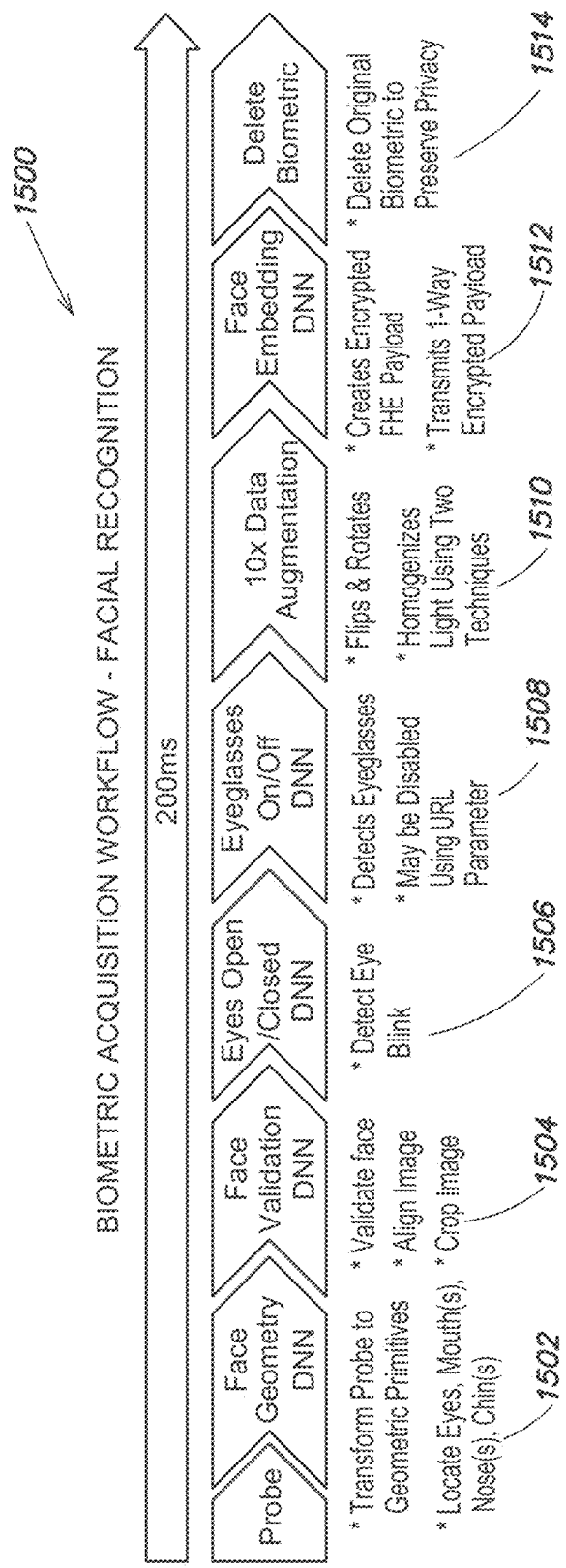
FIG. 15 is an example process flow for processing authentication information, according to one embodiment.

FIG. 15 illustrates an example process flow 1500 for facial recognition according to one embodiment. At 1502 facial image data is processed by a face geometry neural network using a probe. As part of execution of 1502, the neural network operates to transform the input data into geometric primitives and uses the geometric primitives to locate facial structures including, for example, eyes, mouth, nose, chin, and other relevant facial structures. Based on the analysis of the geometric primitives positional information can be output as part of 1502, and the positional information can be used in subsequent processing steps. For example, process 1500 can continue 1504 with processing via a face validation neural network. The processing of 1504 can include validation of the image data is including facial structures, information, and may employ the position information developed in 1502. In further example, processing and validation in 1502-1504 can include operations to align an input image on facial features and can include additional operations to crop an input image around relevant facial features (e.g., using position information). Process 1500 continues at 1506 with processing by an eyes open/closed neural network. The neural network is configured to detect whether facial input data includes transitions between eyes open and closed states, which is indicative of a live person or more specifically a blinking person during use of the authentication functions. According to some embodiments, detection of blinking can be used to validate "liveness" of authentication information submission (e.g., not spoofed submission).

According to some embodiments, the process flow 1500 can also include operations to detect whether the user is wearing glasses. For example, at 1508, submitted user data can be processed to determine if a submitted image includes the user wearing eyeglasses or not. In one example, an image capture is processed through a neural network (e.g., eyeglasses on/off neural network) to determine if the image data includes the user wearing eyeglasses or not. The system can be configured to respond to the determination in a variety of ways. In one example if eyeglasses are detected a user may be requested to re-image their face for authentication. In other examples, the system can be configured to use different neural networks to process the image data. For example, a first neural network can be configured to process image data in which users are wearing glasses and a second different neural network to process image data of users (e.g., even the same user) when wearing glasses. The state determination glasses on/off can be used to select between such networks.

In some embodiments, process 1500 can include data augmentation operations. For example, at 1510, data augmentation can be executed to flip and rotate acquired images, and/or morph acquired images to achieve a system defined requisite number of image samples. Various embodiments are configured to confirm and validate input authentication information prior to performing data expansion operations (e.g., 1510). Ensuring valid data and filtering bad data ensures the accuracy of any resulting enrollment. In another example at 1510, data augmentation neural networks can be employed to homogenize lighting conditions for submitted image data. In another example at 1510, data augmentation neural networks can be employed to homogenize lighting conditions for submitted image data. According to various embodiments, multiple techniques can be used to augment and/or homogenize the lighting for a subject image. In one example, two homogenization techniques are used to update the image data.

As shown in process flow 1500, a number of steps can be executed prior to creation of encrypted feature vectors/embeddings that are one-way encrypted representations of submitted authentication inputs. In other embodiments, the processing can be omitted and/or executed in fewer steps and such process flows can be reduced to functions for creation of one-way encryptions of authentication credentials by an embedding network (e.g., at 1512). In still other embodiments, processing to validate authentication inputs can be executed to improve enrollment and subsequent authentication can be handled by other processes and/or systems.

According to various embodiments, the process 1500 includes steps 1502 through 1510 which can be performed by various helper networks that improve the data provided for enrollment and creation of one-way encryptions of submitted authentication information that are derived to be measurable in their encrypted form. For example, the operations performed at 1502 through 1510 can improve the data input to an embedding network that is configured to take a plain text input and produce a one-way encrypted output of the authentication information. As shown in the process flow 1500, once an encrypted representation of an authentication input is produced, the original authentication credential (e.g., original biometric) can be deleted at 1514.

In further embodiments, the system and/or process flows (e.g., 1500) can include operations for detecting additional presentation attacks. According to one embodiment, the system can include a validation network configured to detect if identification information being supplied is derived from a user wearing a mask. In this example, the mask is a realistic simulacrum of a user. Thus, images taken or video captured is based on an attempted presentation attack. A realistic mask validation network can be trained on these "bad" identification inputs similar to the other validation networks described herein. Once trained, the realistic mask validation network is configured to identify identification information derived from such realistic mask and prevent further processing on the same (e.g., prevents enrollment of bad data and/or invalidates identification information during prediction operations, etc.). In various examples, the realistic mask network can be tuned to the point that it identifies images of realistic masks that are not distinguishable by the human eye. For example, realistic mask validation networks can be trained on images which include subjects are wearing realistic masks. The image set can be expanded as discussed above (e.g., adding distortions, occlusions, etc.). Initial training can reduce millions of images to ~100,000 images of false positives and false negatives. Subsequent training is used to teach the network on the remaining images until the network no longer produces false positive or false negative output (or, for example, and acceptable percentage including any option from 0 to 5%).

Figure 16:
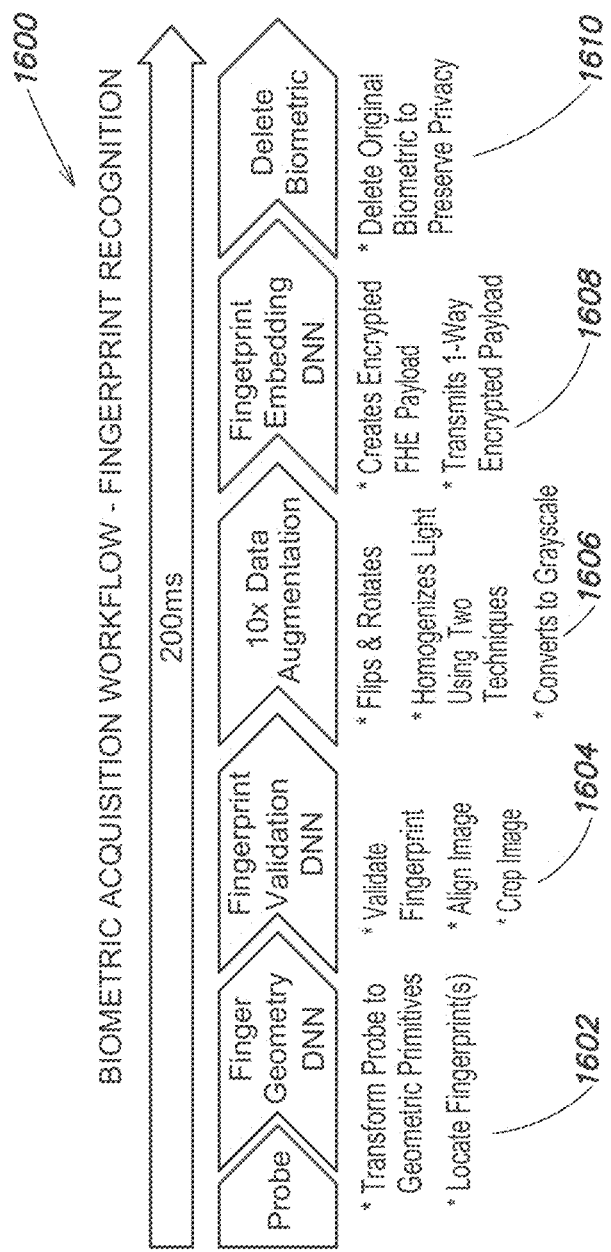
FIG. 16 is an example process flow for processing authentication information, according to one embodiment.

FIG. 16 is an example process flow 1600 for biometric acquisition of a fingerprint. At 1602, image data captured by a probe is transformed into geometric primitives based on input to a fingerprint geometry neural network (e.g., a fingerprint geometry DNN). The neural network can be configured to transform image data into geometric primitives and locate fingerprints within the image data based on analysis of the geometric primitives, relative spacing, boundaries, structures, etc. In some embodiments, output of the fingerprint geometry DNN can include positional information for fingerprints and/or characteristics within the image data.

In step 1604, submitted data can be processed to determine validity. For example, the image data can be input into a fingerprint validation neural network at 1604. In one example, the fingerprint validation neural network can be architected as a DNN. The neural network can be configured to validate a proper fingerprint capture exists in the image data (e.g., based on analysis of the image data by the neural network and/or geometric primitives produced by the fingerprint geometry neural network). In further embodiments the fingerprint validation neural network can also be configured to determine the validity of the submitted fingerprint data. For example, the validity helper network can be configured to determine that live sample (and not spoofed) is being presented, as well as validating the input as a good authentication data source.

Similar to process 1500, process 1600 includes operations to augment data submission. Data augmentation (e.g., 1606) can be executed as part of enrollment to ensure a threshold number of data instances are provided during enrollment. In various embodiment, process flow 1600 is configured to validate authentication inputs to ensure good inputs are augmented for training further models.

In further examples, data augmentation can also be used during prediction operations. In one example, data augmentation during prediction can be limited to homogenizing light conditions for submitted image data (e.g., face image, fingerprint image, other image, etc.). According to one embodiment, fingerprint image data is manipulated to improve the image data and or create additional instances as part of data augmentation steps. Manipulation can include image flips, rotations, skews, offsets, cropping, among other options. Operations executed during data augmentation can also include homogenization of the lighting conditions for an input image (e.g., transform into HSL). Various lighting homogenization functions can be executed on the image data. In one example, the system is configured to execute at least two homogenization techniques to standardize lighting conditions. According to some embodiments, the operations of 1606 can also include conversion of the image to a grayscale image.

Steps 1602 through 1606 can be executed to improve and/or prepare fingerprint image data for enrollment by a fingerprint embedding neural network (e.g., at 1608). The fingerprint embedding neural network is configured to generate encrypted representations of input authentication credentials. For example, the fingerprint embedding neural network can be architected as a deep neural network. The fingerprint embedding DNN can be configured to create a one-way homomorphic encryption of input fingerprint data. Once the encrypted representation is produced, the encrypted representation can be used in subsequent operations in the process flow 1600 can include a step (e.g., 1610) to delete any original authentication credential information, including any original biometric.

Figure 17:
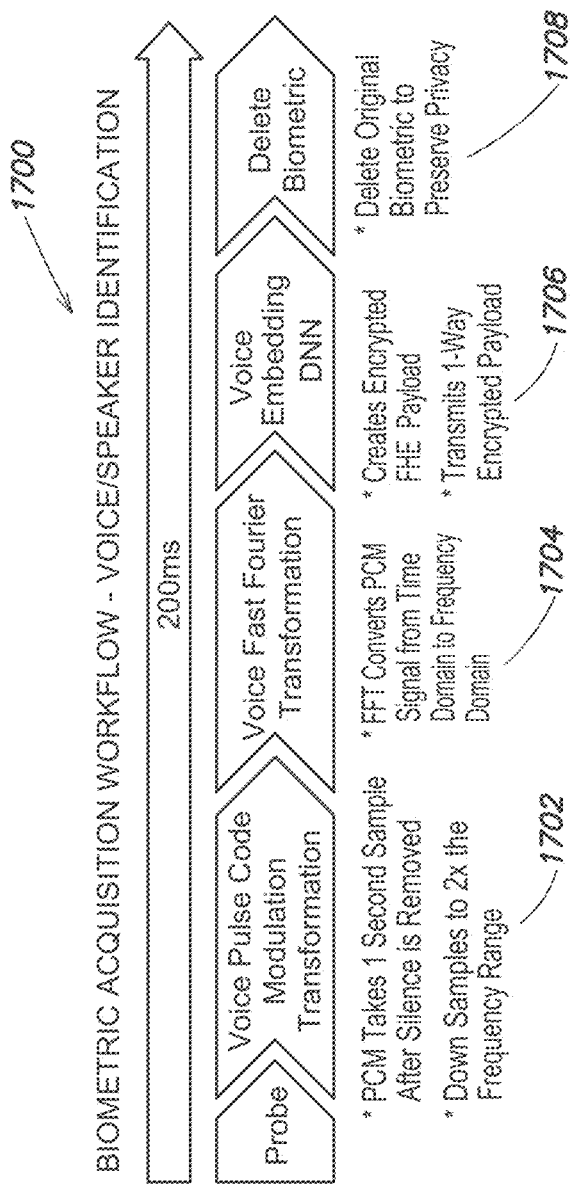
FIG. 17 is an example process flow for processing authentication information, according to one embodiment.

FIG. 17 is an example process flow 1700 for acquisition of vocal authentication credentials. According to one embodiment, process 1700 can begin based on transformation of voice data captured by a probe at 1702. According to one example, input voice data is transformed based on voice pulse code modulation (PCM). Processing of the audio data can include capturing samples of time segments from the audio information. In one example, silence is removed from the audio information and PCM is executed against one second samples from the remaining audio data. In other embodiments, different sample sizes can be used to achieve a minimum number of authentication instances for enrollment and/or prediction. According to some embodiments, the PCM operation is configured to down sample the audio information to two times the frequency range. In other embodiments different down sampling frequencies can be used. Once PCM is complete at 1702, process 1700 continues at 1704 with a fourier transformation of the PCM signal from the time domain to the frequency domain. According to some embodiments, a voice fast fourier transformation operation is executed at 1704 to produce the frequency domain output.

Process 1700 continues at 1706, where the frequency domain output of 1704 can be input into a voice embedding neural network. According to some embodiments, the voice embedding neural network can include or be based on a deep neural network architecture. As discussed herein, the embedding neural network is configured to produce a one-way encryption of input authentication information. In this example, the voice embedding DNN is configured to generate an encrypted representation of audio/voice data that is geometrically measurable (e.g., cosine measurable). Once the encrypted representation is generated, any original authentication information can be deleted at 1708. For example, once the voice embedding DNN produces its encryption, the original audio input can be deleted to preserve privacy.

Figure 18:
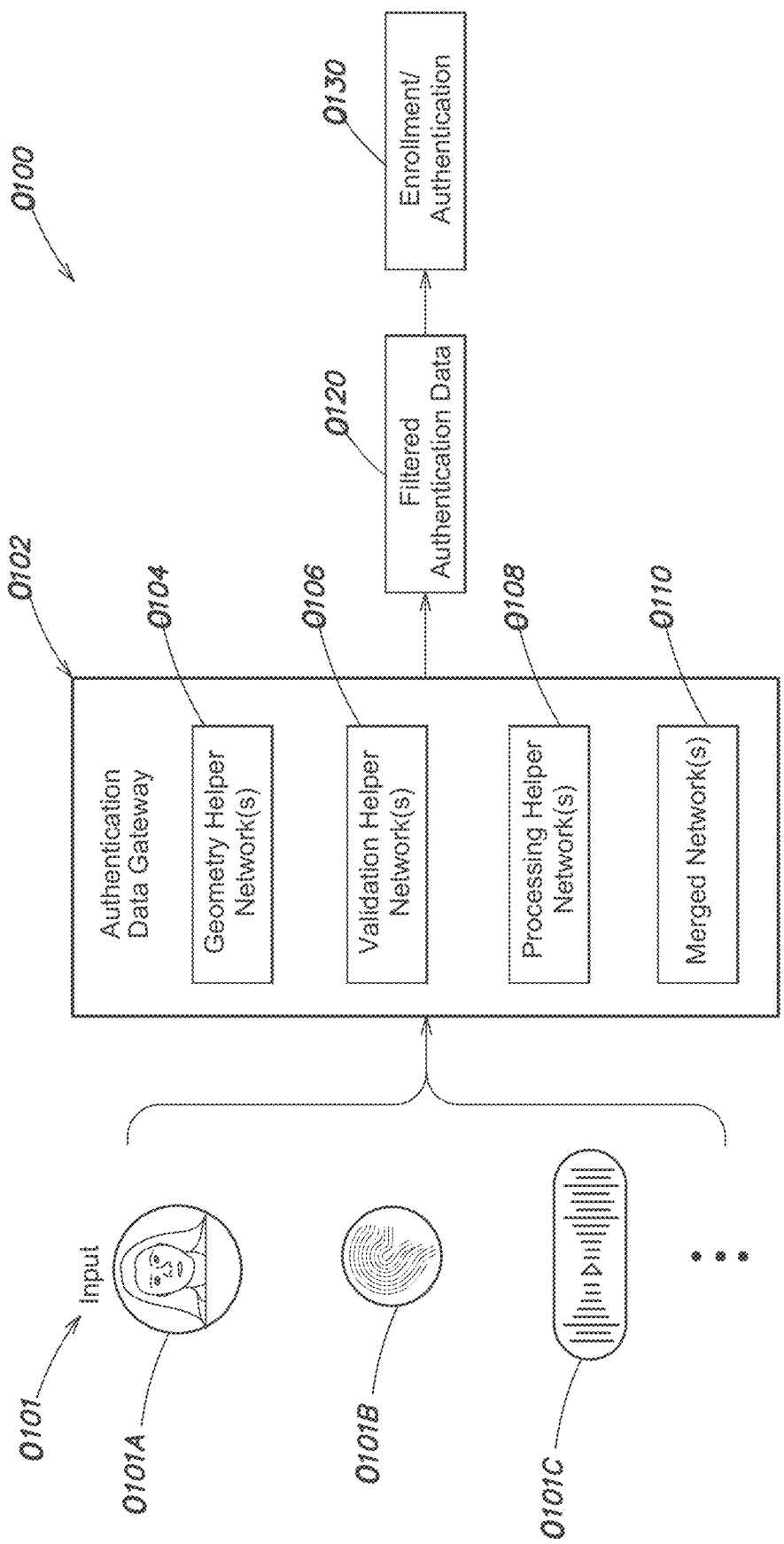
FIG. 18 is a block diagram of a helper network implementation, according to one embodiment.

FIG. 18 is a block diagram of an authentication system 0100. According to various embodiments the authentication system 0100 can accept a variety of identification inputs (e.g., 0101) and produce filtered identification data (e.g., at 0120) for use in identification/enrollment/authentication functions (e.g., 0130). For example, the authentication system 0100 can be configured to accept various biometric inputs 0101A including images of a user's face, 0101B including images of a user's fingerprint, 0101C including captures of the user's voice, among other options (e.g., as shown by the three dots appearing under the various inputs). According to some embodiments, the authentication system can be configured with an authentication gateway 0102. The authentication gateway may include a plurality of helper networks each tailored to process a respective identification input. For example, a helper network can be tailored specifically to deal with facial recognition images and/or video for identifying a user face. Different types of helper networks can be tailored to specific functions, including, for example, geometry helper networks (e.g., 0104) that are configured to identify characteristics within an identification/authentication input and/or positional information within the input that can be used for validation and/or creation of embedding (e.g., encrypted feature vectors produced by an embedding network—discussed herein).

In various embodiments, geometry helper networks can be configured to support analysis by validation helper networks (e.g., 0106). Although in other embodiments, validation helper networks are configured to operate on input data without requiring the output or analysis of geometry helper networks. In yet other embodiments, some validation networks can receive information from geometry helper networks while other helper networks operate independently and ultimately deliver an assessment of the validity of an identification/authentication instance. In the context of image inputs, the validation helper network can determine that the submitted image is too blurry, off-center, skewed, taken in poor lighting conditions, among other options, that lead to a determination of a bad instance.

In some embodiments, the various helper networks can include processing helper networks configured to manage inputs that are not readily adaptable to geometric analysis. In some examples, the processing helper networks (e.g., 0108) can also be loosely described as geometry helper networks and the two classifications are not mutually exclusive, and are describe herein to facilitate understanding and to illustrate potential applications without limitation. According to one example, processing helper networks can take input audio information and isolate singular voices within the audio sample. In one example, a processing helper network can be configured for voice input segmentation and configured to acquire voice samples of various time windows across an audio input (e.g., multiple samples of 10 ms may be captured from one second to input). The processing helper networks can take audio input and include pulse code modulation transformation (PCM) that down samples the audio time segments to a multiple of the frequency range (e.g., two times the frequency range). In further example, PCM can be coupled with fast fourier transforms to convert the audio signal from the time domain to a frequency domain.

In some embodiments, a series of helper networks can be merged into a singular neural network (e.g., 0110) that performs the operations of all the neural networks that have been merged. For example, geometry helper networks can be merged with validation helper networks and the merged network can be configured to provide an output associated with validity of the identification/authentication data input.

Regardless of whether a plurality of helper networks are used or a merged network is used or even combinations thereof, the authentication data gateway 0102 produces a set of filtered authentication data (e.g., 0120) that has pruned bad authentication instances from the data set. Shown in FIG. 18 is communication of the filtered authentication data 0120 for use in identification, enrollment, and/or authentication services at 0130. In some embodiments, an authentication system can include components for performing identification of entities, enrollment of users, and components for authenticating enrolled users. Filtered data can be used for any preceding operation. In some examples, filtering of training data can be prioritized, and an authentication system does not need to filter authentication inputs when performing a specific request for authentication against enrolled data. In some other embodiments, an authentication system can provide data gateway operations and pass the filtered data onto other systems that may be used to identify, enroll, and/or authenticate users. Other implementations can provide data gateway operations, identification operations, enrollment operations and/or authentication operations as part of a single system or as part of a distributed system with multiple participants.

In other embodiments, the operation of the helper networks shown can be used in the context of identification. The helper networks are used to ensure valid data capture that can then be used in identifying an individual or entity based on acquired information. Broadly stated, the geometry and/or processing helper networks operate to find identification data in an input, which is communicated to respective validation helper networks to ensure a valid submission has been presented. One example of an identification setting versus an authentication setting, can include airport security and identification of passengers. According to various embodiments, identification is the goal in such example and authentication (e.g., additional functions for role gathering and adjudication) is not necessary once a passenger has been identified. Conversely, the system may be tasked with authenticating a pilot (e.g., identification of the pilot, determining role information for the pilot, and adjudication) when seeking to access a plane or plane flight control systems.

Figure 19:
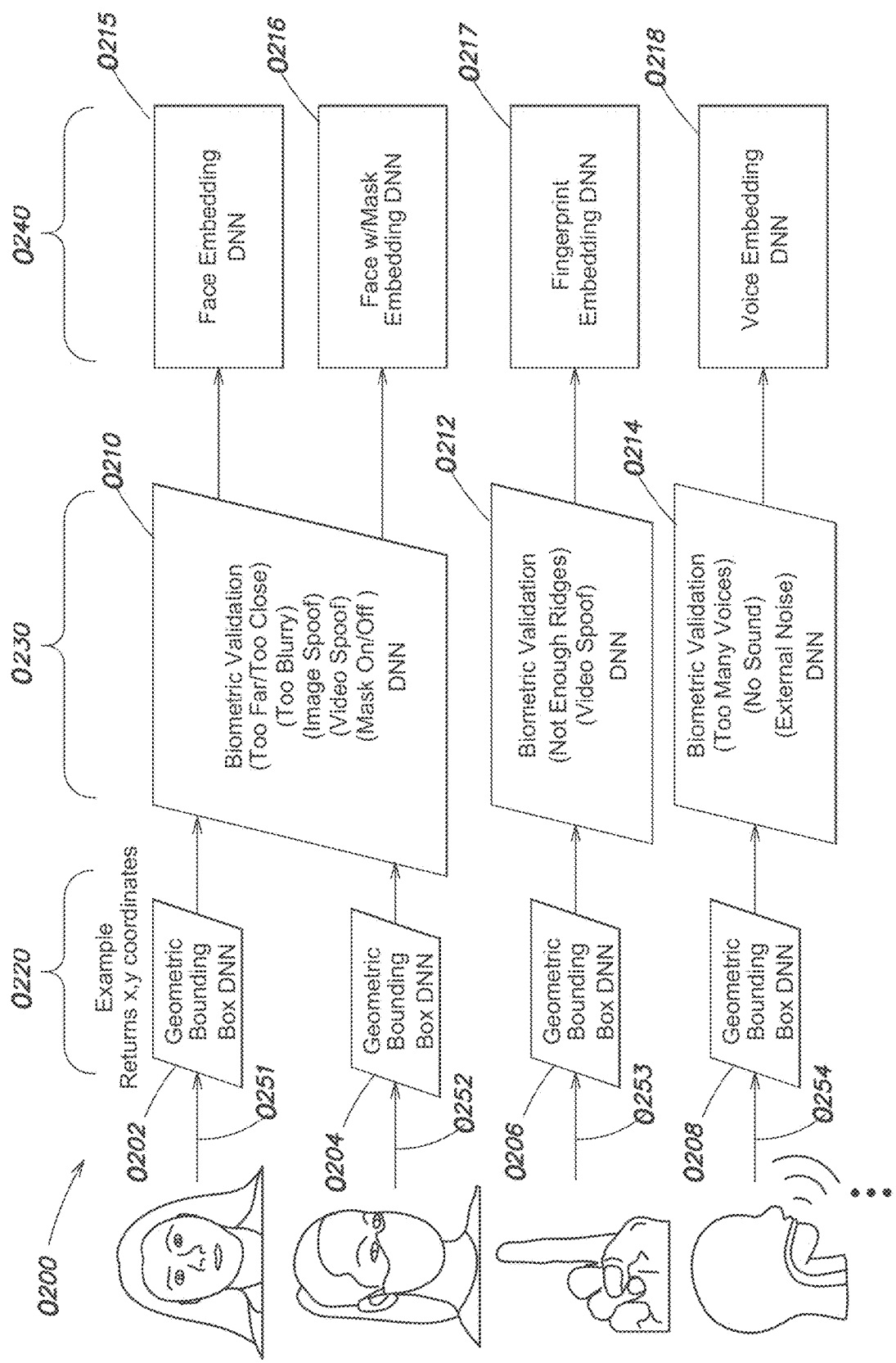
FIG. 19 is a block diagram of examples helper networks for processing respective authentication inputs, according to one embodiment.

FIG. 19 is a block diagram of authentication system 0200 executing a variety of example helper networks. The respective helper networks are configured to process (e.g., at 0220) respective identification credential input (e.g., biometric input (e.g., 0251 face image, 0252 face image with mask, 0253 fingerprint capture, 0254, voice capture, among other input options and corresponding helper networks, shown by three dots)) and filter bad credentials (e.g., at 0230) from being incorporated into embedding generation networks (e.g., at 0240). Description of various functions, operations, embedding network architecture, and uses of generated embeddings for identification. authentication and/or for training classification networks, among other examples, are described in co-pending U.S. application Ser. No. 16/832, 014, filed on Mar. 27, 2020, titled "SYSTEMS AND METHODS FOR PRIVACY-ENABLE BIOMETRIC PROCESSING." (the '014 application) incorporated herein in its entirety.

Various embodiments of an authentication system can be configured to process and filter authentication data using helper networks, where the filtered data is made available for subsequent use by, for example, the embedding networks described in the '014 application. Stated broadly embedding networks can be executed to accept authentication inputs in a plain-text or unencrypted form and transform the input into an encoded representation. In one example, embedding networks are configured to transform an authentication input into a geometrically measurable one-way encoding of an authentication input. Use of such encodings preserves the secrecy of underlying authentication data, while providing embeddings than can be evaluated/classified in an encoded space. The inventors have realized that improvements in data enrollment using helper networks results in improved accuracy for embedding network and resulting authentication operations.

Returning to FIG. 19, the respective biometric inputs (e.g., 0251-0254) are captured and used as input in a processing stage (e.g., 0220) configured to confirm or identify relevant or interesting characteristics within the respective biometric input. For example, respective helper networks (e.g., 0202-0208) are configured to process input biometric information and establish characteristics for analysis based on the input data. In one example, the geometric helper network 0202 can be configured to process an input face image and return coordinates for characteristic features within the image (e.g., eyes, nose, mouth, cars, etc.). Another geometric helper network (e.g., 0204) can be configured to analyze facial images where the user is wearing a mask. The output of these geometric helper networks can be processed by similar validation helper networks configured to validate (e.g., at 0230). Other geometric helper networks include a fingerprint geometric helper networks 0206 and a voice helper network 0208.

According to one embodiment, the fingerprint helper networks 0206 can be configured to align, crop, and/or identify fingerprint characteristics within an image. For example, the helper network 0206 can identify position information for ridges and whorls and other characteristics that would be analyzed in a fingerprint image. The outputs of helper network 0206 can then be processed by a validation network (e.g., 0212) to filter any bad inputs. Likewise, the voice geometric helper network 0208 is configured to capture characteristics from an audio sample and communicate processed samples to a validation network (e.g., 0214). Processing by the voice geometric helper network can include PCM and fast fourier transformation of audio samples, which are then validated as good or bad samples by, for example, validation network 0214.

According to various embodiments, the validation networks are configured to protect the embedding neural networks shown in phase 0240. For example, if a poor image is allowed into the embedding network 0215 the poor image will disturb the distance measurements on the output of the embedding network and the embedding model 0215 itself. Incorporation of bad data can compromise the entire network, which results in false positives and false negatives for subsequent authentications.

Returning to the validation phase (e.g., 0230), a plurality of validation networks is configured to determine if an authentication input is valid for use or not. For example, a face validation helper network can be configured to determine if an input image was taken with the camera too far away from the subject or too close to the subject, where either condition is used to identify the bad credential and exclude it from use. In other examples, face validation helper networks can also determine if an image is too blurry, if an image is spoofed (e.g., a photo of a user is presented rather than a capture of the user directly), if video input used for submitting facial information is spoofed rather than presented by the actual user, if the user or subject is wearing a mask or not, among other options.

In various embodiments the validation networks are architected based on a deep neural network model and each can return the probability, score, or value that determines if an input is valid or bad. In further embodiments, the helper network can return state information, including whether a user is wearing a mask or not. In some examples, a determination that a user is wearing a mask may cause an authentication system to exclude the identification information from use, and in other examples, the authentication system can use the state determination, wearing mask, to select a respective embedding DNN (e.g., 0216—an embedding network trained on images with users wearing masks).

In further example, an authentication system can include a fingerprint validation helper network (e.g., 0212) that is configured to determine if a fingerprint capture includes enough ridges or characteristics to provide good analysis. In addition, fingerprint helper networks can also determine liveness—confirm that spoofed video is not the source of a submission or an image spoof is not the source of submission.

Additional embodiments can include voice validation helper networks configured to determine if too many voices are present in an input, and if no sound is present in an input, if too much external noise is present in an input, among other options.

Once an input is validated the inputs can undergo further processing, including, identification, authentication, enrollment, etc. For example, the input can be processed by a respective embedding network in stage 0240. For example, a face embedding DNN 0215 can process user face images. In further example, a face with mask embedding network 0216 can process images of users wearing masks. Other examples include a fingerprint embedding DNN 0217 for processing fingerprint images and voice embedding DNN 0218 for processing audio inputs.

In various embodiments, the output of stage 0240 is an embedding or feature vector representative of the input but in an encoded form. For example, the embedding networks can generate encrypted feature vectors or other one-way encoded representations that are geometrically measurable for comparison. In one example, an embedding network can accept an unencrypted input and produce a homomorphic one-way encryption of the input.

Figure 20:
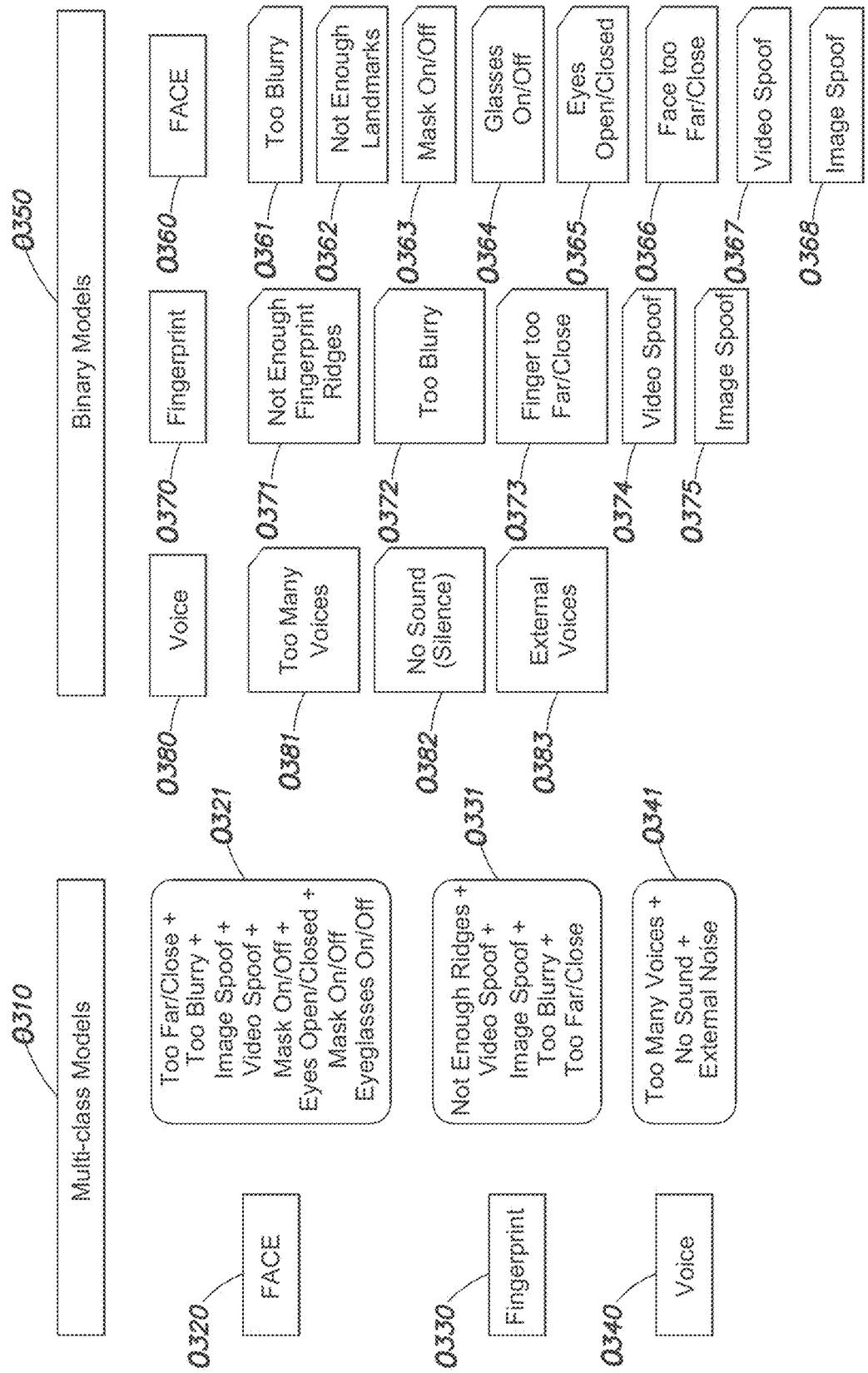
FIG. 20 illustrates example multiclass and binary helper network models, according to some embodiments.

FIG. 20 is a block diagram illustrating various example helper networks, according to various embodiments. According to one embodiment, an authentication system can execute a variety of different helper networks architected on a variety of models. For example, a group of helper networks can be configured to establish one of a pair of states. Stated broadly, the helper networks configured to establish one of a pair of states responsive to input can be referred to as binary models. For example, a respective binary helper network is configured to determine if an input is associated with the first or second state. In an identification or authentication setting, a variety of helper networks can be configured to process images for facial recognition (e.g., 0360) using a plurality of binary or other models.

According to some embodiments, face processing helper networks can include evaluations of whether, or not, an image is too blurry to use in the context of identification, authentication, and/or training. In another example, a face helper network can be configured to determine if there are not enough landmarks in an input image for facial recognition or in the alternative if there are (e.g., 0362). Further embodiments include any combination of the prior helper networks and may also include helper networks configured to determine if the user is wearing a mask or not, if the user is wearing glasses or not, if the user's eyes are closed or not, if an image of the user was taken too far from or too close to the camera or image source (e.g., see 0361-0368), among other options.

Other helper networks may be used in conjunction with different embodiments to determine a state of an authentication input which may involve more than binary state conditions. In further embodiments, other authentication modalities can be processed by different helper networks. According to one embodiment, a fingerprint helper network can be configured to accept an image input of a user's fingerprint and process that image to determine if a valid authentication instance has been presented (e.g., 0370). For example, the fingerprint validation network can be configured to accept an image input and determine a state output specifying if not enough fingerprint landmarks (e.g., ridges) are present for authentication, or alternatively that enough fingerprint ridges are present (e.g. 0371). In another example, a fingerprint validation network can be configured to determine if a fingerprint image is too blurry to use (e.g. 0372). In further example, the fingerprint validation network can also be configured to determine if a fingerprint image is too close to the image source that captured it or too far from the image source that captured it (e.g. 0373). Similar to face validation, a fingerprint validation network can also be configured to identify submissions that are spoofed video (e.g. 0374), or spoofed images (e.g. 0375).

According to some embodiments, validation models can be configured to score an authentication input and based on evaluation of the score a respective state can be determined. For example, a validation helper network can produce a probability score as an output. Scores above the threshold can be classified as being one state with scores below the threshold being another. In some examples, intermediate values or probability scores can be excluded or assigned an inconclusive state.

Further embodiments are configured to execute helper networks to process additional authentication modalities. According to one embodiment, an authentication system can include voice validation helper networks (e.g. 0380) configured to accept an audio input and output of probability of validity. In one example, a voice helper network is configured to determine if too many voices are present in a sample (e.g., 0381). In another example, a voice validation network can be configured to determine if no sound is present in an audio sample (e.g. 0382). Further examples include voice validation networks configured to determine if too much external noise is present in an audio sample for proper validation (e.g., 0383).

According to some embodiments, audio spoof detection can use an induced audio signal. Such an induced audio signal can be an audible tone or frequency and may also include a signal outside human hearing. Various patterns and/or randomized sounds can be triggered to aid in presentation attack detection. Various validation networks can be configured to identify the induced audio signal as part of authentication input collection to confirm live authentication input.

Shown at 0310 are examples of multiclass models that can be based on combinations and/or collections of various binary or other state models. For example, a face validation model can incorporate a variety of operations to output a collective determination on validity based on the underlying state determinations. In one example, the face validation network (e.g., 0320) can analyze an image of a user face to determine if any of the following characteristics make the image a bad authentication input: image is too far or too close, image is too blurry, image is spoofed, video spoof produced the input, the user is wearing a mask, the user's eyes are open or closed, the user is or is not wearing eyeglasses, etc. (e.g., 0321). In other embodiments, any combination of the foregoing conditions can be tested and as few as two of the foregoing options can be tested to determine the validity. In still other embodiments, different numbers of conditions can be used to determine if an authentication input is valid.

According to other embodiments, different multiclass models can be applied to different authentication inputs. For example, at 0330 shown is a fingerprint validation model that can test a number of conditions to determine validity. In one example, a fingerprint validation network (e.g. 0331) is configured to test if enough ridges are present, if the input is a video spoof, if the input is an image spoof, if the image is too blurry, and if the image was captured too far or too close to an image source, among other options.

According to one embodiment, a voice validation network (e.g., 0340) is configured to validate an audio input as a good authentication instance. In another example, the voice validation network can be configured to determine if there are too many voices present, no sound present, if too much external noise is present in an audio input, among other options (e.g., 0341). In addition, the voice validation network can also include operations to determine liveness. In one example, an authentication system can induce an audio tone, sound, or frequency that should be detected by a validation network in order to determine that an authentication input is live and not spoofed. Certain time sequences or patterns may be induced, as well as random audio sequences and/or patterns.

Figure 21:
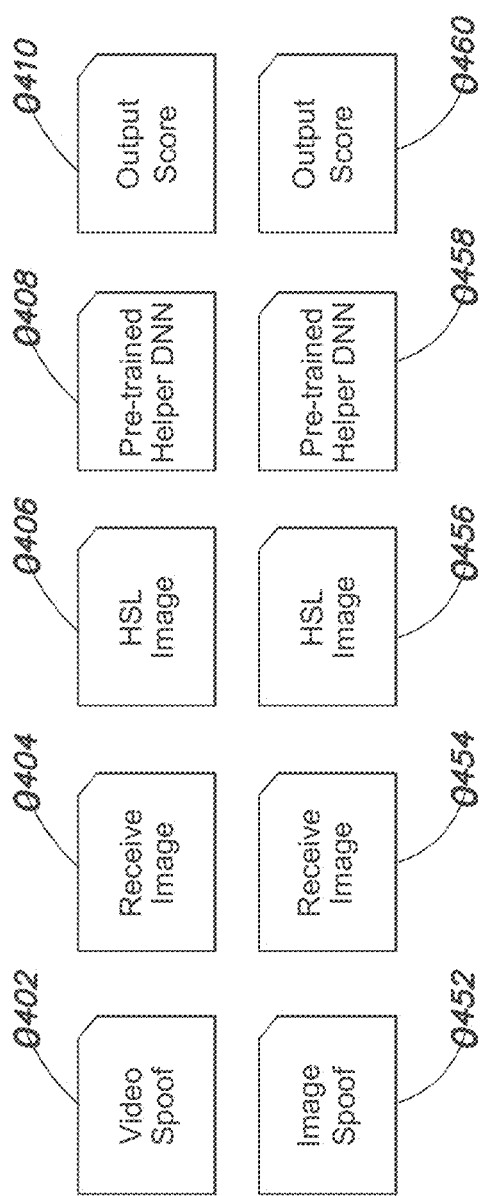
FIG. 21 illustrates example processing for detecting presentation attacks, according to some embodiments.

FIG. 21 is a block diagram illustrating operations performed by validation helper networks configured to determine liveness. FIG. 21 illustrates various considerations for implementing validation networks to detect input spoofing according to some embodiments. The illustrated examples of helper networks (e.g. 0408, 0458) are trained by creating a multitude of input spoofed images that are created in a variety of lighting conditions and backgrounds. The spoofed images are received at 0454, and the spoofed images are transformed into augmented image format that limits lighting effects, and limits the effects of subject skin color, and facial contour. The augmented image format can include for example an HSL image format. Various considerations for color harmonization are discussed in, "Color Harmonization," by D. Cohen-Or et al., published 2006 by Association for Computing Machinery, Inc. Other augmentation/homogenization formats could be used including, for example, LAB color space or contrast limited adaptive histogram equalization "CLAHE" method for light normalization.

Once a variety of spoofed images are produced and the lighting conditions normalized, various additional spoofed instances can be created with multiple alignments, cropping's, zooms (e.g., in and out) to have a body of approximately two million approved images. The validation network is trained on the images and its determinations tested. After each training, false positives and false negatives remain in the training set. In some example executions, the initial two million images are reduced to about 100,000. The validation network is retrained on the remaining samples. In further embodiments, retraining can be executed repeatedly until no false positives or false negatives remain. A similar training process can be used in the context of video spoofed video inputs. A video liveness validation network can be trained similarly on false positives and false negatives until the network identifies all valid inputs without false positives or false negatives.

Once trained, processing follows a similar approach with any authentication input. Shown are two pathways one for video spoof inputs and one for image spoof inputs (e.g. 0402 and 0452 respectively). The spoofed data is received as 0404/0454 and the data is transformed into the HSL format at 0406/0456, which is processed by respective validation networks (e.g. 0408/0458—which can be, for example, pre-trained helper validation deep neural networks). In response to the input of potentially spoofed authentication data, the validation networks 0408/0458 output respective scores 0410/0460, and based on the respective scores an authentication system can determine if an authentication input is valid or simply a replay or spoof of a valid authentication input.

Unlikely some conventional systems that can used machine learning approaches to cluster images before processing, the validation networks are trained on universal characteristics that apply to all authentication inputs, and each determination of validity establishes that a singular authentication instance is valid or not. With the training as described above, various embodiments provide helper networks that are capable of presentation attack detection (e.g., spoofed submission of a valid image). Clustering of similar images, as done in some conventional approaches, is not expected to solve this issue, and the likely result of such an approach would include introduction of spoofed images into such clusters, which ultimately will result in incorporation into and successful attacks on resulting authentication models.

Figure 22:
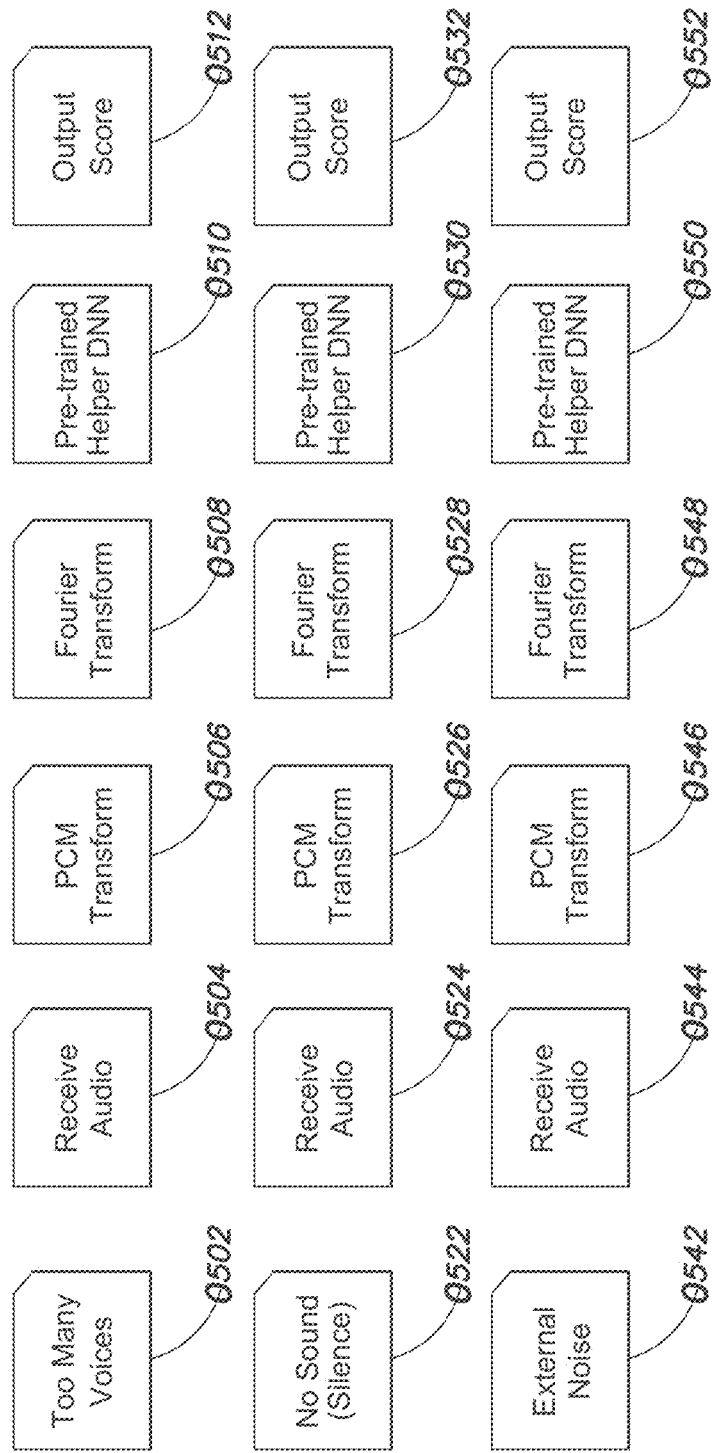
FIG. 22 illustrates example process flow for voice processing, according to some embodiments.

Shown in FIG. 22 are various embodiments of helper networks configured to analyze voice input and determine if a valid authentication input has been submitted. According to some embodiments, voice helper networks can be configured to determine if too many voices are present in an authentication instance, if no sound is present, and/or if external noise is too loud, among other options to validate that a good authentication instance has been provided.

According to one embodiment, voice validation helper networks are trained to identify various states to determine if an authentication instance is valid for use in authentication. The helper networks can be trained on various audio inputs. In one example, a body of audio inputs are captured that are clean and valid (e.g., capture of known valid users' voices). The initial audio data is mixed and/or modified with external noises that impact how good they are in terms of authentication sources. For example, to determine impact of the noise, an output of a voice embedding network can be used to evaluate a cosine distance between various audio inputs. Where the introduction of external noise impacts the cosine distance evaluation, those instances are useful in establishing a training data set for identifying valid/invalid audio instances.

According to one embodiment, a set of 0500 clean samples are captured and used to mix with external noises (e.g., 0500 external noises evaluated for impact on cosine distance). The 0500 initial samples are expanded and mixed with external voices until a large number of audio samples are available for training. In one example, helper networks can be trained on over eight million audio samples. Once trained, the results produced by the helper networks are tested to determine how well the helper networks identified valid data. False-positive results and false negative results are then used for subsequent training operations. According to one embodiment, millions of samples can be reduced to hundreds of thousands of false positives and false negatives. In various example executions, human perception is incapable of determining a difference between the spoofed audio and a valid instance once the training data has been reduced to the level of ~100K instances, however, the trained model is able to distinguish between such audio samples.

In some implementations, false positives and false negatives are used repeatedly to train the model until the model is able to execute with no false positives or false negatives. Once that result is achieved or substantially close to that result (e.g. less than 01-05% false-positive/false-negative exists) the voice validation model is trained and ready for use. According to one example, an authentication system can use any number of voice validation helper networks that are pre-trained to detect spoofed audio instances.

Returning to FIG. 22, three example pre-trained voice helper networks (e.g., DNNs) are illustrated. In the first block illustrated each helper network is configured to detect a state—at 0502 too many voices, at 0522 no sound is present, and/or at 0542 too much external noise. The respective helper networks receive audio for processing (e.g. 0504, 0524, 0544). According to various embodiments, PCM is executed on received audio (e.g., 0506, 0526, 0546). The result is transformed into the frequency domain (e.g. 0508, 0528, 0548—fourier transform). The respective outputs are evaluated by pre-trained helper DNNs at 0510, 0530, and 0550. The respective helper networks are configured to output scores associated with their state evaluation. For example, the respective networks output scores at 0512, 0532, and 0552. The scores can be used to determine if the audio input is valid for use in authentication. For example, the output value can reflect a probability an instance is valid or invalid. In one implementation, values above a threshold are deemed invalid and vice versa. In further example, some ranges for probable matching can be determined to be inconclusive.

According to some embodiments, the various states described above (e.g., too many voices, no sound, external noise issues, among other options) can be tested via a merged network that incorporates the illustrated pre-trained helper networks into a single neural network, and the output represents a collective evaluation of validity of an audio input.

Figure 23:
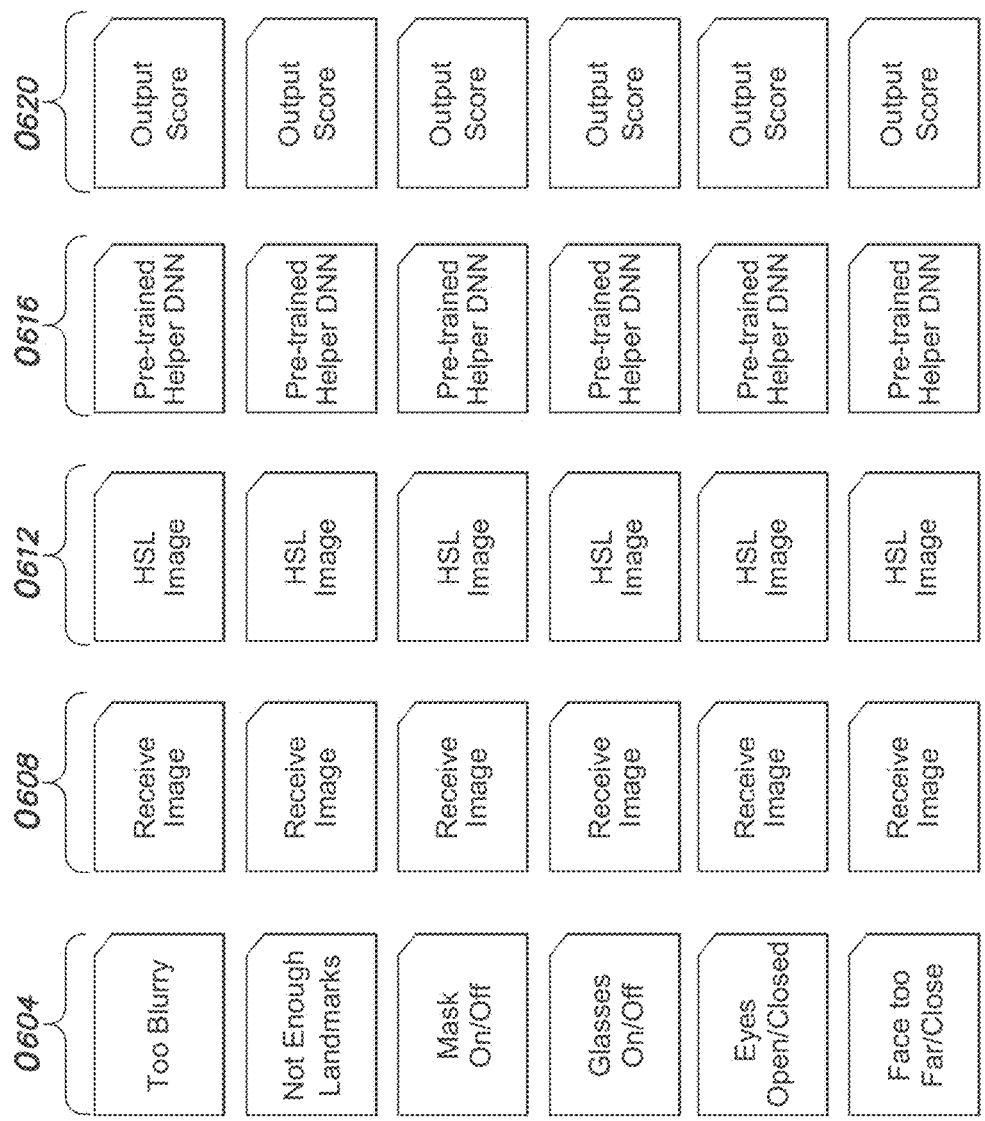
FIG. 23 illustrates example process flow for facial image processing, according to some embodiments.

FIG. 23 illustrates a variety of helper networks configured to evaluate facial images and output a scoring for determining validity. In the first column shown in FIG. 23, the state being tested is specified. For example, at 0604 some of the states that respective helper networks can test are illustrated. Various embodiments include tests for whether an image is too blurry, does not contain enough landmarks, images a user with a mask on or off, images a user with glasses on or off, images the user with eyes closed or open, an imaged face is too far or too close to an image source or camera, etc. According to some embodiments, processing by the helper networks proceeds at column 0608 where the respective helper networks receive image data that is processed into normalized image data at 0612 (e.g., processed into an HSL image). At column 0616, the respective helper networks evaluate respective HSL images and at column 0620 output a score used to determine validity based on the evaluated state specified in column 0604.

According to various embodiments face validation helper networks are trained based on an initial set of valid input images which are taken in a variety of lighting conditions and background so that each lighting condition has multiple backgrounds and each background has multiple lighting conditions. A large training set is beneficial according to some embodiments. In some examples 500,000 images can be used to establish the variety of lighting conditions and backgrounds. The initial set of images can then be normalized to produce HSL images. Other processes can be used to normalize the training set of images. The resulting images are manipulated to generate an expanded set of training images. For example, a variety of alignments and/or cropping of the images can be executed. In other examples, and in addition or in the alternative, a variety of zoom operations (e.g., in and out) can be applied to the images. As part of expanding the training set, the images can be integrated with defects, including, adding bad lighting, occlusions, simulating light beams over a facial image, eliminating landmarks on faces present, having images that are too far and too close to an image source and or introducing blurring into the training images, among other options. The initial body of training images can be expanded significantly and for example, a set of 500,000 images can be expanded into 2 million images for a training set.

Once the training set is prepared, the helper network is trained against the data to recognized valid authentication inputs. The results produced by the helper network are evaluated. Based on the results evaluation, any false positives and any false negatives are used for further training of the model. According to one example execution, about one hundred thousand images remain that are false-positives or false-negatives after the first attempt. Training can be repeated until no new false-positive or false-negative remain, using the remaining false results to retrain. In other examples once a sufficient level of accuracy is achieved greater than 95% training can be considered complete. According to some embodiments, facial validation helper networks are architected on a deep neural network model that can identify any of a number of states associated with a facial image, and further can be used to determine if the image is valid for use in authentication.

Figure 24:
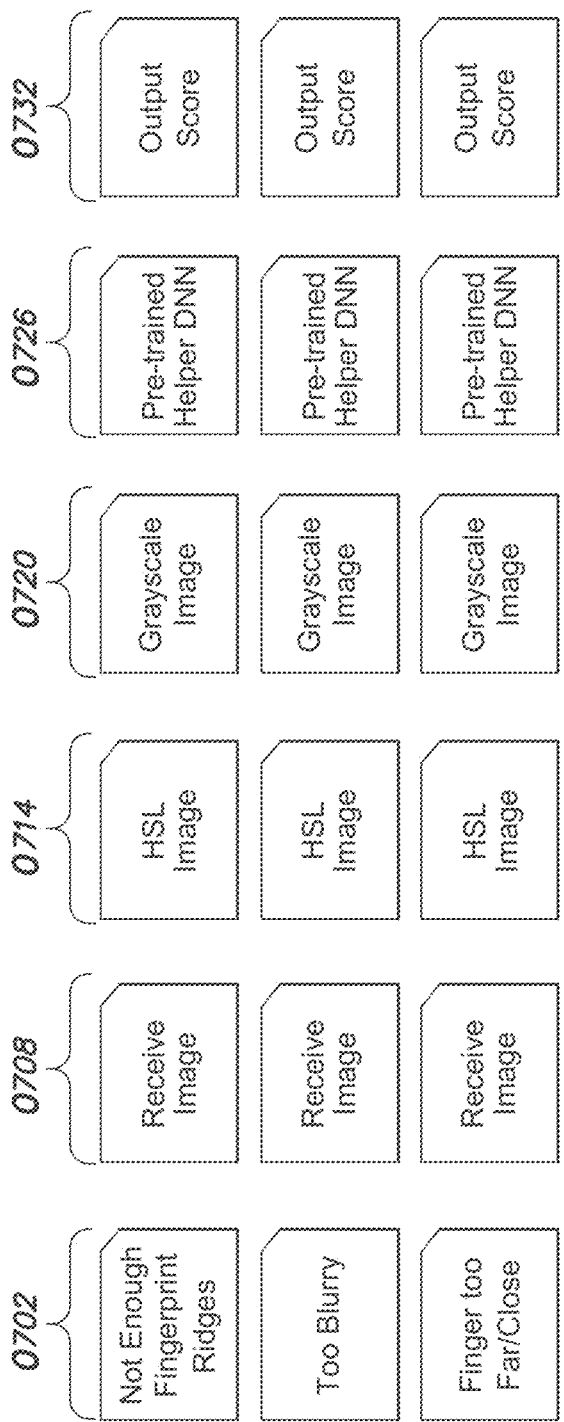
FIG. 24 illustrates example process flow for fingerprint processing, according to some embodiments.

Shown in FIG. 24 is a similar approach for executing helper networks on fingerprint images, according to some embodiments. In the first column at 0702, specified is a state being tested by a respective helper network. For example, a validation helper network can determine if not enough fingerprint ridges are available, if an image is too blurry, is a fingerprint image is too far or too close to an image source, among other options. At column 0708, image data is received, and at column 0714, the received image data is transformed into HSL image format. The HSL image is reduced to a grayscale image at column 0720. The result is analyzed by respective helper networks (e.g., input to pre-trained helper DNNs) at 0726. Once analyzed, the respective networks output a score used to determine validity of the authentication instance (e.g., at column 0732).

Figure 6:
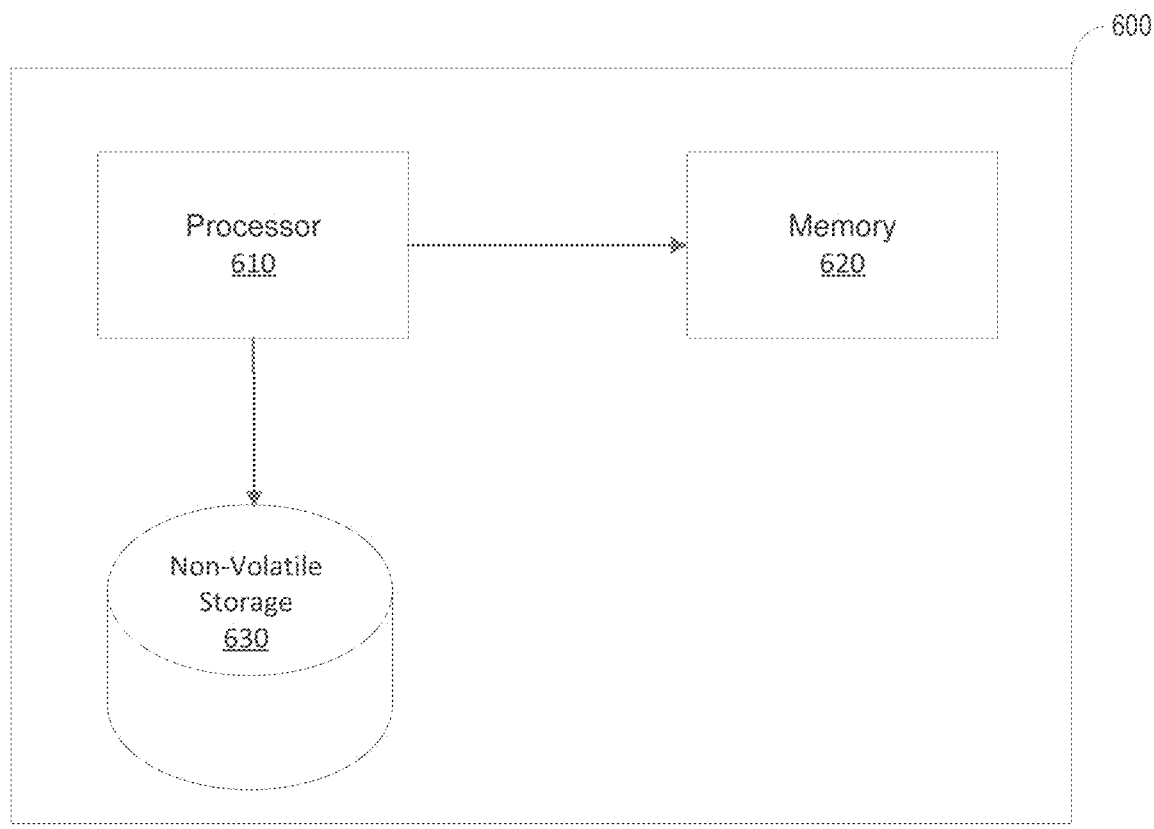
FIG. 6 is a block diagram of an embodiment of a special purpose computer system program to execute the processes and/or functions described herein.

Similar to the approach discussed with respect to FIG. 06, fingerprint image data can be captured in multiple lighting conditions and with multiple backgrounds to produce training data sets used to define the helper network models. Once a body of images is produced, the images are transformed into HSL images and then into grayscale. A variety of alignments, crops, zooms (e.g. in and out), are applied to the body of images. In addition, operations are executed to various ones of the body of training images to introduce defects. For example, bad lighting conditions can be added, as well as occlusions, introduction of light beams into images, removal of landmarks from the image, as well as using images where the fingerprint image is too far and/or too close to an image source. Other example images can include blurry fingerprint captures or introduction of blur into training data images. According to some embodiments, an initial body of 500,000 images can be expanded into a body of 02 million images to train the model.

According to one embodiment, once the expanded set of images is created a helper network model can be trained on the body of images to identify valid authentication inputs. Initially the output determination of the helper network yields false positives and false negatives. Any resulting false-positives and false negatives are used to continue training of the helper network. In one example execution, an initial set of two million images yields approximately 100,000 false-positives and/or false negatives when the helper networks results are evaluated. The helper network model is retrained based on the remaining images and tested to identify any further false-positives and/or false negatives. The approach can be repeated to refine the model until no false positives or false negatives are identified. In other embodiments, an authentication system can use a threshold level of accuracy to determine a model is fully trained for use (e.g. greater than 90% accuracy, greater than 95% accuracy, among other options).

Once respective helper networks are trained on their expanded data sets and iterated until no false positives or false negatives are output, an authentication system can execute the pre-trained helper network to determine the validity of any authentication input and filter bad inputs from use in training authentication models (e.g., embedding generation networks).

Example Liveness Execution And Considerations

According to one aspect, in establishing identity and authentication an authentication system is configured to determine if the source presenting the features is, in fact, a live source. In conventional password systems, there is no check for liveness. A typical example of a conventional approach includes a browser where the user fills in the fields for username and password or saved information is pre-filled in a form on behalf of the user. The browser is not a live feature, rather the entry of the password is pulled from the browser' form history and essentially replayed. This is an example of replay, and according to another aspect, presents many challenges where biometric input could be copied and replayed.

The inventors have realized that biometrics have the potential to increase security and convenience simultaneously. However, there are many issues associated with such implementation, including, for example, liveness. Some conventional approaches have attempted to introduce biometrics—applying the browser example above, an approach can replace authentication information with an image of a person's face or a video of the face. In such conventional systems that do not employ liveness checks, these conventional systems may be compromised by using a stored image of the face or stored video and replaying for authentication.

The inventors have realized that use of biometrics (e.g., such as face, voice or fingerprint, etc.) include the consequence of the biometric potentially being offered in non-live forms, and thus allowing a replayed biometric to be an offering of a plausible to the system. Without liveness, the plausible will likely be accepted. The inventors have further realized that to determine if a biometric is live is an increasingly difficult problem. Examined are some approaches for resolving the liveness problem—which are treated broadly as two classes of liveness approaches (e.g., liveness may be subdivided into active liveness and passive liveness problem domains). Active liveness requires the user to do something to prove the biometric is not a replica. Passive liveness makes no such requirement to the user and the system alone must prove the biometric is not a replica. Various embodiments and examples are directed to active liveness validation (e.g., random words supplied by a user), however, further examples can be applied in a passive context (e.g., system triggered video capture during input of biometric information, ambient sound validation, etc.). Table X (FIG. 8A-B) illustrates example implementation that may be employed, and includes analysis of potential issues for various interactions of the example approaches. In some embodiments, various ones of the examples in Table X can be combined to reduce inefficiencies (e.g., potential vulnerabilities) in the implementation. Although some issues are present in the various comparative embodiments, the implementation can be used, for example, where the potential for the identified replay attacks can be minimized or reduced.

According to one embodiment, randomly requested biometric instances in conjunction with identity validation on the same random biometric instances provides a high level of assurance of both identity and liveness. In one example (Row 8), the random biometric instances include a set of random words selected for liveness validation in conjunction with voice based identification.

Figure 9:
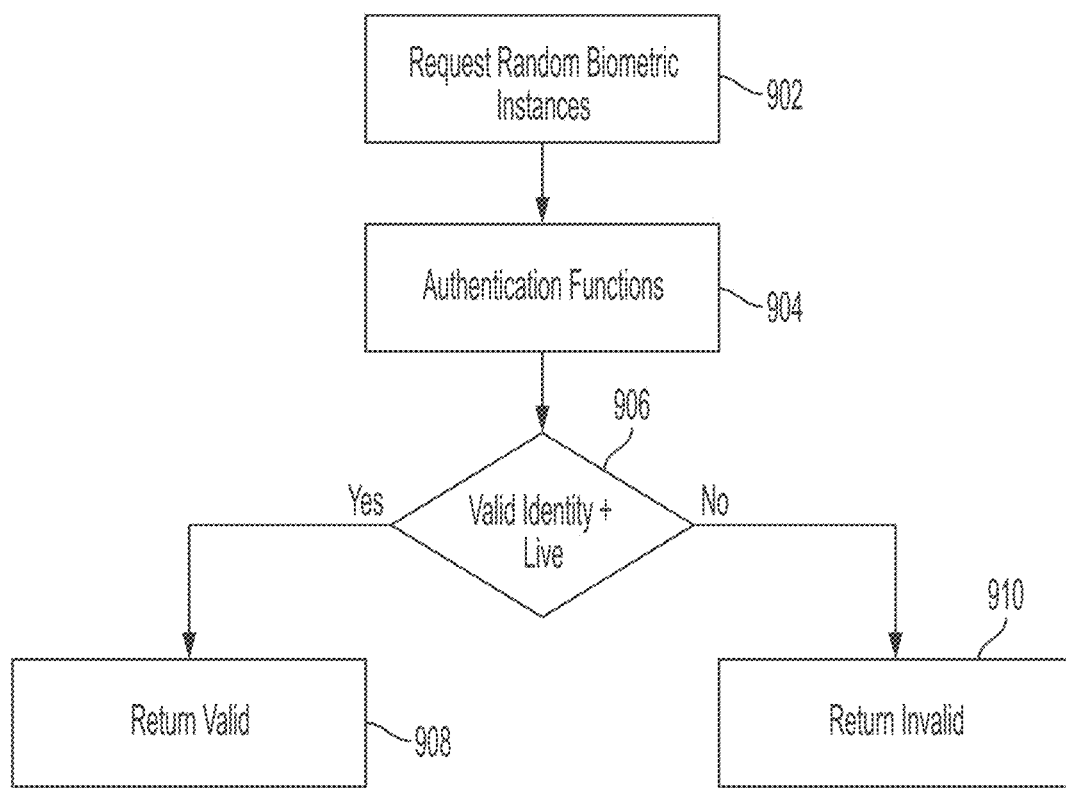
FIG. 9 is an example process for determining identity and liveness, according to one embodiment.

According to one embodiment, an authentication system, assesses liveness by asking the user to read a few random words or a random sentence. This can be done in various embodiments, via execution of process 900, FIG. 9. According to various embodiments, process 900 can being at 902 with a request to a user to supply a set of random biometric instances. Process 900 continues with concurrent (or, for example, simultaneous) authentication functions—identity and liveness at 904. For example, an authentication system can concurrently or simultaneously process the received voice signal through two algorithms (e.g., liveness algorithm and identity algorithm (e.g., by executing 904 of process 900), returning a result in less than one second. The first algorithm (e.g., liveness) performs a speech to text function to compare the pronounced text to the requested text (e.g., random words) to verify that the words were read correctly, and the second algorithm uses a prediction function (e.g., a prediction application programming interface (API)) to perform a one-to-many (1:N) identification on a private voice biometric to ensure that the input correctly identifies the expected person. At 908, for example, process 900 can return an authentication value for identified and live inputs 906 YES. If either check fails 906 NO, process 900 can return an invalid indicator at 910 or alter a confidence score associated with authentication.

Further embodiments implement multiple biometric factor identification with liveness to improve security and convenience. In one example, a first factor, face (e.g., image capture), is used to establish identity. In another example, the second factor, voice (e.g., via random set of words), is used to confirm identity, and establish authentication with the further benefit of confirming (or not) that the source presenting the biometric input is live. In yet other embodiments, the system can implement comprehensive models of liveness validation that span multiple authentication credentials (e.g., biometric and/or behavioral instances).

Various embodiments of private biometric systems are configured to execute liveness. The system generates random text that is selected to take roughly 5 seconds to speak (in whatever language the user prefers—and with other example threshold minimum periods). The user reads the text and the system (e.g., implemented as a private biometrics cloud service or component) then captures the audio and performs a speech to text process, comparing the pronounced text to the requested text. The system allows, for example, a private biometric component to assert the liveness of the requestor for authentication. In conjunction with liveness, the system compares the random text voice input and performs an identity assertion on the same input to ensure the voice that spoke the random words matches the user's identity. For example, input audio is now used for liveness and identity.

In other embodiments, liveness is determined based on multiple dimensions. For example, the system can be configured to handle multiple different behavioral biometric inputs including even health profiles that are based at least in part on health readings from health sensors (e.g., heart rate, blood pressure, EEG signals, body mass scans, genome, etc.), and can, in some examples, include behavioral biometric capture/processing. Once processed through a generation neural network such UBA data becomes private such that no user actions or behaviors are ever transmitted across the internet—rather the encrypted form output by the generation network is used.

According to one embodiment, the solution for liveness uses an ensemble of models. The system can initially use a behavioral biometric model to establish an identity—on authentication the system can use any one test of dimensions in model to determine a valid liveness measure. Based on an action being requested and/or confidence thresholds established for that action, the system can be configured to test additional dimensions until the threshold is satisfied.

An example flow for multiple dimension liveness testing can include any one or more of the following steps:

1. gather plaintext behavioral biometric input (e.g. face, fingerprint, voice, UBA) and use data as input for the first DNN to generate encrypted embeddings
2. A second DNN (a classifier network) classifies the encrypted embeddings from (1) and returns an identity score (or put another way, the system gathers an original behavioral biometric identity via a prediction after transmitting the embedding.
3. One example test of liveness can be executed with spoken random liveness sentence to make sure the person making the request is active (alive). If the user's spoken words match the requested words (above a predetermined threshold) the system established a liveness dimension.
4. The same audio from Step #1 is employed by the system to predict an identity. If the identity from Step #1 and Step #3 are the same, we have another liveness dimension.
5. The system can then also use private UBA to determine identity and liveness. For example, current actions are input to Private UBA (Step #1) and to return an identity and a probability that the measurements reflect that identity. If the behavior identity is the same as the previous identity, we have an additional liveness dimension.

Example executions can include the following: acquire accelerometer and gyroscope data to determine if the user is holding the phone in the usual manner; acquire finger tapping data to determine if the user is touching the phone in the expected manner; and/or acquire optical heart sensor data from a watch to determine if the user's heart is beating in the expected manner.

Table XI describes various example behavioral instances that can be used as input to a generation network to output distance measurable encrypted versions of the input.

TABLE XI

| Human behavioral biometrics | Machine behavioral biometrics | |
|---|---|---|
| Fingerprint | Keyboard, Mouse | Proximity |
| Iris | Time | GPS |
| Face | Network Access, Latency, Packets | WiFi |
| Voice | Geolocation | Bluetooth |
| Palm | Fingerprint sensor | Bluetooth Beacons |
| Clothing | Camera - Faces | Magnetic Field |
| Vascular scans | Camera - Avg Light | Linear Acceleration |
| Time history | Microphone/Audio | Gravity |
| Cheek/ear | Audio Magnitude | Orientation |
| Skin color/features | Touch sensor | Pedometer |
| Hair style/color | Temperature - Ambient | Screen state |
| Beard/moustache | Accelerometer | Log messages |
| Eye movement (Eye Tracking) | Device access | App Usage |
| Heart beat | App access | Android - Configuration |
| Gait | Cloud access | Browsing history |
| Gestures | Credit card payments | Android Apps with 0 ms Usage |
| Behavior | Payment methods | GALAXY WATCH |
| Psychological | Health monitoring | MEMS Accelerometer |
| Contextual behavior | SIM card | MEMS Gyroscope |
| Finger tapping | Gyroscope | MEMS Barometer |
| Location | Magnetometer | Electro-optical sensor (for heart rate monitoring) |
| Posture | Watch Accelerometer | Photodetector (for ambient light) |
| | Watch Compass | APPLE WATCH |
| | Location (quick) | GPS & GLOSNASS |
| | Phone State (App status, batterystate, WiFi availability, on the phone, time-of-day) | Optical heart sensor |
| | Environ: Air pressure, Humidity, Temperature | ECG/EKG (Electrical heart sensor) Accelerometer Gyroscope Ambient Light Sensor |

According to various aspects, the system can be configured to evaluate liveness as an ensemble model of many dimensions, in addition to embodiments that evaluate single liveness measures (e.g., voice).

Thus, any confidence measure can be obtained using UBA, by evaluating a nearly infinite number of additional metrics (additional dimensions) to the liveness score. And, as described in the example steps 1-5, each UBA factor can also contribute a system generated identity score, as well.

Stated broadly, multi-dimension liveness can include one or more of the following operations: 1) a set of plaintext UBA input points are acquired as input data to a model; 2) the first DNN (e.g., a generation network tailored the UBA input points) generates encrypted embeddings based on the plaintext input and the system operates on the embeddings such that the actual user behavior data is never transmitted. For example, the encrypted behavioral embeddings have no correlation to any user action nor can any user action data be inferred from the embeddings; and 3) the behavioral embeddings are sent for processing (e.g., from a mobile device to a server) to generate a liveness measure as a probability through a second DNN (second network or classification network/model).

Example Technical Models for UBA (e.g., Generation Network)

Various neural networks can be used to accept plaintext behavioral information as input and output distance measurable encrypted feature vectors. According to one example, the first neural network (i.e., the generation neural network) can be architected as a Long Short-Term Memory (LSTM) model which is a type of Recurrent Neural Network (RNN). In various embodiments, the system is configured to invoke these models to process UBA, which is a time series data. In other embodiments, different first or generation networks can be used to create distance measurable encrypted embeddings from behavioral inputs. For example, the system can use a Temporal Convolutional Networks (TCNs) as the model to process behavioral information, and in another example, a Gated Recurrent Unit Networks (GRUs) as the model.

According to some embodiments, once the first network generates distance measurable embeddings, a second network can be trained to classify on the embeddings and return an identification label or unknown result. For example, the second DNN (e.g., classification network) can be a fully connected neural network ("FCNN"), or commonly called a feed forward neural network ("FFNN"). In various embodiments, the system is configured to implement this type of model, to facilitate processing of attribute data, as opposed to image or binary data.

According to some embodiments, the second DNN model used for classifying is a FCNN which outputs classes and probabilities. In this setting, the feature vectors are used by the classifier component to bind a user's behavioral biometrics to a classification (i.e., mapping behavioral biometrics to a matchable/searchable identity). According to one embodiment, the deep learning neural network (e.g., enrollment and prediction network) can be executed by the system as a RNN trained on enrollment data. For example, the RNN is configured to generate an output identifying a person or indicating an UNKNOWN individual. In various embodiments, the second network (e.g., classification network which can be a deep learning neural network (e.g., an RNN)) is configured to differentiate between known persons and UNKNOWN.

According to another embodiment, the system can implement this functionality as a sigmoid function in the last layer that outputs probability of class matching based on newly input behavioral biometrics or showing failure to match. In further examples, the system can be configured to achieve matching based on one or more hinge loss functions. As discussed, the system and/or classifier component are configured to generate a probability to establish when a sufficiently close match is found. In one example, an "unknown" person is determined responsive to negative return values being generated by the classifier network. In further example, multiple matches on a variety of authentication credentials can be developed and voting can also be used based on the identification results of each to increase accuracy in matching.

According to various embodiments, the authentication system is configured to test liveness and test behavioral biometric identity using fully encrypted reference behavioral biometrics. For example, the system is configured to execute comparisons directly on the encrypted behavioral biometrics (e.g., encrypted feature vectors of the behavioral biometric or encrypted embeddings derived from unencrypted behavioral information) to determine authenticity with a learning neural network. In further embodiments, a first neural network is used to process unencrypted behavioral biometric inputs and generate distance or Euclidean measurable encrypted feature vectors or encrypted embeddings (e.g., distance measurable encrypted values—referred to as a generation network). The encrypted feature vectors are used to train a classification neural network. Multiple learning networks (e.g., deep neural networks—which can be referred to as classification networks) can be trained and used to predict matches on different types of authentication credential (e.g. behavioral biometric input (e.g., facial/feature behavioral biometrics, voice behavioral biometrics, health/biologic data behavioral biometrics, etc.). In some examples, multiple behavioral biometric types can be processed into an authentication system to increase accuracy of identification.

Various embodiments of the system can incorporate liveness, multi-dimensional liveness and various confidence thresholds for validation. A variety of processes can be executed to support such operation.

Figure 10:
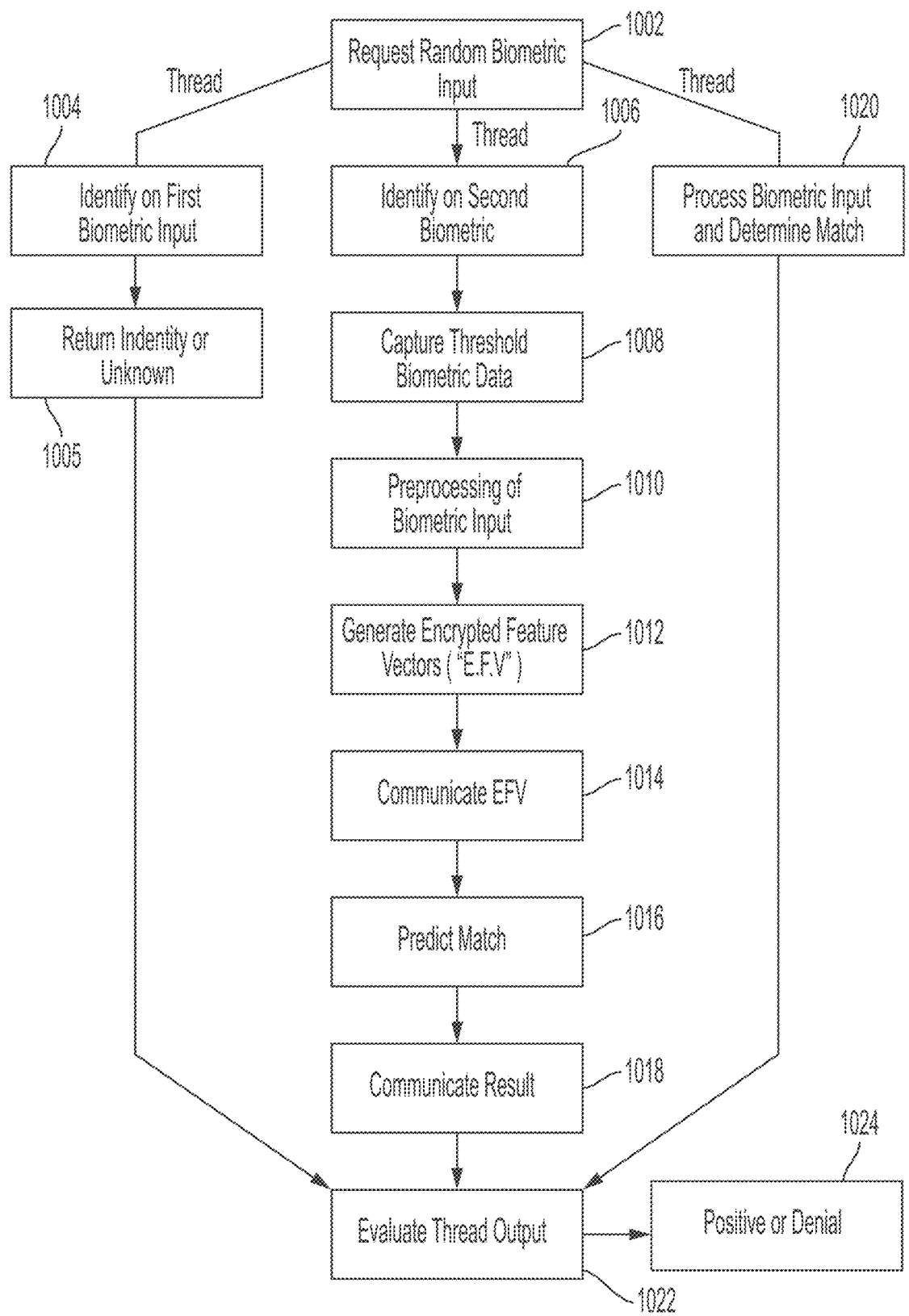
FIG. 10 is an example process for determining identity and liveness, according to one embodiment.

FIG. 10 is an example process flow 1000 for executing identification and liveness validation. Process 1000 can be executed by an authentication system (e.g., 704, FIG. 7 or 304, FIG. 3). According to one embodiment, process 1000 begins with generation of a set of random biometric instances (e.g., set of random words) and triggering a request for the set of random words at 1002. In various embodiments, process 1000 continues under multiple threads of operation. At 1004, a first biometric type can be used for a first identification of a user in a first thread (e.g., based on images captured of a user during input of the random words). Identification of the first biometric input (e.g., facial identification) can proceed as discussed herein (e.g., process unencrypted biometric input with a first neural network to output encrypted feature vectors, predict a match on the encrypted feature vectors with a DNN, and return an identification or unknown and/or use a first phase for distance evaluation), and as described in, for example, process 200 and/or process 250 below. At 1005, an identity corresponding to the first biometric or an unknown class is returned. At 1006, a second biometric type can be used for a second identification of a user in a second thread. For example, the second identification can be based upon a voice biometric. According to one embodiment, processing of a voice biometric can continue at 1008 with capture of at least a threshold amount of the biometric (e.g., 5 second of voice). In some examples, the amount of voice data used for identification can be reduced at 1010 with biometric pre-processing. In one embodiment, voice data can be reduced with execution of pulse code modulation. Various approaches for processing voice data can be applied, including pulse code modulation, amplitude modulation, etc., to convert input voice to a common format for processing. Some example functions that can be applied (e.g., as part of 1010) include Librosa (e.g., to eliminate background sound, normalize amplitude, etc.); pydub (e.g., to convert between mp3 and .wav formats); Librosa (e.g., for phase shift function); Scipy (e.g. to increase low frequency); Librosa (e.g., for pulse code modulation); and/or soundfile (e.g., for read and write sound file operations).

In various embodiments, processed voice data is converted to the frequency domain via a fourier transform (e.g., fast fourier transform, discrete fourier transform, etc.) which can be provided by numpy or scipy libraries. Once in the frequency domain, the two dimensional frequency array can be used to generate encrypted feature vectors.

In some embodiments, voice data is input to a pre-trained neural network to generate encrypted voice feature vectors at 1012. In one example, the frequency arrays are used as input to a pre-trained convolutional neural network ("CNN") which outputs encrypted voice feature vectors. In other embodiments, different pre-trained neural networks can be used to output encrypted voice feature vectors from unencrypted voice input. As discussed throughout, the function of the pre-trained neural network is to output distance measurable encrypted feature vectors upon voice data input. Once encrypted feature vectors are generated at 1012, the unencrypted voice data can be deleted. Some embodiments receive encrypted feature vectors for processing rather than generate them from unencrypted voice directly, in such embodiments there is no unencrypted voice to delete.

In one example, a CNN is constructed with the goal of creating embeddings and not for its conventional purpose of classifying inputs. In further example, the CNN can employ a triple loss function (including, for example, a hard triple loss function), which enables the CNN to converge more quickly and accurately during training than some other implementations. In further examples, the CNN is trained on hundreds or thousands of voice inputs. Once trained, the CNN is configured for creation of embeddings (e.g., encrypted feature vectors). In one example, the CNN accepts a two dimensional array of frequencies as an input and provides floating point numbers (e.g., 32, 64, 128, 256, 1028 . . . floating point numbers) as output.

In some executions of process 1000, the initial voice capture and processing (e.g., request for random words—1002-1012) can be executed on a user device (e.g., a mobile phone) and the resulting encrypted voice feature vector can be communicated to a remote service via an authentication API hosted and executed on cloud resources. In some other executions, the initial processing and prediction operations can be executed on the user device as well. Various execution architectures can be provided, including fully local authentication, fully remote authentication, and hybridization of both options.

In one embodiment, process 1000 continues with communication of the voice feature vectors to a cloud service (e.g., authentication API) at 1014. The voice feature vectors can then be processed by a fully connected neural network ("FCNN") for predicting a match to enrolled feature vectors and returning a trained label at 1016. As discussed, the input to the FCNN is an embedding generated by a first pre-trained neural network (e.g., an embedding comprising 32, 64, 128, 256, 1028, etc. floating point numbers). Prior to execution of process 1000, the FCNN is trained with a threshold number of people for identification (e.g., 500, 750, 1000, 1250, 1500 . . . etc.). The initial training can be referred to as "priming" the FCNN. The priming function is executed to improve accuracy of prediction operations performed by the FCNN.

At 1018, the FCNN returns a result matching a label or an unknown class—i.e., matches to an identity from among a group of candidates or does not match to a known identity. The result is communicated for evaluation of each threads' result at 1022.

According to various embodiments, the third thread of operation is executed to determine that the input biometrics used for identification are live (i.e., not spoofed, recorded, or replayed). For example, at 1020 the voice input is processed to determine if the input words matches the set of random words requested. In one embodiment, a speech recognition function is executed to determine the words input, and matching is executed against the randomly requested words to determine an accuracy of the match. If any unencrypted voice input remains in memory, the unencrypted voice data can be deleted as part of 1020. In various embodiments, processing of the third thread, can be executed locally on a device requesting authorization, on a remote server, a cloud resource, or any combination. If remote processing is executed, a recording of the voice input can be communicated to a server or cloud resource as part of 1020, and the accuracy of the match (e.g., input to random words) determined remotely. Any unencrypted voice data can be deleted once encrypted feature vectors are generated and/or once matching accuracy is determined.

In further embodiments, the results of each thread is joined to yield an authorization or invalidation. At 1024, the first thread returns an identity or unknown for the first biometric, the second thread returns an identity or unknown for the second biometric, and the third thread an accuracy of match between a random set of biometric instances and input biometric instances. At 1024, process 1000 provides a positive authentication indication wherein first thread identity matches the second thread identity and one of the biometric inputs is determined to be live (e.g., above a threshold accuracy (e.g., 33% or greater among other options). If not positive, process 1000 can be re-executed (e.g., a threshold number of times) or a denial can be communicated.

According to various embodiments, process 1000 can include concurrent, branched, and/or simultaneous execution of the authentication threads to return a positive authentication or a denial. In further embodiments, process 1000 can be reduced to a single biometric type such that one identification thread and one liveness thread is executed to return a positive authentication or a denial. In further embodiments, the various steps described can be executed together or in different order, and may invoke other processes (e.g., to generate encrypted feature vectors to process for prediction) as part of determining identity and liveness of biometric input. In yet other embodiments, additional biometric types can be tested to confirm identity, with at least one liveness test on one of the biometric inputs to provide assurance that submitted biometrics are not replayed or spoofed. In further example, multiple biometrics types can be used for identity and multiple biometric types can be used for liveness validation.

Example Authentication System with Liveness

In some embodiments, an authentication system interacts with any application or system needing authentication service (e.g., a Private Biometrics Web Service). According to one embodiment, the system uses private voice biometrics to identify individuals in a datastore (and provides one to many (1:N) identification) using any language in one second. Various neural networks measure the signals inside of a voice sample with high accuracy and thus allow private biometrics to replace "username" (or other authentication schemes) and become the primary authentication vehicle.

In some examples, the system employs face (e.g., images of the user's face) as the first biometric and voice as the second biometric type, providing for at least two factor authentication ("2FA"). In various implementation, the system employs voice for identity and liveness as the voice biometric can be captured with the capture of a face biometric. Similar biometric pairings can be executed to provide a first biometric identification, a second biometric identification for confirmation, coupled with a liveness validation.

In some embodiments, an individual wishing to authenticate is asked to read a few words while looking into a camera and the system is configured to collect the face biometric and voice biometric while the user is speaking. According to various examples, the same audio that created the voice biometric is used (along with the text the user was requested to read) to check liveness and to ensure the identity of the user's voice matches the face.

Such authentication can be configured to augment security in a wide range of environments. For example, private biometrics (e.g., voice, face, health measurements, etc.) can be used for common identity applications (e.g., "who is on the phone?") and single factor authentication (1FA) by call centers, phone, watch and TV apps, physical security devices (door locks), and other situations where a camera is unavailable. Additionally, where additional biometrics can be captured 2FA or better can provide greater assurance of identity with the liveness validation.

Broadly stated, various aspects implement similar approaches for privacy-preserving encryption for processed biometrics (including, for example, face and voice biometrics). Generally stated, after collecting an unencrypted biometric (e.g., voice biometric), the system creates a private biometric (e.g., encrypted feature vectors) and then discards the original unencrypted biometric template. As discussed herein, these private biometrics enable an authentication system and/or process to identify a person (i.e., authenticate a person) while still guaranteeing individual privacy and fundamental human rights by only operating on biometric data in the encrypted space.

To transform the unencrypted voice biometric into a private biometric, various embodiments are configured to pre-process the voice signal and reduce the voice data to a smaller form (e.g., for example, without any loss). The Nyquist sampling rate for this example is two times the frequency of the signal. In various implementations, the system is configured to sample the resulting data and use this sample as input to a Fourier transform. In one example, the resulting frequencies are used as input to a pre-trained voice neural network capable of returning a set of embeddings (e.g., encrypted voice feature vectors). These embeddings, for example, sixty four floating point numbers, provide the system with private biometrics which then serve as input to a second neural network for classification.

Example Validation Augmentation

Figure 11:
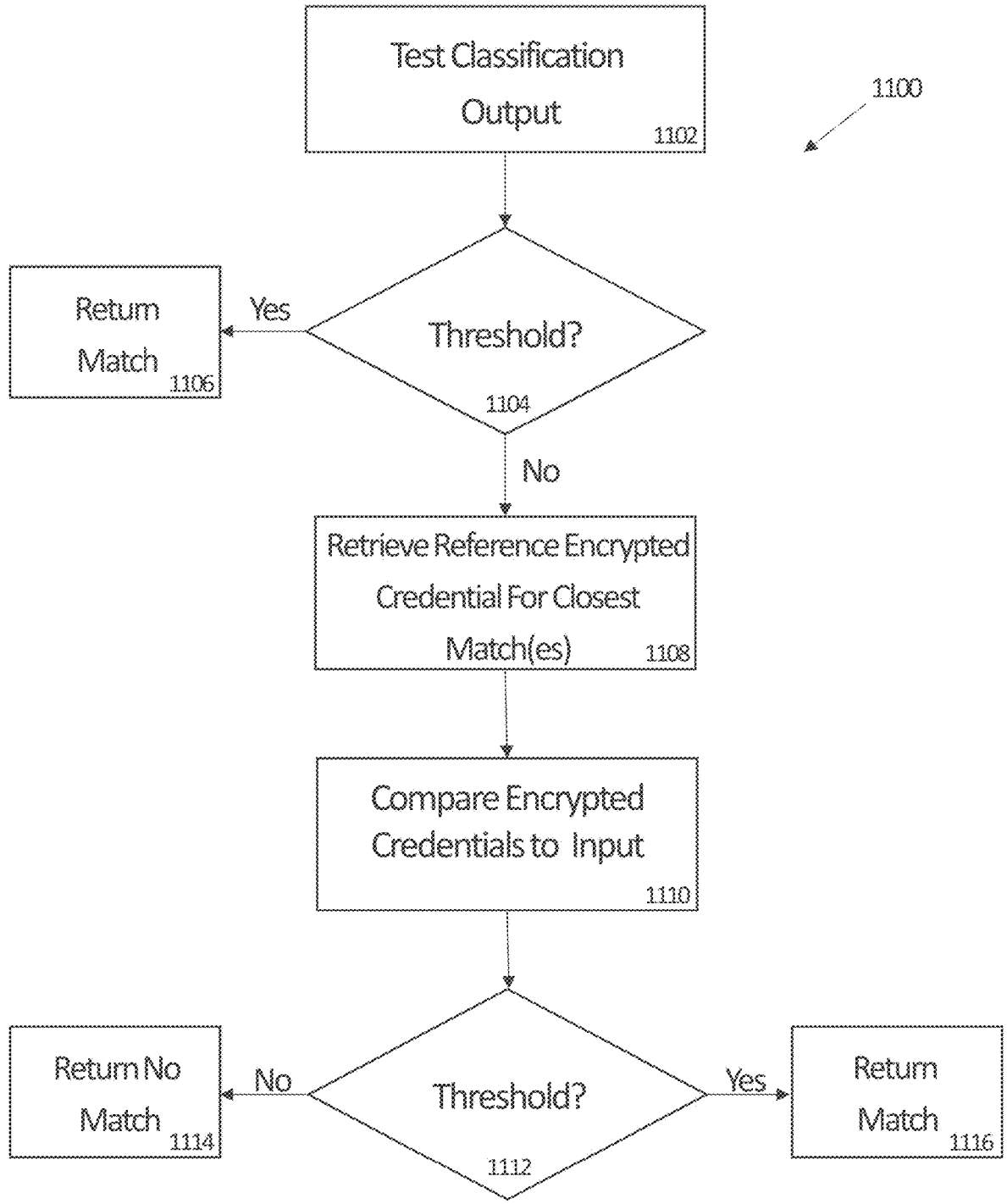
FIG. 11 is an example process flow for validating an output of a classification network, according to one embodiment.

FIG. 11 is an example process flow 1100 for validating an output of a classification network. According to some embodiments, a classification network can accept encrypted authentication credentials as an input and return a match or unknown result based on analyzing the encrypted authentication credential. According to one embodiment, process 1100 can be executed responsive to generation of an output by the classification network. For example, at 1102 a classification output is tested. At 1104, the testing determines if any of the output values meet or exceed a threshold for determining a match. If yes (e.g., 1104 YES), the matching result is returned at 1106.

If the threshold is not met, 1104 NO, process 1100 continues at 1108. According to one embodiment, a reference encrypted credential associated with the closest matches determined by the classification network can be retrieved at 1108. Although the probability of the match main be too low to return an authentication or identification result, the highest probability matches can be used to retrieve stored encrypted authentication credentials for those matches or the highest probability match. At 1110 the retrieved credentials can be compared to the input that was processed by the classification network (e.g. a new encrypted authentication credential).

According to one example, the comparison at 1110 can include a distance evaluation between the input authentication credential and the reference authentication credentials associated with known labels/entities. If the distance evaluation meets a threshold, 1112 YES, process 1100 continues at 1116 and returns a match to the known label/entity. If the threshold is not met, 1112 NO, then process 1100 continues at 1114 with a return of no match. Post classification validation can be used in cases where a threshold probability is not met, as well as case where a threshold is satisfied (e.g., to confirm a high probability match), among other options.

Private Biometric Implementation

Various embodiments are discussed below for enrolling users with private biometrics and prediction on the same. Various embodiments describe some considerations broadly and provide illustrative examples for implementation of private biometrics. These examples and embodiments can be used with liveness verification of the respective private biometrics as discussed above. Further embodiments can include and/or be coupled with various helper networks to facilitate authentication information acquisition, validation, and/or enrollment of the same, and establish a fully private implementation for identification and authentication.

FIG. 1 is an example process flow 100 for enrolling in a privacy-enabled biometric system (e.g., FIG. 3, 304 described in greater detail below or FIG. 7, 704 above). Process 100 begins with acquisition of unencrypted biometric data at 102. The unencrypted biometric data (e.g., plaintext, reference biometric, etc.) can be directly captured on a user device, received from an acquisition device, or communicated from stored biometric information. In one example, a user takes a photo of themselves on their mobile device for enrollment. Pre-processing steps can be executed on the biometric information at 104. For example, given a photo of a user, pre-processing can include cropping the image to significant portions (e.g., around the face or facial features). Various examples exist of photo processing options that can take a reference image and identify facial areas automatically.

In another example, the end user can be provided a user interface that displays a reference area, and the user is instructed to position their face from an existing image into the designated area. Alternatively, when the user takes a photo, the identified area can direct the user to focus on their face so that it appears within the highlighted area. In other options, the system can analyze other types of images to identify areas of interest (e.g., iris scans, hand images, fingerprint, etc.) and crop images accordingly. In yet other options, samples of voice recordings can be used to select data of the highest quality (e.g., lowest background noise), or can be processed to eliminate interference from the acquired biometric (e.g., filter out background noise).

Having a given biometric, the process 100 continues with generation of additional training biometrics at 106. For example, a number of additional images can be generated from an acquired facial image. In one example, an additional twenty five images are created to form a training set of images. In some examples, as few as three or even one images can be used but with the tradeoff of reduced accuracy. In other examples, as many as forty training images may be created or acquired. The training set is used to provide for variation of the initial biometric information, and the specific number of additional training points can be tailored to a desired accuracy (see e.g., Tables I-VIII below provide example implementation and test results).

Other embodiments can omit generation of additional training biometrics. Various ranges of training set production can be used in different embodiments (e.g., any set of images from two to one thousand). For an image set, the training group can include images of different lighting, capture angle, positioning, etc. For audio based biometrics different background noises can be introduced, different words can be used, different samples from the same vocal biometric can be used in the training set, among other options. Various embodiments of the system are configured to handle multiple different biometric inputs including even health profiles that are based at least in part on health readings from health sensors (e.g., heart rate, blood pressure, EEG signals, body mass scans, genome, etc.), and can, in some examples, include behavioral biometric capture/processing. According to various embodiments, biometric information includes Initial Biometric Values (IBV) a set of plaintext values (pictures, voice, SSNO, driver's license number, etc.) that together define a person.

At 108, feature vectors are generated from the initial biometric information (e.g., one or more plain text values that identify an individual). Feature vectors are generated based on all available biometric information which can include a set of and training biometrics generated from the initial unencrypted biometric information received on an individual or individuals. According to one embodiment, the IBV is used in enrollment and for example in process 100. The set of IBVs are processed into a set of initial biometric vectors (e.g., encrypted feature vectors) which are used downstream in a subsequent neural network.

In one implementation, users are directed to a website to input multiple data points for biometric information (e.g., multiple pictures including facial images), which can occur in conjunction with personally identifiable information ("PII"). The system and/or execution of process 100 can include tying the PII to encryptions of the biometric as discussed below.

In one embodiment, a convolutional deep neural network is executed to process the unencrypted biometric information and transform it into feature vector(s) which have a property of being one-way encrypted cipher text. The neural network is applied (108) to compute a one-way homomorphic encryption of the biometric—resulting in feature vectors (e.g., at 110). These outputs can be computed from an original biometric using the neural network but the values are one-way in that the neural network cannot then be used to regenerate the original biometrics from the outputs.

Various embodiments employ networks that take as input a plaintext input and return Euclidean measurable output. One such implementation is FaceNet which takes in any image of a face and returns 128 floating point numbers, as the feature vector. The neural network is fairly open ended, where various implementations are configured to return a distance or Euclidean measurable feature vector that maps to the input. This feature vector is nearly impossible to use to recreate the original input biometric and is therefore considered a one-way encryption.

Various embodiments are configured to accept the feature vector(s) produced by a first neural network and use it as input to a new neural network (e.g., a second classifying neural network). According to one example, the new neural network has additional properties. This neural network is specially configured to enable incremental training (e.g., on new users and/or new feature vectors) and configured to distinguish between a known person and an unknown person. In one example, a fully connected neural network with 2 hidden layers and a "hinge" loss function is used to process input feature vectors and return a known person identifier (e.g., person label or class) or indicate that the processed biometric feature vectors are not mapped to a known person. For example, the hinge loss function outputs one or more negative values if the feature vector is unknown. In other examples, the output of the second neural network is an array of values, wherein the values and their positions in the array determined a match to a person or identification label.

Various embodiments use different machine learning models for capturing feature vectors in the first network. According to various embodiments, the feature vector capture is accomplished via a pre-trained neural network (including, for example, a convolutional neural network) where the output is distance measurable (e.g., Euclidean measurable). In some examples, this can include models having a softmax layer as part of the model, and capture of feature vectors can occur preceding such layers. Feature vectors can be extracted from the pre-trained neural network by capturing results from the layers that are Euclidean measurable. In some examples, the softmax layer or categorical distribution layer is the final layer of the model, and feature vectors can be extracted from the n−1 layer (e.g., the immediately preceding layer). In other examples, the feature vectors can be extracted from the model in layers preceding the last layer. Some implementations may offer the feature vector as the last layer.

In some embodiments, an optional step can be executed as part of process 100 (not shown). The optional step can be executed as a branch or fork in process 100 so that authentication of a user can immediately follow enrollment of a new user or authentication information. In one example, a first phase of enrollment can be executed to generate encrypted feature vectors. The system can use the generated encrypted feature vectors directly for subsequent authentication. For example, distance measures can be application to determine a distance between enrolled encrypted feature vectors and a newly generated encrypted feature vector. Where the distance is within a threshold, the user can be authenticated or an authentication signal returned. In various embodiments, this optional authentication approach can be used while a classification network is being trained on encrypted feature vectors in the following steps.

The resulting feature vectors are bound to a specific user classification at 112. For example, deep learning is executed at 112 on the feature vectors based on a fully connected neural network (e.g., a second neural network, an example classifier network). The execution is run against all the biometric data (i.e., feature vectors from the initial biometric and training biometric data) to create the classification information. According to one example, a fully connected neural network having two hidden layers is employed for classification of the biometric data. In another example, a fully connected network with no hidden layers can be used for the classification. However, the use of the fully connected network with two hidden layers generated better accuracy in classification in some example executions (see e.g., Tables I-VIII described in greater detail below). According to one embodiment, process 100 can be executed to receive an original biometric (e.g., at 102) generate feature vectors (e.g., 110), and apply a FCNN classifier to return a label for identification at 112 (e.g., output #people).

In further embodiments, step 112 can also include filtering operations executed on the encrypted feature vectors before binding the vectors to a label via training the second network. For example, encrypted feature vectors can be analyzed to determine if they are within a certain distance of each other. Where the generated feature vectors are too far apart, they can be rejected for enrollment (i.e., not used to train the classifier network). In other examples, the system is configured to request additional biometric samples, and re-evaluate the distance threshold until satisfied. In still other examples, the system rejects the encrypted biometrics and request new submissions to enroll.

Process 100 continues with discarding any unencrypted biometric data at 114. In one example, an application on the user's phone is configured to enable enrollment of captured biometric information and configured to delete the original biometric information once processed (e.g., at 114). In other embodiments, a server system can process received biometric information and delete the original biometric information once processed. According to some aspects, only requiring that original biometric information exists for a short period during processing or enrollment significantly improves the security of the system over conventional approaches. For example, systems that persistently store or employ original biometric data become a source of vulnerability. Unlike a password that can be reset, a compromised biometric remains compromised, virtually forever.

Returning to process 100, at 116 the resulting cipher text (e.g., feature vectors) biometric is stored. In one example, the encrypted biometric can be stored locally on a user device. In other examples, the generated encrypted biometric can be stored on a server, in the cloud, a dedicated data store, or any combination thereof. In one example, the encrypted biometrics and classification is stored for use in subsequent matching or searching. For instance, new biometric information can be processed to determine if the new biometric information matches any classifications. The match (depending on a probability threshold) can then be used for authentication or validation.

In cases where a single match is executed, the neural network model employed at 112 can be optimized for one to one matching. For example, the neural network can be trained on the individual expected to use a mobile phone (assuming no other authorized individuals for the device). In some examples, the neural network model can include training allocation to accommodate incremental training of the model on acquired feature vectors over time. Various embodiments, discussed in great detail below incorporate incremental training operations for the neural network to permit additional people and to incorporate newly acquired feature vectors.

In other embodiments, an optimized neural network model (e.g., FCNN) can be used for a primary user of a device, for example, stored locally, and remote authentication can use a data store and one to many models (e.g., if the first model returns unknown). Other embodiments may provide the one to many models locally as well. In some instances, the authentication scenario (e.g., primary user or not) can be used by the system to dynamically select a neural network model for matching, and thereby provide additional options for processing efficiency.

Figure 2A:
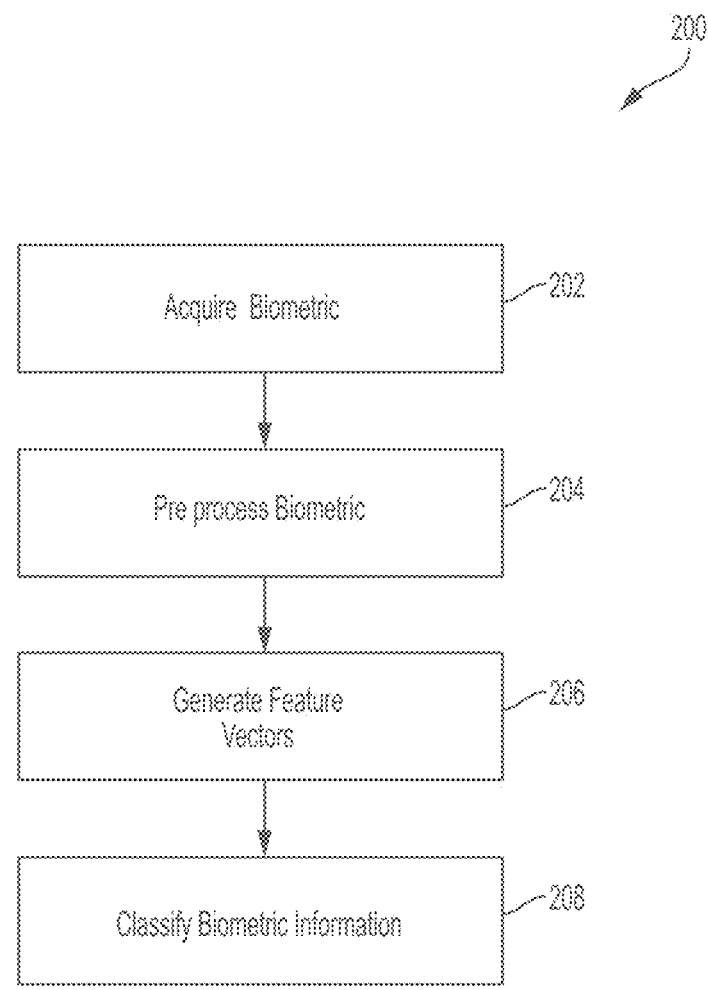
FIG. 2A is an example process flow for authentication with secured biometric data, according to one embodiment.

FIG. 2A illustrates an example process 200 for authentication with secured biometric data. Process 200 begins with acquisition of multiple unencrypted biometrics for analysis at 202. In one example, the privacy-enabled biometric system is configured to require at least three biometric identifiers (e.g., as plaintext data, reference biometric, or similar identifiers). If for example, an authentication session is initiated, the process can be executed so that it only continues to the subsequent steps if a sufficient number of biometric samples are taken, given, and/or acquired. The number of required biometric samples can vary, and take place with as few as one.

Similar to process 100, the acquired biometrics can be pre-processed at 204 (e.g., images cropped to facial features, voice sampled, iris scans cropped to relevant portions, etc.). Once pre-processing is executed the biometric information is transformed into a one-way homomorphic encryption of the biometric information to acquire the feature vectors for the biometrics under analysis (e.g., at 206). Similar to process 100, the feature vectors can be acquired using any pre-trained neural network that outputs distance measurable encrypted feature vectors (e.g., Euclidean measurable feature vectors, homomorphic encrypted feature vectors, among other options). In one example, this includes a pre-trained neural network that incorporates a softmax layer. However, other examples do not require the pre-trained neural network to include a softmax layer, only that they output Euclidean measurable feature vectors. In one example, the feature vectors can be obtained in the layer preceding the softmax layer as part of step 206.

In various embodiments, authentication can be executed based on comparing distances between enrolled encrypted biometrics and subsequently created encrypted biometrics. In further embodiments, this is executed as a first phase of authentication. Once a classifying network is trained on the encrypted biometrics a second phase of authentication can be used, and authentication determinations made via 208.

According to some embodiments, the phases of authentication can be executed together and even simultaneously. In one example, an enrolled user will be authenticated using the classifier network (e.g., second phase), and a new user will be authenticated by comparing distances between encrypted biometrics (e.g., first phase). As discussed, the new user will eventually be authenticated using a classifier network trained on the new user's encrypted biometric information, once the classifier network is ready.

At 208, a prediction (e.g., a via deep learning neural network) is executed to determine if there is a match for the person associated with the analyzed biometrics. As discussed above with respect to process 100, the prediction can be executed as a fully connected neural network having two hidden layers (during enrollment the neural network is configured to identify input feature vectors as (previously enrolled) individuals or unknown, and an unknown individual (not previously enrolled) can be added via incremental training or full retraining of the model). In other examples, a fully connected neural network having no hidden layers can be used. Examples of neural networks are described in greater detail below (e.g., FIG. 4 illustrates an example neural network 400). Other embodiments of the neural network can be used in process 200. According to some embodiments, the neural network features include operates as a classifier during enrollment to map feature vectors to identifications; operates as a predictor to identify a known person or an unknown. In some embodiments, different neural networks can be tailored to different types of biometrics, and facial images processed by one, while voice biometrics are processed by another.

According to some embodiments, process 208 is described agnostic to submitter security. In other words, process 200 relies on front end application configuration to ensure submitted biometrics are captured from the person trying to authenticate. As process 200 is agnostic to submitter security, the process can be executed in local and remote settings in the same manner. However, according to some implementations the execution relies on the native application or additional functionality in an application to ensure an acquired biometric represents the user to be authenticated or matched.

Figure 2B:
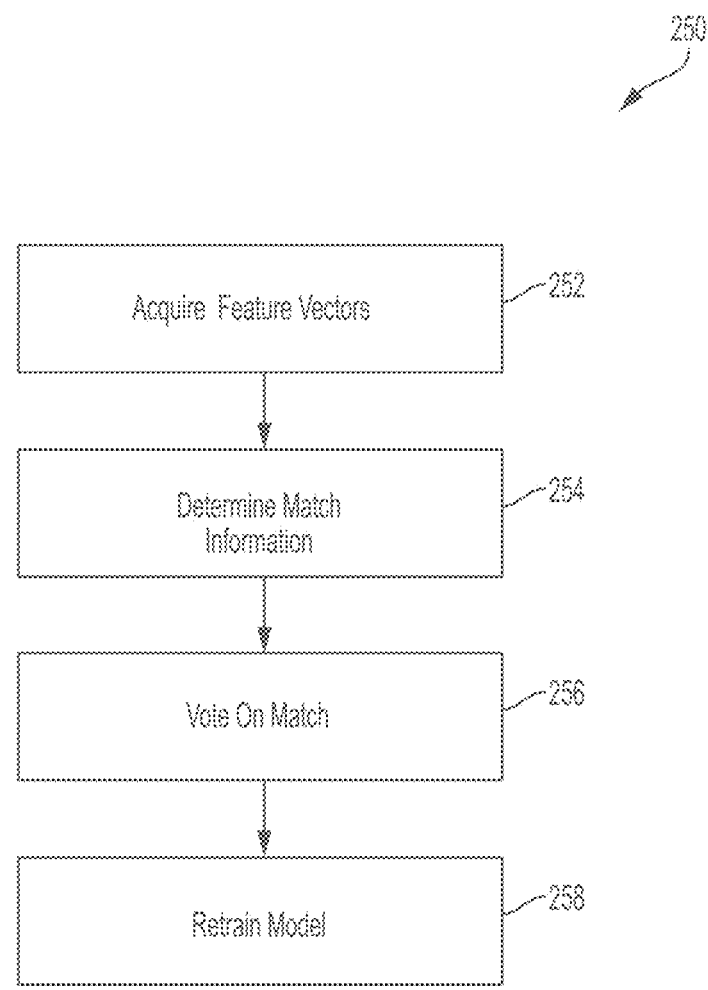
FIG. 2B is an example process flow for one to many matching execution, according to one embodiment.

FIG. 2B illustrates an example process flow 250 showing additional details for a one to many matching execution (also referred to as prediction). According to one embodiment, process 250 begins with acquisition of feature vectors (e.g., step 206 of FIG. 2A or 110 of FIG. 1). At 254, the acquired feature vectors are matched against existing classifications via a deep learning neural network. In one example, the deep learning neural network has been trained during enrollment on s set of individuals. The acquired feature vectors will be processed by the trained deep learning network to predict if the input is a match to known individual or does not match and returns unknown. In one example, the deep learning network is a fully connected neural network ("FCNN"). In other embodiments, different network models are used for the second neural network.

According to one embodiment, the FCNN outputs an array of values. These values, based on their position and the value itself, determine the label or unknown. According to one embodiment, returned from a one to many case are a series of probabilities associated with the match—assuming five people in the trained data: the output layer showing probability of match by person: [0.1, 0.9, 0.3, 0.2, 0.1] yields a match on Person 2 based on a threshold set for the classifier (e.g., >0.5). In another run, the output layer: [0.1, 0.6, 0.3, 0.8, 0.1] yields a match on Person 2 & Person 4 (e.g., using the same threshold).

However, where two results exceed the match threshold, the process and or system is configured to select the maximum value and yield a (probabilistic) match Person 4. In another example, the output layer: [0.1, 0.2, 0.3, 0.2, 0.1] shows no match to a known person—hence an UNKNOWN person—as no values exceed the threshold. Interestingly, this may result in adding the person into the list of authorized people (e.g., via enrollment discussed above), or this may result in the person being denied access or privileges on an application. According to various embodiments, process 250 is executed to determine if the person is known or not. The functions that result can be dictated by the application that requests identification of an analyzed biometrics.

For an UNKNOWN person, i.e. a person never trained to the deep learning enrollment and prediction neural network, an output layer of an UNKNOWN person looks like [−0.7, −1.7, −6.0, −4.3]. In this case, the hinge loss function has guaranteed that the vector output is all negative. This is the case of an UNKNOWN person. In various embodiments, the deep learning neural network must have the capability to determine if a person is UNKNOWN. Other solutions that appear viable, for example, support vector machine ("SVM") solutions break when considering the UNKNOWN case. In one example, the issue is scalability. An svm implementation cannot scale in the many-to-many matching space becoming increasing unworkable until the model simply cannot be used to return a match in any time deemed functional (e.g., 100 person matching cannot return a result in less than 20 minutes). According to various embodiments, the deep learning neural network (e.g., an enrollment & prediction neural network) is configured to train and predict in polynomial time.

Step 256 can be executed to vote on matching. According to one embodiment, multiple images or biometrics are processed to identify a match. In an example where three images are processed the FCNN is configured to generate an identification on each and use each match as a vote for an individual's identification. Once a majority is reached (e.g., at least two votes for person A) the system returns as output identification of person A. In other instance, for example, where there is a possibility that an unknown person may result—voting can be used to facilitate determination of the match or no match. In one example, each result that exceeds the threshold probability can count as one vote, and the final tally of votes (e.g., often 4 out of 5) is used to establish the match. In some implementations, an unknown class may be trained in the model—in the examples above a sixth number would appear with a probability of matching the unknown model. In other embodiments, the unknown class is not used, and matching is made or not against known persons. Where a sufficient match does not result, the submitted biometric information is unknown.

Responsive to matching on newly acquired biometric information, process 250 can include an optional step 258 for retraining of the classification model. In one example, a threshold is set such that step 258 tests if a threshold match has been exceeded, and if yes, the deep learning neural network (e.g., classifier & prediction network) is retrained to include the new feature vectors being analyzed. According to some embodiments, retraining to include newer feature vectors permits biometrics that change over time (e.g., weight loss, weight gain, aging or other events that alter biometric information, haircuts, among other options).

Figure 3:
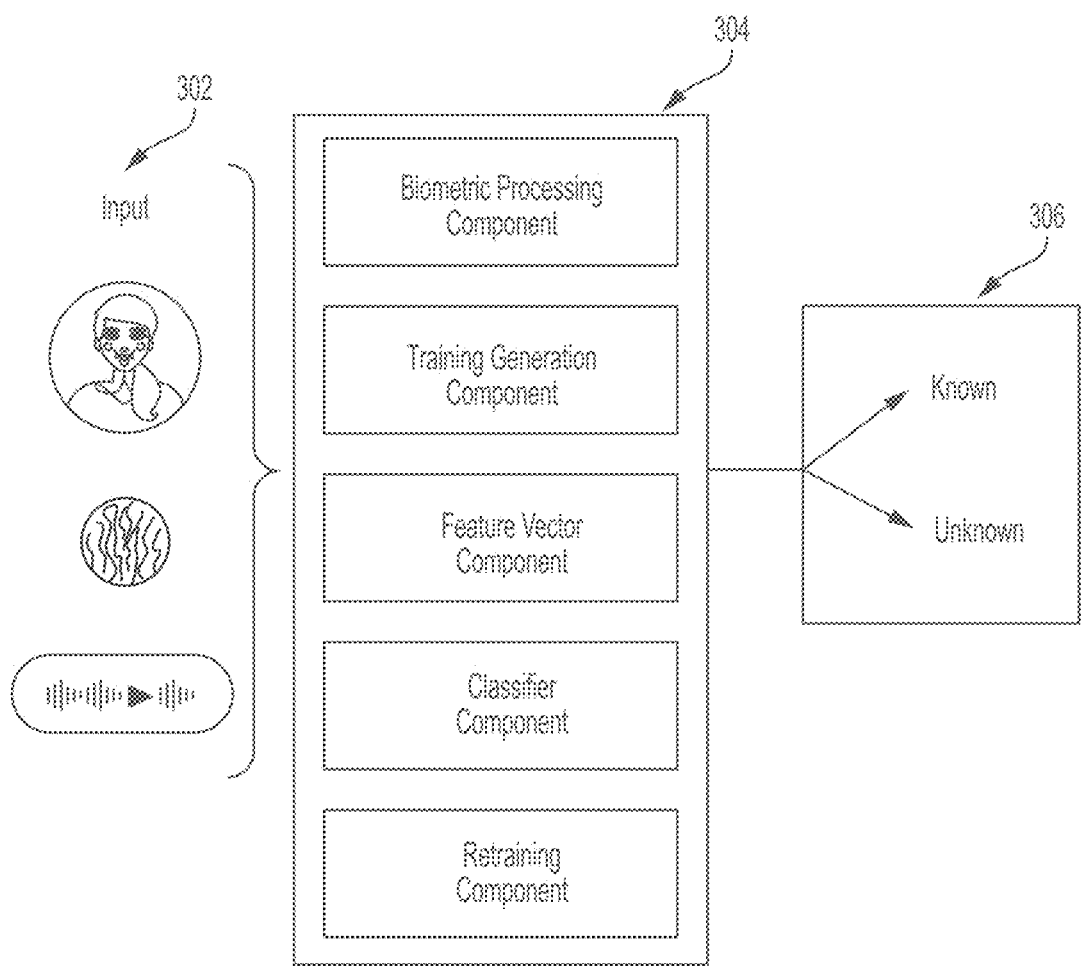
FIG. 3 is a block diagram of an embodiment of a privacy-enabled biometric system, according to one embodiment.
Figure 4A:
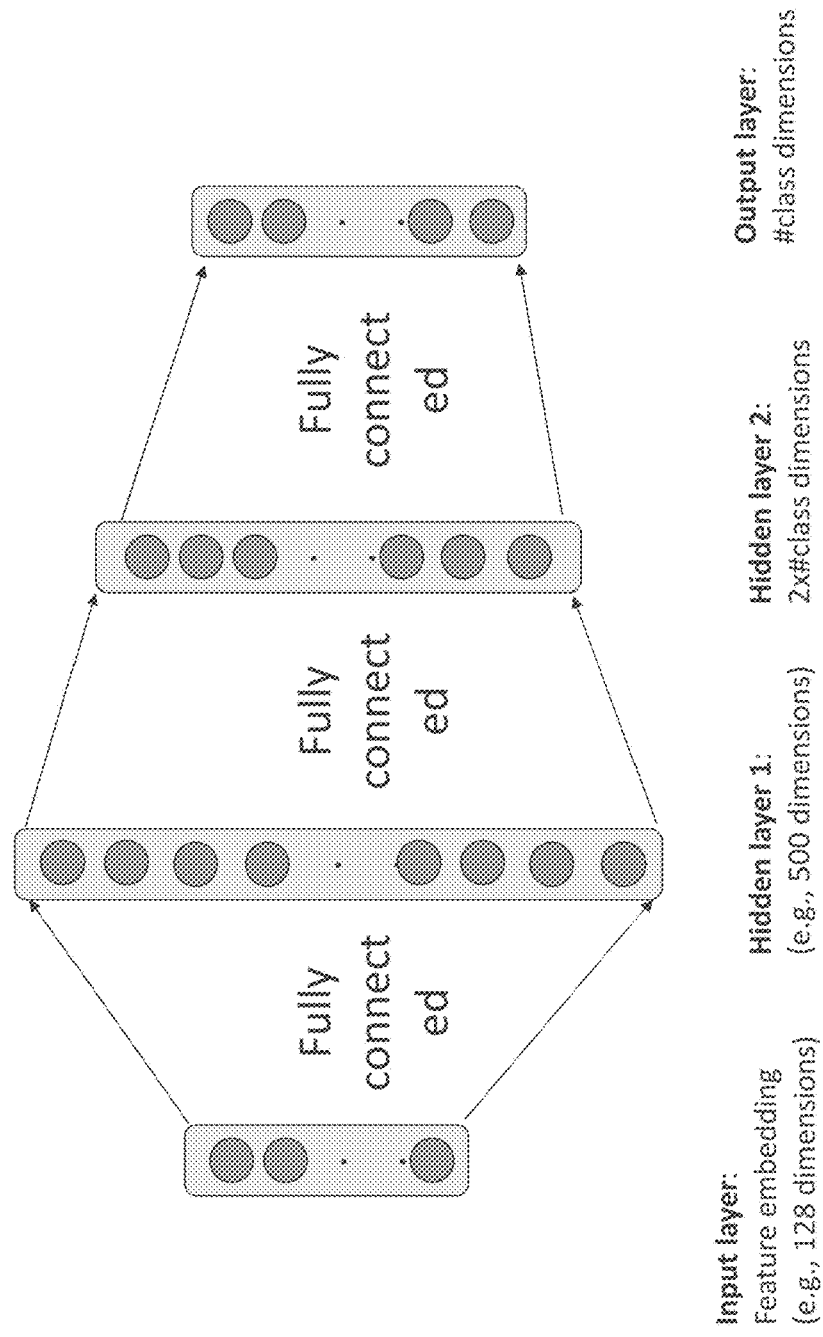
FIG. 4A-D are a diagrams of embodiments of a fully connected neural network for classification.
Figure 4B:
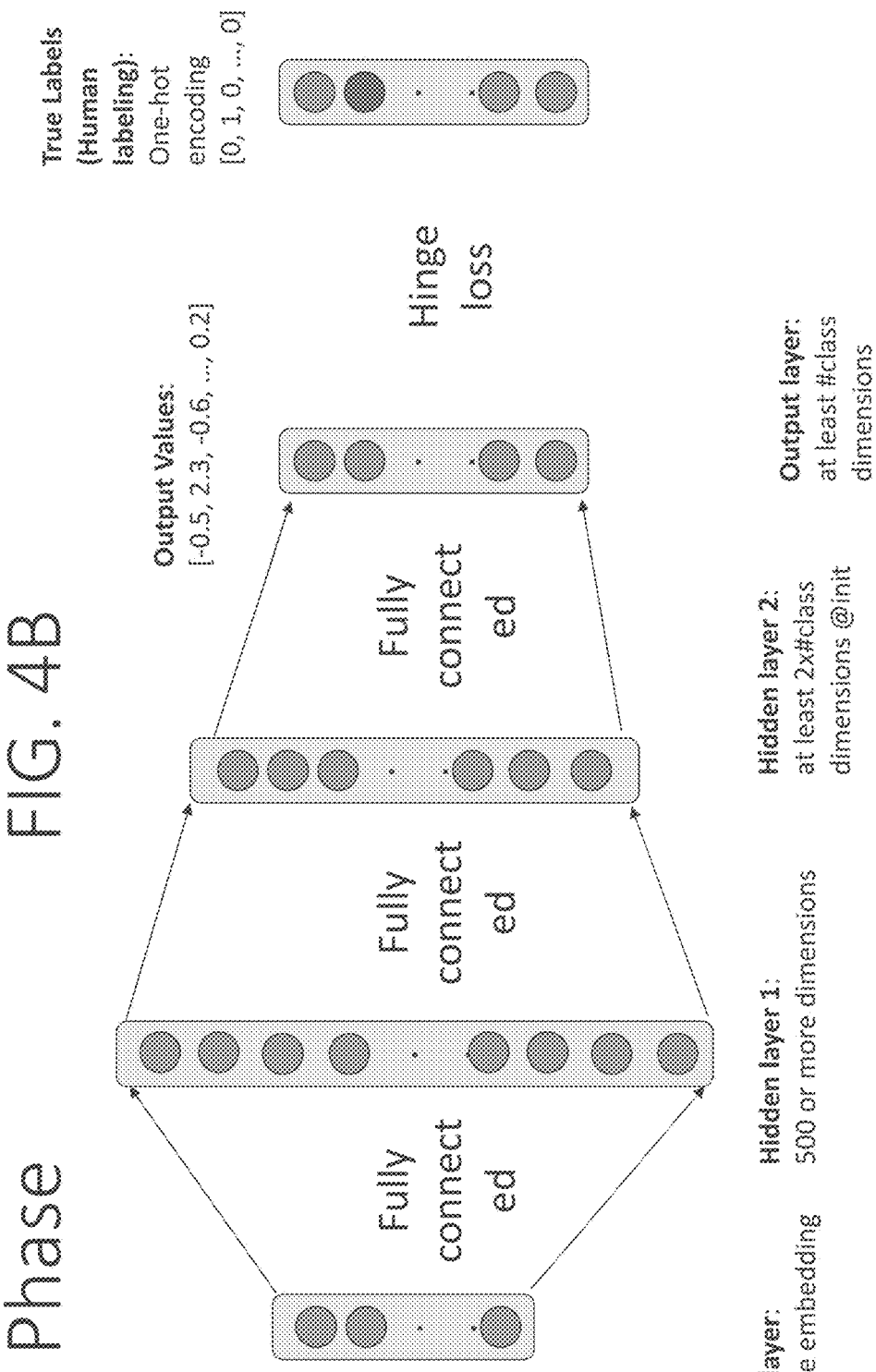
Figure 4C:
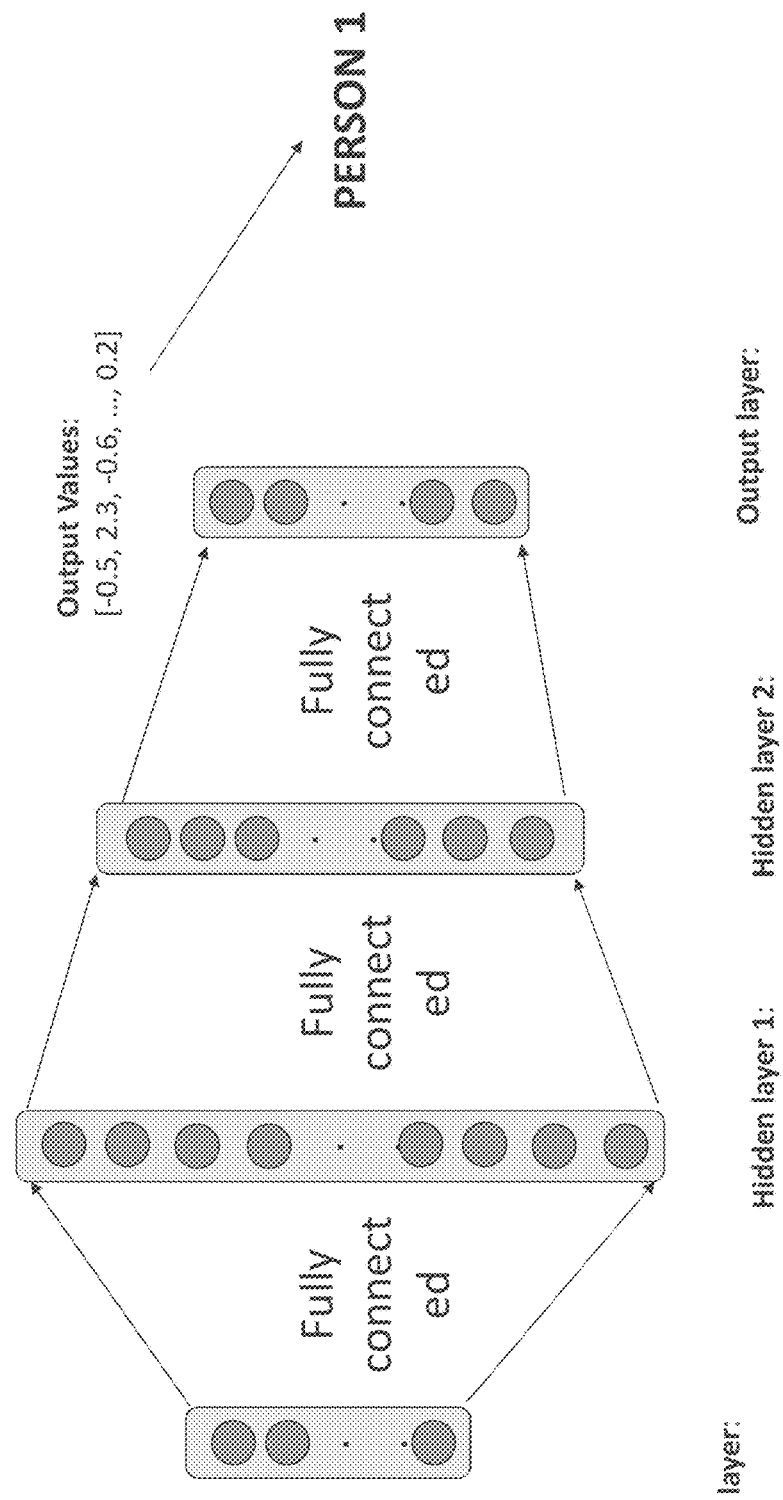
Figure 4D:
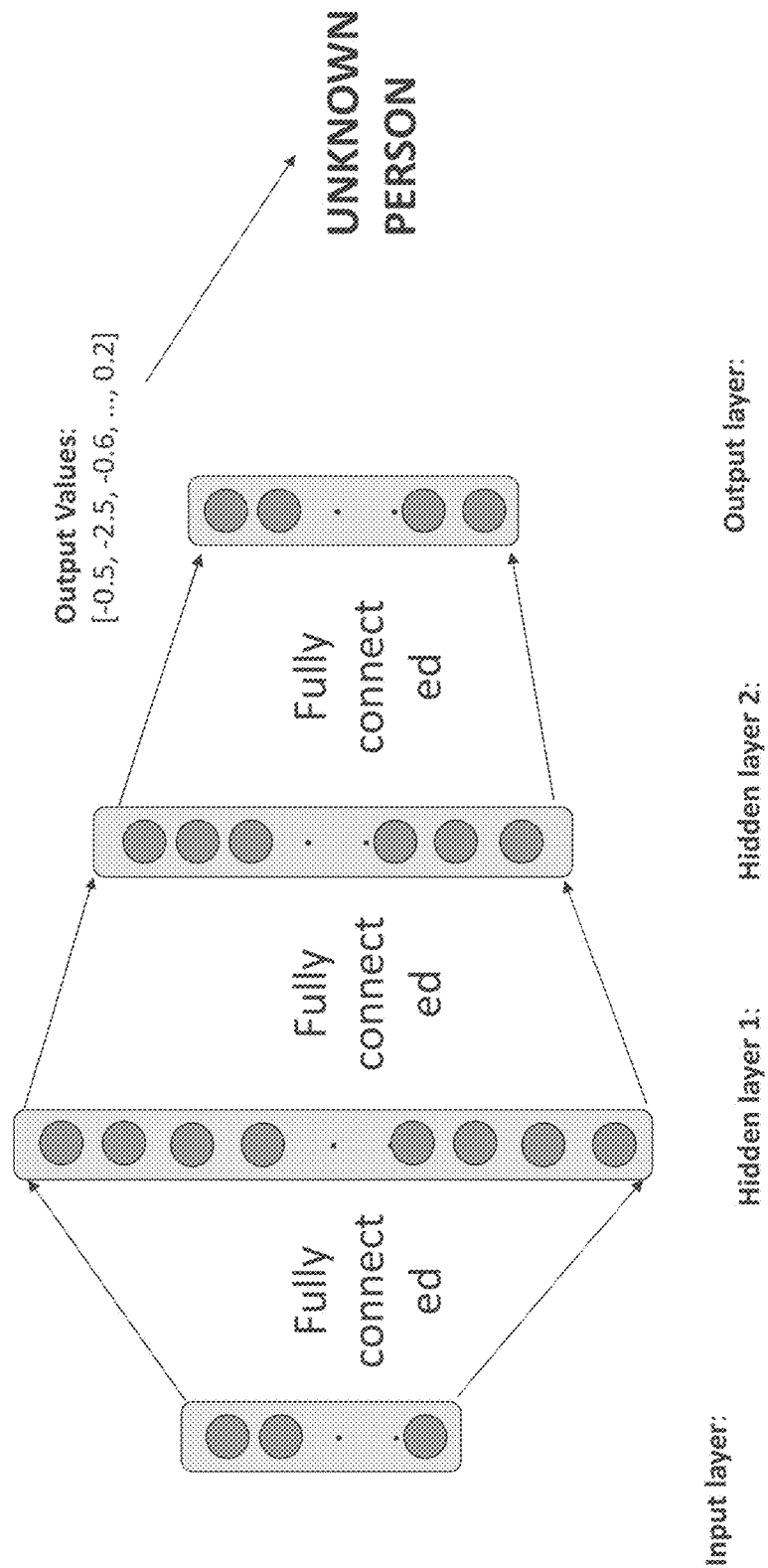
Figure 5A:
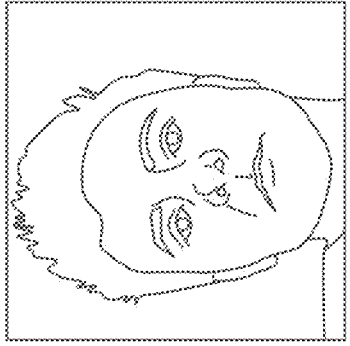
Figure 5D:
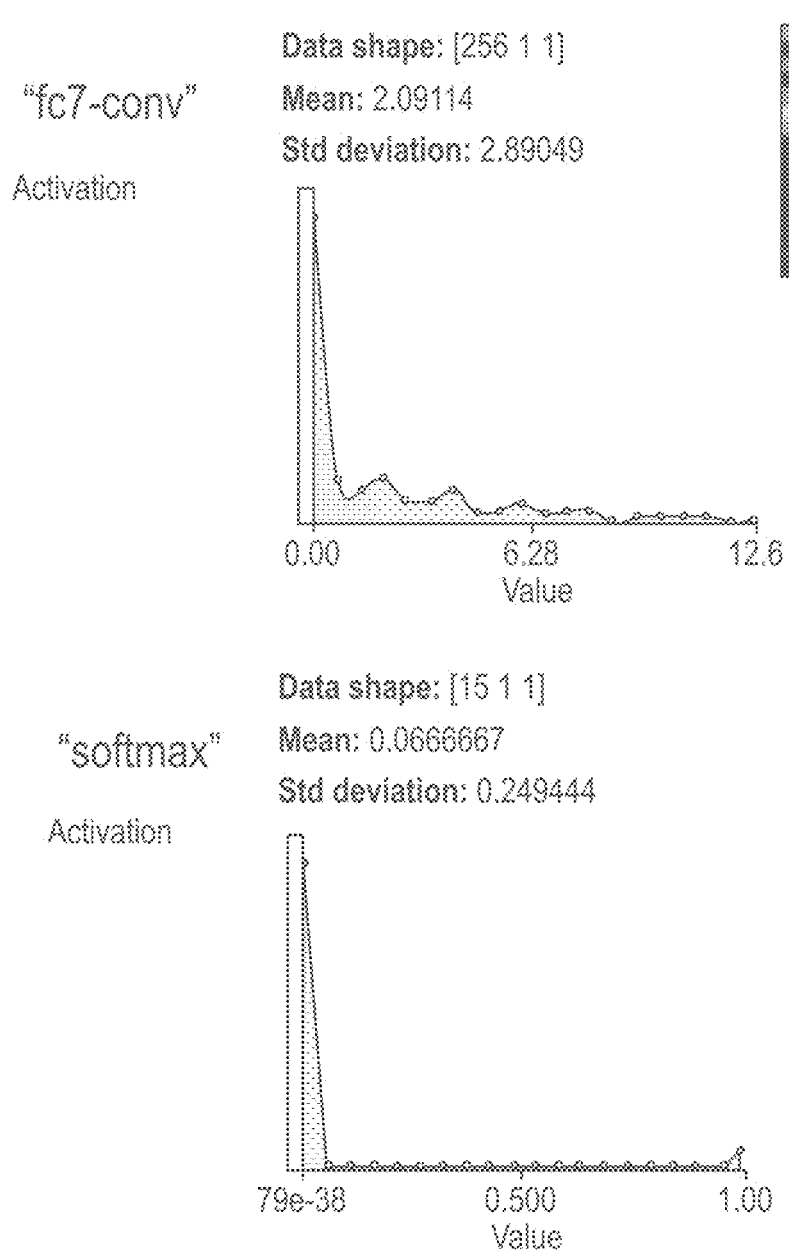

FIG. 3 is a block diagram of an example privacy-enabled biometric system 304. According to some embodiments, the system can be installed on a mobile device or called from a mobile device (e.g., on a remote server or cloud based resource) to return an authenticated or not signal. In various embodiments system 304 can executed any of the preceding processes. For example, system 304 can enroll users (e.g., via process 100), identify enrolled users (e.g., process 200), and search for matches to users (e.g., process 250).

According to various embodiments, system 304 can accept, create or receive original biometric information (e.g., input 302). The input 302 can include images of people, images of faces, thumbprint scans, voice recordings, sensor data, etc. A biometric processing component (e.g., 308) can be configured to crop received images, sample voice biometrics, etc., to focus the biometric information on distinguishable features (e.g., automatically crop image around face). Various forms of pre-processing can be executed on the received biometrics, designed to limit the biometric information to important features. In some embodiments, the pre-processing (e.g., via 308) is not executed or available. In other embodiments, only biometrics that meet quality standards are passed on for further processing.

Processed biometrics can be used to generate additional training data, for example, to enroll a new user. A training generation component 310 can be configured to generate new biometrics for a user. For example, the training generation component can be configured to create new images of the users face having different lighting, different capture angles, etc., in order to build a train set of biometrics. In one example, the system includes a training threshold specifying how many training samples to generate from a given or received biometric. In another example, the system and/or training generation component 310 is configured to build twenty five additional images from a picture of a user's face. Other numbers of training images, or voice samples, etc., can be used.

The system is configured to generate feature vectors from the biometrics (e.g., process images from input and generated training images). In some examples, the system 304 can include a feature vector component 312 configured to generate the feature vectors. According to one embodiment, component 312 executes a convolution neural network ("CNN"), where the CNN includes a layer which generates Euclidean measurable output. The feature vector component 312 is configured to extract the feature vectors from the layers preceding the softmax layer (including for example, the n−1 layer). As discussed above, various neural networks can be used to define feature vectors tailored to an analyzed biometric (e.g., voice, image, health data, etc.), where an output of or with the model is Euclidean measurable. Some examples of these neural networks include model having a softmax layer. Other embodiments use a model that does not include a softmax layer to generate Euclidean measurable vectors. Various embodiments of the system and/or feature vector component are configured to generate and capture feature vectors for the processed biometrics in the layer or layer preceding the softmax layer.

According to another embodiment, the feature vectors from the feature vector component 312 or system 304 are used by the classifier component 314 to bind a user to a classification (i.e., mapping biometrics to a match able/searchable identity). According to one embodiment, the deep learning neural network (e.g., enrollment and prediction network) is executed as a FCNN trained on enrollment data. In one example, the FCNN generates an output identifying a person or indicating an UNKNOWN individual (e.g., at 306). Other examples, use not fully connected neural networks.

According to various embodiments, the deep learning neural network (e.g., which can be an FCNN) must differentiate between known persons and the UNKNOWN. In some examples, this can be implemented as a sigmoid function in the last layer that outputs probability of class matching based on newly input biometrics or showing failure to match. Other examples achieve matching based on a hinge loss functions.

In further embodiments, the system 304 and/or classifier component 314 are configured to generate a probability to establish when a sufficiently close match is found. In some implementations, an unknown person is determined based on negative return values. In other embodiments, multiple matches can be developed and voting can also be used to increase accuracy in matching.

Various implementations of the system have the capacity to use this approach for more than one set of input. The approach itself is biometric agnostic. Various embodiments employ feature vectors that are distance measurable and/or Euclidean measurable, which is generated using the first neural network. In some instances, different neural networks are configured to process different types of biometrics. Using that approach the encrypted feature vector generating neural network may be swapped for or use a different neural network in conjunction with others where each is capable of creating a distance and/or Euclidean measurable feature vector based on the respective biometric. Similarly, the system may enroll in two or more biometric types (e.g., use two or more vector generating networks) and predict on the feature vectors generated for both (or more) types of biometrics using both neural networks for processing respective biometric type simultaneously. In one embodiment, feature vectors from each type of biometric can likewise be processed in respective deep learning networks configured to predict matches based on feature vector inputs or return unknown. The simultaneous results (e.g., one from each biometric type) may be used to identify using a voting scheme or may better perform by firing both predictions simultaneously According to further embodiments, the system can be configured to incorporate new identification classes responsive to receiving new biometric information. In one embodiment, the system 304 includes a retraining component configured to monitor a number of new biometrics (e.g., per user/identification class or by total number of new biometrics) and automatically trigger a re-enrollment with the new feature vectors derived from the new biometric information (e.g., produced by 312). In other embodiments, the system can be configured to trigger re-enrollment on new feature vectors based on time or time period elapsing.

The system 304 and/or retraining component 316 can be configured to store feature vectors as they are processed, and retain those feature vectors for retraining (including for example feature vectors that are unknown to retrain an unknown class in some examples). Various embodiments of the system are configured to incrementally retrain the model on system assigned numbers of newly received biometrics. Further, once a system set number of incremental retraining have occurred the system is further configured to complete a full retrain of the model. The variables for incremental retraining and full retraining can be set on the system via an administrative function. Some defaults include incremental retrain every 3, 4, 5, 6 identifications, and full retrain every 3, 4, 5, 6, 7, 8, 9, 10 incremental retrains. Additionally, this requirement may be met by using calendar time, such as retraining once a year. These operations can be performed on offline (e.g., locked) copies of the model, and once complete the offline copy can be made live.

Additionally, the system 304 and/or retraining component 316 is configured to update the existing classification model with new users/identification classes. According to various embodiments, the system builds a classification model for an initial number of users, which can be based on an expected initial enrollment. The model is generated with empty or unallocated spaces to accommodate new users. For example, a fifty user base is generated as a one hundred user model. This over allocation in the model enables incremental training to be executed on the classification model. When a new user is added, the system is and/or retraining component 316 is configured to incrementally retrain the classification model—ultimately saving significant computation time over convention retraining executions. Once the over allocation is exhausted (e.g., 100 total identification classes) a full retrain with an additional over allocation can be made (e.g., fully retrain the 100 classes to a model with 150 classes). In other embodiments, an incremental retrain process can be executed to add additional unallocated slots.

Even with the reduced time retraining, the system can be configured to operate with multiple copies of the classification model. One copy may be live that is used for authentication or identification. A second copy may be an updated version, that is taken offline (e.g., locked from access) to accomplish retraining while permitting identification operations to continue with a live model. Once retraining is accomplished, the updated model can be made live and the other model locked and updated as well. Multiple instances of both live and locked models can be used to increase concurrency.

According to some embodiments, the system 300 can receive encrypted feature vectors instead of original biometrics and processing original biometrics can occur on different systems—in these cases system 300 may not include, for example, 308, 310, 312, and instead receive feature vectors from other systems, components or processes.

FIGS. 4A-D illustrate example embodiments of a classifier network. The embodiments show a fully connected neural network for classifying feature vectors for training and for prediction. Other embodiments implement different neural networks, including for example, neural networks that are not fully connected. Each of the networks accepts distance and/or Euclidean measurable feature vectors and returns a label or unknown result for prediction or binds the feature vectors to a label during training.

FIGS. 5A-D illustrate examples of processing that can be performed on input biometrics (e.g., facial image) using a neural network. Encrypted feature vectors can be extracted from such neural networks and used by a classifier (e.g., FIGS. 4A-D) during training or prediction operations. According to various embodiments, the system implements a first pre-trained neural network for generating distance and/or Euclidean measurable feature vectors that are used as inputs for a second classification neural network. In other embodiments, other neural networks are used to process biometrics in the first instance. In still other examples, multiple neural networks can be used to generate Euclidean measurable feature vectors from unencrypted biometric inputs each may feed the feature vectors to a respective classifier. In some examples, each generator neural network can be tailored to a respective classifier neural network, where each pair (or multiples of each) is configured to process a biometric data type (e.g., facial image, iris images, voice, health data, etc.).

User Interface Examples

According to some embodiments, the user interface screens can include visual representations showing operation of helper network functions or operations to support helper network functions. For example, and eye blink status can be displayed in the user interface showing a lockout condition that prevents further operation until a threshold number of eye blinks are detected. In other examples, the user interface can display a detected mask status, a detected glasses status, among other options. Depending on system configuration, the detected status can prevent advancement or authentication until remedial action is taken—remove mask, remove glasses, etc. In other embodiments, the system can use detected statuses to select further authentication steps (e.g., tailor selection of embedding networks and associated classification networks, among other options).

Implementation Examples

The following example instantiations are provided to illustrate various aspects of privacy-enabled biometric systems and processes. The examples are provided to illustrate various implementation details and provide illustration of execution options as well as efficiency metrics. Any of the details discussed in the examples can be used in conjunction with various embodiments.

It is realized that conventional biometric solutions have security vulnerability and efficiency/scalability issues.

Apple, Samsung, Google and MasterCard have each launched biometric security solutions that share at least three technical limitations. These solutions are (1) unable to search biometrics in polynomial time; (2) do not one-way encrypt the reference biometric; and (3) require significant computing resources for confidentiality and matching.

Modern biometric security solutions are unable to scale (e.g. Apple Face ID™ authenticates only one user) as they are unable to search biometrics in polynomial time. In fact, the current "exhaustive search" technique requires significant computing resources to perform a linear scan of an entire biometric datastore to successfully one-to-one record match each reference biometric and each new input record— this is as a result of inherent variations in the biometric instances of a single individual.

Similarly, conventional solutions are unable to one-way encrypt the reference biometric because exhaustive search (as described above) requires a decryption key and a decryption to plaintext in the application layer for every attempted match. This limitation results in an unacceptable risk in privacy (anyone can view a biometric) and authentication (anyone can use the stolen biometric). And, once compromised, a biometric—unlike a password—cannot be reset.

Finally, modern solutions require the biometric to return to plaintext in order to match since the encrypted form is not Euclidean measurable. It is possible to choose to make a biometric two-way encrypted and return to plaintext—but this requires extensive key management and, since a two-way encrypted biometric is not Euclidean measurable, it also returns the solution to linear scan limitations.

Various embodiments of the privacy-enabled biometric system and/or methods provide enhancement over conventional implementation (e.g., in security, scalability, and/or management functions). Various embodiments enable scalability (e.g., via "encrypted search") and fully encrypt the reference biometric (e.g., "encrypted match"). The system is configured to provide an "identity" that is no longer tied independently to each application and a further enables a single, global "Identity Trust Store" that can service any identity request for any application.

Various operations are enabled by various embodiments, and the functions include. For example:

Encrypted Match: using the techniques described herein, a deep neural network ("DNN") is used to process a reference biometric to compute a one-way, homomorphic encryption of the biometric before transmitting or storing any data. This allows for computations and comparisons on cipher texts without decryption, and ensures that only the distance and/or Euclidean measurable, homomorphic encrypted biometric is available to execute subsequent matches in the encrypted space. The plaintext data can then be discarded and the resultant homomorphic encryption is then transmitted and stored in a datastore. This example allows for computations and comparisons on cipher texts without decryption and ensures that only the Euclidean measurable, homomorphic encrypted biometric is available to execute subsequent matches in the encrypted space.

Encrypted Search: using the techniques described herein, encrypted search is done in polynomial time according to various embodiments. This allows for comparisons of biometrics and achieve values for comparison that indicate "closeness" of two biometrics to one another in the encrypted space (e.g. a biometric to a reference biometric) while at the same time providing for the highest level of privacy.

Various examples detail implementation of one-to-many identification using, for example, the N−1 layer of a deep neural network. The various techniques are biometric agnostic, allowing the same approach irrespective of the biometric or the biometric type. Each biometric (face, voice, IRIS, etc.) can be processed with a different, fully trained, neural network to create the biometric feature vector.

According to some aspects, an issue with current biometric schemes is they require a mechanism for: (1) acquiring the biometric, (2) plaintext biometric match, (3) encrypting the biometric, (4) performing a Euclidean measurable match, and (5) searching using the second neural network prediction call. To execute steps 1 through 5 for every biometric is time consuming, error prone and frequently nearly impossible to do before the biometric becomes deprecated. One goal with various embodiments, is to develop schemes, techniques and technologies that allow the system to work with biometrics in a privacy protected and polynomial-time based way that is also biometric agnostic. Various embodiments employ machine learning to solve problems issues with (2)-(5).

According to various embodiments, assumed is or no control over devices such as cameras or sensors that acquire the to be analyzed biometrics (thus arriving as plain text). According to various embodiments, if that data is encrypted immediately and only process the biometric information as cipher text, the system provides the maximum practical level of privacy. According to another aspect, a one-way encryption of the biometric, meaning that given cipher text, there is no mechanism to get to the original plaintext, reduces/eliminates the complexity of key management of various conventional approaches. Many one-way encryption algorithms exist, such as MD5 and SHA-512—however, these algorithms are not homomorphic because they are not Euclidean measurable. Various embodiments discussed herein enable a general purpose solution that produces biometric cipher text that is Euclidean measurable using a neural network. Apply a classifying algorithm to the resulting feature vectors enables one-to-many identification. In various examples, this maximizes privacy and runs between $O(n)=1$ and $O(n)=\log(n)$ time.

As discussed above, some capture devices can encrypt the biometric via a one-way encryption and provide feature vectors directly to the system. This enables some embodiments, to forgo biometric processing components, training generation components, and feature vector generation components, or alternatively to not use these elements for already encrypted feature vectors.

Example Execution and Accuracy

In some executions, the system is evaluated on different numbers of images per person to establish ranges of operating parameters and thresholds. For example, in the experimental execution the num-epochs establishes the number of interactions which can be varied on the system (e.g., between embodiments, between examples, and between executions, among other options). The LFW dataset is taken from the known labeled faces in the wild data set. Eleven people is a custom set of images and faces94 from the known source—faces94. For our examples, the epochs are the number of new images that are morphed from the original images. So if the epochs are 25, and we have 10 enrollment images, then we train with 250 images. The morphing of the images changed the lighting, angels and the like to increase the accuracy in training.

TABLE I (fully connected neural network model with 2 hidden layers + output sigmoid layer):
➤ Input => [100, 50] => num_people (train for 100 people given 50 individuals to identify).
Other embodiments improve over these accuracies for the UNKNOWN.

| Dataset | Training Set | Test Set | UNKNOWN PERSON Set | #images In Test Set | #images In UNKNOWN PERSON Set | Parameters | Accuracy In Test Set | Accuracy In UNKNOWN PERSON Set |
|---|---|---|---|---|---|---|---|---|
| LFW | 70% | 30% | 11 people dataset | 1304 | 257 | min_images_per_person = 10 num-epochs = 25 | 98.90% | 86.40% |
| LFW | 70% | 30% | 11 people dataset | 2226 | 257 | min_images_per_person = 3 num-epochs = 25 | 93.90% | 87.20% |
| 11 people | 70% | 30% | Copy 2 people from LFW | 77 | 4 | min_images_per_person = 2 num-epochs = 25 | 100.00% | 50.00% |
| faces94 | 70% | 30% | 11 people dataset | 918 | 257 | min_images_per_person = 2 num-epochs = 25 | 99.10% | 79.40% |

TABLE II (0 hidden layers & output linear with decision f(x); Decision at .5 value)
Improves accuracy for the UNKNOWN case, but other implementations achieve higher accuracy.

| Dataset | Training Set | Test Set | UNKNOWN PERSON Set | #images In Test Set | #images In UNKNOWN PERSON Set | Parameters | Accuracy In Test Set | Accuracy In UNKNOWN PERSON Set |
|---|---|---|---|---|---|---|---|---|
| LFW | 70% | 30% | 11 people dataset | 1304 | 257 | min_images_per_person = 10 num-epochs = 25 | 98.80% | 91.10% % |
| LFW | 70% | 30% | 11 people dataset | 2226 | 257 | min_images_per_person = 3 num-epochs = 25 | 96.60% | 97.70% % |
| 11 people | 70% | 30% | Copy 2 people from LFW | 77 | 4 | min_images_per_person = 2 num-epochs = 25 | 98.70% | 50.00% % |
| faces94 | 70% | 30% | 11 people dataset | 918 | 257 | min_images_per_person = 2 num-epochs = 25 Cut-off = 0.5 | 99.10% | 82.10% % |
| faces94 | 70% | 30% | 11 people dataset | 918 | 257 | min_images_per_person = 2 num-epochs = 25 Cut-off = 1.0 | 98.30% | 95.70% |

TABLE III

FCNN with 1 hidden layer (500 nodes) + output linear with decision

| Dataset | Training Set | Test Set | UNKNOWN PERSON Set | #images In Test Set | #images In UNKNOWN PERSON Set | Parameters | Accuracy In Test Set | Accuracy In UNKNOWN PERSON Set |
|---|---|---|---|---|---|---|---|---|
| LFW | 70% | 30% | 11 people dataset | 1304 | 257 | min_images_per_person = 10 num-epochs = 25 | 99.30% | 92.20% |
| LFW | 70% | 30% | 11 people dataset | 2226 | 257 | min_images_per_person = 3 num-epochs = 25 | 97.50% | 97.70% |
| 11 people | 70% | 30% | Copy 2 people from LFW | 77 | 4 | min_images_per_person = 2 num-epochs = 25 | | |
| faces94 | 70% | 30% | 11 people dataset | 918 | 257 | min_images_per_person = 2 num-epochs = 25 Cut-off = 0.5 | 99.20% | 92.60% |
| faces94 | 70% | 30% | 11 people dataset | 918 | 257 | min_images_per_person = 2 num-epochs = 25 Cut-off = 1.0 | | |

TABLE IV

FCNN 2 Hidden Layers (500, 2*num_people) + output linear, decisions f(x)

| Dataset | Training Set | Test Set | UNKNOWN PERSON SET | #images In Test Set | #images In UNKNOWN PERSON SET | Parameters | Accuracy In Test Set | Accuracy In UNKNOWN PERSON Set |
|---|---|---|---|---|---|---|---|---|
| LFW | 70% | 30% | 11 people data set | 1304 | 257 | min_images_per_person = 10 num-epochs = 25 | 98.30% | 97.70% |
| LFW | 70% | 30% | 11 people data set | 2226 | 257 | min_images_per_person = 3 num-epochs = 25 Cut-off = 0 | 98.50% | 98.10% |
| 11 people | 70% | 30% | Copy 2 people from LFW | 77 | 4 | min_images_per_person = 2 num-epochs = 25 | | |
| faces94 | 70% | 30% | 11 people data set | 918 | 257 | min_images_per_person = 2 num-epochs = 25 Cut-off = 0 | 98.60% | 93.80% |

In various embodiments, the neural network model is generated initially to accommodate incremental additions of new individuals to identify (e.g., 2*num_people is an example of a model initially trained for 100 people given an initial 50 individuals of biometric information). The multiple or training room provides can be tailored to the specific implementation. For example, where additions to the identifiable users is anticipated to be small additional incremental training options can include any number with ranges of 1% to 200%. In other embodiments, larger percentages can be implemented as well.

TABLE V

FCNN: 2 Hidden Layers (500, 2*num_people) + output linear, decisions f(x), and voting - where the model is trained on 2* the number of class identifiers for incremental training.

| Dataset | Training Set | Test Set | UNKNOWN PERSON SET | #images In Test Set | #images In UNKNOWN PERSON SET | Parameters | Accuracy In Test Set | Accuracy In UNKNOWN PERSON Set = 11 people | Accuracy In UNKNOWN PERSON Set = faces94 |
|---|---|---|---|---|---|---|---|---|---|
| LFW | 70% | 30% | 11 people dataset | 1304 | 257 | min_images_per_person = 10 num-epochs = 25 | 98.20% (vote) 100.00% | 98.80% (vote) 100.00% | 88.40% (vote) 90.80% |
| LFW | 70% | 30% | 11 people dataset | 2226 | 257 | min_images_per_person = 3 num-epochs = 25 Cut-off = 0 | 98.10% (vote) 98.60% | 98.40% (vote) 100.00% | 93.60% (vote) 95.40% |
| 11 people | 70% | 30% | Copy 2 people from LFW | 77 | 4 | min_images_per_person = 2 num-epochs = 25 | | | |
| faces94 | 70% | 30% | 11 people dataset | 918 | 257 | min_images_per_person = 2 num-epochs = 25 Cut-off = 0 | | | |

According to one embodiment the system can be implemented as a REST compliant API that can be integrated and/or called by various programs, applications, systems, system components, etc., and can be requested locally or remotely.

In one example, the privacy-enabled biometric API includes the following specifications:

- Preparing data: this function takes the images & labels and saves them into the local directory.

```
{
def add_training_data(list_of_images, list_of_label) :
    @params list_of_images: the list of images
    @params list_of_label: the list of corresponding labels
}
```

- Training model: each label (person/individual) can include at least 2 images. In some examples, if the person does not have the minimum that person will be ignored.

-continued

```
{
def train( ) :
}
```

- Prediction:

```
{
def predict(list_of_images) :
    @params list_of_images: the list of images of the same person
    @return label: a person name or "UNKNOWN_PERSON"
}
```

Further embodiments can be configured to handle new people (e.g., labels or classes in the model) in multiple ways. In one example, the current model can be retrained every time (e.g., with a threshold number) a certain number of new people are introduced. In this example, the benefit is improved accuracy—the system can guarantee a level of accuracy even with new people. There exists a trade-off in that full retraining is a slow time consuming and a heavy computation process. This can be mitigated with live and offline copies of the model so the retraining occurs offline and the newly retrain model is swapped for the live version. In one example, training time executed in over 20 minutes. With more data the training time increases.

According to another example, the model is initialized with slots for new people. The expanded model is configured to support incremental training (e.g., the network structure is not changed when adding new people). In this example, the time to add new people is significantly reduced (even over other embodiments of the privacy-enabled biometric system). It is realized that there may be some reduction in accuracy with incremental training, and as more and more people are added the model can trends towards overfit on the new people i.e., become less accurate with old people. However, various implementations have been tested to operate at the same accuracy even under incremental retraining.

Yet another embodiments implements both incremental retraining and full retraining at a threshold level (e.g., build the initial model with a multiple of the people as needed— (e.g., 2 times—100 labels for an initial 50 people, 50 labels for an initial 25 people, etc.)). Once the number of people reaches the upper bound (or approaches the upper bound) the system can be configured to execute a full retrain on the model, while building in the additional slots for new users. In one example, given 100 labels in the model with 50 initial people (50 unallocated) reaches 50 new people, the system will execute a full retrain for 150 labels and now 100 actual people. This provides for 50 additional users and incremental retraining before a full retrain is executed.

Stated generally, the system in various embodiments is configured to retrain the whole network from beginning for every N people. Training data: have 100 people; step 1: train the network with N=1000 people; assign 100 people and reserving 900 to train incremental; train incrementally with new people until we reach 1000 people; and reach 1000 people, full retrain. Full retrain: train the network with 2N=2000 people; now have 1000 people for reserving to train incremental; train incrementally with new people until we reach 2000 people; and repeat the full retrain with open allocations when reach the limit.

An example implementation of the API includes the following code:

```
drop database if exists trueid;
create database trueid;
grant all on trueid.* to trueid@'localhost' identified by 'trueid';
drop table if exists feature;
drop table if exists image;
drop table if exists PII;
drop table if exists subject;
CREATE TABLE subject
(
    id INT PRIMARY KEY AUTO_INCREMENT,
    when_created TIMESTAMP DEFAULT CURRENT_TIMESTAMP
);
CREATE TABLE PII
(
    id INT PRIMARY KEY AUTO_INCREMENT,
    subject_id INT,
    tag VARCHAR(254),
    value VARCHAR(254)
);
CREATE TABLE image
(
    id INT PRIMARY KEY AUTO_INCREMENT,
    subject_id INT,
    image_name VARCHAR(254),
    is_train boolean,
    when_created TIMESTAMP DEFAULT CURRENT_TIMESTAMP
);
CREATE TABLE feature
(
    id INT PRIMARY KEY AUTO_INCREMENT,
    image_id INT NOT NULL,
    feature_order INT NOT NULL,
    feature_value DECIMAL(32,24) NOT NULL
);
    ALTER TABLE image ADD CONSTRAINT fk_subject_id FOREIGN KEY (subject_id) REFERENCES subject(id);
    ALTER TABLE PII ADD CONSTRAINT fk_subject_id_pii FOREIGN KEY (subject_id) REFERENCES subject(id);
    ALTER TABLE feature ADD CONSTRAINT fk_image_id FOREIGN KEY (image_id) REFERENCES image(id);
        CREATE INDEX piisubjectid ON PII(subject_id);
        CREATE INDEX imagesubjectid ON image(subject_id);
        CREATE INDEX imagesubjectidimage ON image(subject_id, image_name);
        CREATE INDEX featureimage_id ON feature(image_id);
```

API Execution Example

Push the known LFW feature embeddings to biometric feature database.
Simulate the incremental training process:
    num_seed=50 #build the model network, and first num_seed people was trained fully
    num_window=50 #For every num_window people: build the model network, and people trained fully
    num_step=1 #train incremental every new num_step people
    num_eval=10 #evaluate the model every num_eval people
Build the model network with #class=100. Train from beginning (#epochs=100) with the first 50 people. The remaining 50 classes are reserved for incremental training.
    i) Incremental training for the 51st person. Train the previous model with all 51 people (#epochs=20)
    ii) Incremental training for the 52st person. Train the previous model with all 52 people (#epochs=20)
    iii) continue . . . .
(Self or automatic monitoring can be executed by various embodiments to ensure accuracy over time—alert flags can be produced if deviation or excessive inaccuracy is detected; alternatively or in conjunction full retraining can be executed responsive to excess inaccuracy and the fully retrained model evaluated to determine is accuracy issues are resolved—if so the full retrain threshold can be automatically adjusted). Evaluate the accuracy of the previous model (e.g., at every 10 steps), optionally record the training time for every step.
Achieve incremental training for maximum allocation (e.g., the 100th person). Full train of the previous model with all 100 people (e.g., #epochs=20)
Build the model network with #class=150. Train from beginning (e.g., #epochs=100) with the first 100 people. The remaining 50 classes are reserved for incremental training.
    i) Incremental training for the 101st person. Train the previous model with all 101 people (#epochs=20)
    ii) continue.
Build the model network with #class=200. Train from beginning (e.g., #epochs=100) with the first 150 people. The remaining 50 classes are reserved for incremental training.
    i) Incremental training for the 151st person. Train the previous model with all 151 people (#epochs=20)
    ii) Continue . . . .

Refactor Problem:

According to various embodiments, it is realized that incremental training can trigger concurrency problems: e.g., a multi-thread problem with the same model, thus the system can be configured to avoid retrain incrementally at the same time for two different people (data can be lost if retraining occurs concurrently). In one example, the system implements a lock or a semaphore to resolve. In another example, multiple models can be running simultaneously—and reconciliation can be executed between the models in stages. In further examples, the system can include monitoring models to ensure only one retrain is executed one multiple live models, and in yet others use locks on the models to ensure singular updates via incremental retrain. Reconciliation can be executed after an update between models. In further examples, the system can cache feature vectors for subsequent access in the reconciliation.

According to some embodiments, the system design resolves a data pipeline problem: in some examples, the data pipeline supports running one time due to queue and thread characteristics. Other embodiments, avoid this issue by extracting the embeddings. In examples, that do not include that functionality the system can still run multiple times without issue based on saving the embedding to file, and loading the embedding from file. This approach can be used, for example, where the extracted embedding is unavailable via other approaches. Various embodiments can employ different options for operating with embeddings: when we give a value to a tensorflow, we have several ways: Feed_dict (speed trade-off for easier access); and Queue: faster via multi-threads, but can only run one time (the queue will be ended after it's looped).

Table VI (FIG. 12) & TABLE VII (FIG. 13) shows execution timing during operation and accuracy percentages for the respective example.

TABLE VIII shows summary information for additional executions.

| Dataset | Training Set | Test Set | UNKNOWN PERSON Set | #people in Traing Set | #images In Test Set | #images In UNKNOWN PERSON Set | Parameters | Accuracy In Test Set |
|---|---|---|---|---|---|---|---|---|
| LFW | 70% | 30% | 11 people dataset | 158 | 1304 | 257 | min_images_per_person = 10 num-epochs = 25 Cut-off = 0 | 98.70% (vote) 100.00% |
| LFW | 70% | 30% | 11 people dataset | 901 | 2226 | 257 | min_images_per_person = 3 num-epochs = 25 Cut-off = 0 | 93.80% (vote) 95.42% |

According to one embodiment, the system can be described broadly to include any one or more or any combination of the following elements and associated functions:

Preprocessing: where the system takes in an unprocessed biometric, which can include cropping and aligning and either continues processing or returns that the biometric cannot be processed.

Neural network 1: Pre-trained. Takes in unencrypted biometrics. Returns biometric feature vectors that are one-way encrypted and distance and/or Euclidean measurable. Regardless of biometric type being processed—NN1 generates Euclidean measurable encrypted feature vectors. In various embodiments, the system can instantiate multiple NN1(s) for individual credentials and also where each or groups of NN1s are tailored to different authentication credential.

Distance evaluation of NN1 output for a phase of authentication and/or to filter output of NN1: As discussed above, a first phase of authentication can use encrypted feature vectors to determine a distance and authenticate or not based on being within a threshold distance. Similarly during enrollment the generated feature vectors can be evaluated to ensure they are within a threshold distance and otherwise require new biometric samples.

Neural network 2: Not pre-trained. It is a deep learning neural network that does classification. Includes incremental training, takes a set of label, feature vector pairs as input and returns nothing during training—the trained network is used for matching or prediction on newly input biometric information. Does prediction, which takes a feature vector as input and returns an array of values. These values, based on their position and the value itself, determine the label or unknown.

Voting functions can be executed with neural network 2 e.g., during prediction.

System may have more than one neural network 1 for different biometrics. Each would generate Euclidean measurable encrypted feature vectors based on unencrypted input.

System may have multiple neural network 2(s) one for each biometric type.

According to further aspects, the system achieves significant improvements in accuracy of identification based at least in part on bounded enrollment of encrypted feature vectors over conventional approaches. For example, at any point when encrypted feature vectors are created for enrollment (e.g., captured by device and processed by a generation network, built from captures to expand enrollment pool and processes by a generation network), those encrypted feature vectors are analyzed to determine that they are similar enough to each other to use for a valid enrollment. In some embodiments, the system evaluates the produced encryptions and tests whether any encrypted features vectors have a Euclidean distance of greater than 1 from each other (e.g., other thresholds can be used). If so, those values are discarded. If a minimum number of values is not met, the entire enrollment can be deemed a failure, and new inputs requested, processed and validated prior to training a respective classification network. Stated broadly, the bounded enrollment thresholds can be established based, at least in part, on what threshold is being used to determine a measurement (e.g., two encrypted feature vectors) is the same as another. Constraining training inputs to the classification network so that all the inputs are within a boundary close to the identification threshold ensures that the resulting classification network is stable and accurate. In some examples, even singular outliers can destabilize an entire network, and significantly reduce accuracy.

Modifications and variations of the discussed embodiments will be apparent to those of ordinary skill in the art and all such modifications and variations are included within the scope of the appended claims. For example, while many examples and embodiments are discussed above with respect to a user or person, and identification/authentication of same, it is realized that the system can identify and/or authentication any item or thing or entity for which image capture is possible (e.g., family pet, heirloom, necklace, ring, landscape, etc.) or other type of digital capture is possible (e.g., ambient noise in a location, song, singing, specific gestures by an individual, sign language movements, words in sign language, etc.). Once digitally captures the object of identification/authentication can be processed by a first generation network, whose output is used to train a second classification network, enabling identification of the object in both distance measure and classification settings on fully encrypted identifying information.

According to one aspect, an authentication system for privacy-enabled authentication is provided. The system comprises at least one processor operatively connected to a memory; an authentication credential processing component, executed by the at least one processor, comprising at least a pre-trained embedding network, the pre-trained embedding network configured to: transform an authentication input into a one-way encryption and measurable representation of the authentication input; a plurality of helper neural networks, executed by the at least one processor, comprising at least: a geometry helper neural network configured to accept an authentication input comprising plaintext image data and transform the plaintext image data into geometric primitives and identify location features of interest within the plaintext image data; a validation helper neural network associated with the geometry helper network configured to: validate the plaintext image data (e.g., as a face and/or as a fingerprint); modify the plaintext image date (e.g., align, crop); and pass the modified image data to the pre-trained embedding network; wherein the pre-trained neural network is further configured to: communicate one-way encrypted and measurable representations of the modified image data to a classification component for training and prediction operations on at least a first deep neural network ("DNN").

According to some embodiments, the system can further include a data augmentation neural network configured to: generate a plurality of modified authentication instances by transforming the authentication input; wherein the data augmentation neural network is configured to homogenized lighting conditions of input plaintext image data; wherein the data augment neural network is configured to homogenize lighting conditions in a target image; a classification deep neural network ("DNN") configured to accept encrypted authentication credentials, generated from the pre-trained embedding network and classify the encrypted authentication credential during training, based on processing the encrypted authentication credentials and associated label inputs during the training and predict matches to trained classed responsive to receipt of an encrypted authentication credential from the pre-trained embedding network.

According to one aspect, an authentication system for privacy-enabled authentication is provided. The system comprises at least one processor operatively connected to a memory; an authentication credential processing component, executed by the at least one processor, comprising at least a pre-trained embedding network, the pre-trained embedding network configured to: transform an authentication input into a one-way encryption and measurable representation of the authentication input; a plurality of helper neural networks, executed by the at least one processor, comprising at least: a validation helper neural network associated with an authentication input modality, the validation helper network configured to: validate an plaintext authentication input (e.g., as a face and/or as a fingerprint or audio information as speech); modify the plaintext authentication input (e.g., align, crop, sample), wherein the act of modifying authentication input increases the accuracy of representations produced by the embedding network relative to unmodified authentication input; and pass the modified authentication data to the pre-trained embedding network as an input to generate the one-way encryption and measurable representation of the modified authentication input; wherein at least one processor is further configured to: communicate one-way encrypted and measurable representations of the modified image data to a classification component for training and prediction operations on at least a first deep neural network ("DNN"); and receive an authentication signal specifying a match or unknown result.

Some embodiments include a geometry helper neural network configured to accept plaintext authentication input and transform the plaintext authentication input (image data into geometric primitives and identify location features of interest within the plaintext image data).

An illustrative implementation of a computer system 800 that may be used in connection with any of the embodiments of the disclosure provided herein is shown in FIG. 8. The computer system 800 may include one or more processors 810 and one or more articles of manufacture that comprise non-transitory computer-readable storage media (e.g., memory 820 and one or more non-volatile storage media 830). The processor 810 may control writing data to and reading data from the memory 820 and the non-volatile storage device 830 in any suitable manner. To perform any of the functionality described herein, the processor 810 may execute one or more processor-executable instructions stored in one or more non-transitory computer-readable storage media (e.g., the memory 820), which may serve as non-transitory computer-readable storage media storing processor-executable instructions for execution by the processor 810.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described with reference to the Figures above) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B." or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed:

1. A system for privacy-enabled identification or authentication, the system comprising:
   at least one processor operatively connected to a memory;
      an authentication data gateway, executed by the at least one processor, configured to filter identification information, the authentication data gateway comprising at least:
      a first pre-trained validation helper network associated with identification information of a first authentication type configured to:
         process the identification information of the first authentication type, and
         validate the identification information of the first authentication type or reject the identification information of the first authentication type preventing use of rejected data in subsequent enrollment, identification, or authentication by neural networks, wherein the first pre-trained validation helper network is trained to validate or reject based on evaluation criteria independent of an identity of a subject of the identification information seeking to be enrolled, identified, or authenticated; and
      an authentication subsystem configured to:
         generate with an embedding network associated with the first authentication type an output of encrypted feature vectors for identifying or authenticating respective users based on input of the filtered identification information to the embedding network; and
         match the encrypted feature vectors of the first authentication type based on distance evaluations to return labels associated with the respective users that identify or authenticate the respective users on evaluation of the encrypted feature vectors produced by the embedding network.

2. The system of claim 1, wherein the authentication data gateway is configured to filter bad authentication data from use with embedding network models in enrollment, identification, or authentication.

3. The system of claim 2, wherein the authentication data gateway is configured to determine if an identification information input improves identification entropy of an identification group of data associated with a user.

4. The system of claim 2, wherein the authentication data gateway further comprises:
   a first pre-trained geometry helper network configured to:
      process identification information of a first type,
      accept as input plaintext identification information of the first type, and
      output processed identification information of the first type.

5. The system of claim 4, wherein the first pre-trained validation helper network is configured to accept the output of the first pre-trained geometry helper network.

6. The system of claim 2, wherein the first pre-trained validation helper network is configured to:
   process an audio input as the identification information; and
   output an evaluation that the audio input is invalid for reducing identification entropy.

7. The system of claim 6, wherein the first pre-trained validation helper network is configured to:
   process the audio input as the identification information, and
   output an evaluation that the audio input is a presentation attack.

8. The system of claim 1, wherein the authentication data gateway further comprises a plurality of validation helper networks each associated with a respective type of identification information, wherein each of the plurality of validation helper networks generate an evaluation of respective authentication inputs to establish validity.

9. The system of claim 8, wherein the first pre-trained validation helper network is configured process an image input as the respective type of identification information, and output an evaluation that the image input is invalid.

10. The system of claim 8, wherein the first pre-trained validation helper network is configured to process an image input as the respective type of identification information, and output an evaluation that the image input is a presentation attack.

11. The system of claim 8, wherein the first pre-trained validation helper network is configured to:
    process a video input as the respective type of identification information; and
    output an evaluation that the video input is invalid.

12. The system of claim 8, wherein the first pre-trained validation helper network is configured to:
    process a video input as the respective type of identification information, and
    output an evaluation that the video input is a presentation attack.

13. A computer implemented method for privacy-enabled authentication, the method comprising:
    filtering, by at least one processor, invalid identification information to generate an output of filtered identification information using a first pre-trained validation helper network;
    executing by the at least one processor, the first pre-trained validation helper network;
    accepting, by the first pre-trained validation helper network, identification information of a first authentication type;
    validating the identification information of the first authentication type or rejecting the identification information of the first authentication type preventing use of rejected data in subsequent enrollment, identification, or authentication by other neural networks, wherein the first pre-trained validation helper network is trained to validate or reject based on evaluation criteria independent of an identity of a subject of the identification information seeking to be enrolled, identified, or authenticated;
    generating with an embedding network associated with the first authentication type, encrypted feature vectors for identifying or authenticating respective users based on input of the output of filtered identification information to the embedding network; and matching the encrypted feature vectors of the first authentication type based on distance evaluations to return labels associated with the respective users that identify or authenticate the respective users on evaluation of the encrypted feature vectors produced by the embedding network.

14. The method of claim 13, wherein the method further comprises filtering bad authentication data.

15. The method of claim 13, wherein the method further comprises executing a plurality of validation helper networks each associated with a respective type of identification information, and generating a probabilistic evaluation of respective authentication inputs by respective ones of the plurality of validation helper networks to establish validity.

16. The method of claim 15, wherein the method further comprises processing, by the first pre-trained validation helper network an image input as the respective type of identification information, and determining whether the image input is invalid.

17. The method of claim 15, wherein the method further comprises processing an image input as the respective type of identification information, and determining a probabilistic evaluation that the image input is a presentation attack, by the first pre-trained validation helper network.

18. The method of claim 15, wherein the method further comprises:

processing, by the first pre-trained validation helper network, a video input as the respective type of identification information; and generating, by the first pre-trained validation helper network, an evaluation that the video input is invalid, by the first pre-trained validation helper network.

19. The method of claim 15, wherein the method further comprises:

processing, by the first pre-trained validation helper network, a video input as the respective type of identification information, and determining, the first pre-trained validation helper network, an evaluation that the video input is a presentation attack.

20. The method of claim 13, wherein the method further comprises executing at least a first geometry helper network configured to process identification information of the first type.

21. The method of claim 13, wherein the method further comprises determining if an identification information input improves identification entropy.

* * * * *